(12) United States Patent
Raghunathan et al.

(10) Patent No.: US 12,524,023 B2
(45) Date of Patent: Jan. 13, 2026

(54) SYSTEM AND METHOD FOR CONTROLLING A FLEET OF UNMANNED AERIAL VEHICLES BASED ON MULTI-STAGE OPTIMIZATION

(71) Applicants: Mitsubishi Electric Research Laboratories, Inc., Cambridge, MA (US); Mitsubishi Electric US, Cypress, CA (US)

(72) Inventors: Arvind Raghunathan, Medford, MA (US); Zafer Sahinoglu, Costa Mesa, CA (US); David Bergman, Wethersfiled, CT (US); Andre Cire, Toronto (CA)

(73) Assignees: Mitsubishi Electric Research Laboratories, Inc., Cambridge, MA (US); Mitsubishi Electric US

( * ) Notice: Subject to any disclaimer, the term of this patent is extended or adjusted under 35 U.S.C. 154(b) by 0 days.

(21) Appl. No.: 18/619,438

(22) Filed: Mar. 28, 2024

(65) Prior Publication Data

US 2025/0306611 A1   Oct. 2, 2025

Related U.S. Application Data

(60) Provisional application No. 63/583,069, filed on Sep. 15, 2023.

(51) Int. Cl.
*G05D 1/698*   (2024.01)
*G05D 1/644*   (2024.01)
*G05D 109/25*  (2024.01)

(52) U.S. Cl.
CPC .......... *G05D 1/6987* (2024.01); *G05D 1/644* (2024.01); *G05D 2109/254* (2024.01)

(58) Field of Classification Search
None
See application file for complete search history.

(56) References Cited

U.S. PATENT DOCUMENTS 8,493,026 B2   7/2013   Sahinoglu et al.
9,671,791 B1   6/2017   Paczan
(Continued)

OTHER PUBLICATIONS

Alver et al., "Assessing the Robustness of UAV Assignments", Proceedings of the 2012 Winter Simulation Conference, Dec. 1, 2012, pp. 1-11 (Year: 2012).*

(Continued)

*Primary Examiner* — Tamara L Weber
(74) *Attorney, Agent, or Firm* — Gene Vinokur

(57) ABSTRACT

The present disclosure provides a system and a method for controlling a fleet of Unmanned Aerial Vehicles (UAVs) to perform a mission. The method comprises receiving request data for the mission, obtaining assignments corresponding to one or more UAVs of the fleet of UAVs, and obtaining assignment data corresponding to each assignment. The method further comprises determining an assignment for the one or more UAVs by performing a first stage of a multi-stage optimization subject to a first set of constraints and updating the first list of assignments by adding the determined assignment to the first list of assignments. The method further comprises determining a second list of assignments for the one or more UAVs by performing a second stage of the multi-stage optimization subject to a second set of constraints and controlling the one or more UAVs based on the second list of assignments.

20 Claims, 34 Drawing Sheets

(56) References Cited

U.S. PATENT DOCUMENTS

| | | | |
|---|---|---|---|
| 10,011,352 B1* | 7/2018 | Dahlstrom | B64U 10/60 |
| 10,298,356 B1 | 5/2019 | Châtelain et al. | |
| 10,909,859 B1* | 2/2021 | Dodd | G08G 5/53 |
| 11,355,021 B1* | 6/2022 | Miao | G08G 5/26 |
| 11,928,640 B1* | 3/2024 | Dohrn | G06F 16/2455 |
| 2017/0259917 A1 | 9/2017 | Winn et al. | |
| 2021/0088337 A1 | 3/2021 | Koubaa | |
| 2021/0103294 A1 | 4/2021 | Mahkonen et al. | |
| 2021/0173414 A1 | 6/2021 | Starr et al. | |
| 2022/0026901 A1 | 1/2022 | Shaw | |
| 2022/0156665 A1* | 5/2022 | Beth | G05D 1/0276 |
| 2022/0157177 A1 | 5/2022 | Eyhorn | |
| 2022/0357743 A1* | 11/2022 | Ryan | B64C 13/18 |
| 2023/0297906 A1* | 9/2023 | Garcia-Brosa | G06Q 20/102 |
| | | | 705/7.13 |

OTHER PUBLICATIONS

San et al., "The Delivery Assignment Solution for Swarms of UAVs Dealing with Multi-dimensional Chromosome Representation of Genetic Algorithm", 2016 IEEE 7th Annual Ubiquitous Computing, Electronics & Mobile Communication Conference (UEMCON), Oct. 20-22, 2016, pp. 1-7 (Year: 2016).*

Hafez et al., "Task Assignment/Trajectory Planning for Unmanned Vehicles Via HFLC and PSO", 2017 International Conference on Unmanned Aircraft Systems (ICUAS), Jun. 13-16, 2017, pp. 554-559 (Year: 2017).*

Panadero et al., "An Agile Simheuristic for the Stochastic Team Task Assignment and Orienteering Problem: Applications to Unmanned Aerial Vehicles", Proceedings of the 2020 Winter Simulation Conference, Dec. 14, 2020, pp. 1324-1335 (Year: 2020).*

Santin et al., "Matheuristics for Multi-UAV Routing and Recharge Station Location for Complete Area Coverage", Sensors 2021, 21, 1705, Mar. 2, 2021, pp. 1-34 (Year: 2021).*

Hong et al., "Autonomous Mission of Multi-UAV for Optimal Area Coverage", Sensors 2021, 21, 2482, Apr. 2, 2021, pp. 1-21 (Year: 2021).*

Lu et al., "Multi-UAV Task Assignment Based on Secondary Distribution", 2021 13th International Conference on Intelligent Human-Machine Systems and Cybernetics (IHMSC), Aug. 1, 2021, pp. 44-48 (Year: 2021).*

* cited by examiner

SYSTEM AND METHOD FOR CONTROLLING A FLEET OF UNMANNED AERIAL VEHICLES BASED ON MULTI-STAGE OPTIMIZATION

TECHNICAL FIELD

The present disclosure generally relates to controlling Unmanned Aerial Vehicles (UAVs) and more particularly relates to a system and a method for controlling a fleet of UAVs for performing missions using multi-stage optimization.

BACKGROUND

Unmanned Aerial Vehicles (UAVs) are used across the world for civilian, commercial, and military missions. Examples of missions of the UAVs may include, but are not limited to, aerial photography missions, delivery services missions, mapping and surveying missions, infrastructure inspections missions, disaster response missions, search and rescue missions, and aviation missions. With continuous development of UAV technology, utilization of UAVs in various missions has increased. The ability to transport goods to consumers by UAVs provides advantages such as reduction of traffic congestion associated with ground vehicles and access to areas to which the delivery services by ground vehicles are limited. The areas to which the delivery services by the ground vehicles are limited may include mountainous terrain, remote camping location, crowded cities, and the like.

However, performing the various missions, such as for providing delivery services, by UAVs is complex. For example, the various missions performed by the UAVs may include multiple participants such as service consumers, UAVs operators, and UAVs service providers. As multiple participants are involved, multiple variables have to be considered for scheduling and controlling the UAVs for performing the various missions. The multiple variables may, for example, include payload dimensions, an initial terminal location, a destination terminal location, a request receiving date and a mission completion date, a selection of UAVs operators, a selection of one or more execution paths for the various missions, refueling, maintenance and overnight parking of UAVs, and the like. Due to such multiple variables, scheduling and controlling the UAVs for performing the various missions becomes challenging and complex.

Therefore, there is a need for improved systems and methods for scheduling and coordination of UAVs and necessary resources for performing the various missions.

SUMMARY

Drones have witnessed dramatic improvements in payload and range. Many companies consider using the drones for one or more missions because of their potential to reduce cost and waiting time for the one or more missions. However, complete utilization of the drones in the one or more missions has still not been achieved in many missions. For example, some missions include such as an aerial photography mission, a search and rescue mission, a surveillance and security mission, an environmental monitoring mission, an infrastructure inspection mission, a package delivery mission, a research mission, a disaster response mission, and the like. Additionally or alternatively, the one or more missions may be referred to as "one or more drone services".

Some embodiments are based on a realization that such underutilization of drones is caused at least in part by the restrictions and/or unjustified assumptions on the behavior and objectives of participants of the one or more missions. Examples of unjustified assumptions include that a drone can perform a mission within one leg of service, a drone can pick up or deliver any payload at any place specified by a customer, the drone can perform any mission, etc. These unjustified assumptions restrict the flexibility of the one or more missions performed by the drone resulting in the drone underutilization and failure to fulfill customers' requests.

It is an object of some embodiments to overcome these assumptions and provide an effective mission control system. The end participants of these missions include customers in need of one or more drone services, the drones operated by independent owners, and terminals for landing and fueling the drones that may also be operated by independent owners that could be the same or different from the owners of the drones.

These three independent participants have different objectives, different capabilities, and different needs. Joining them together within the same system, such as a management and control platform, results in solving a joint combinatorial problem needed to optimize the one or more drone services. This is because different objectives, capabilities, and needs of these independent participants can be considered by adding a corresponding degree of freedom and/or an optimization variable into the joint optimization problem under the umbrella of the common platform. Different embodiments consider some or all of these optimization variables.

For example, in some embodiments, because an initial terminal location and a destination terminal location are different from the locations of terminals suitable for landing a drone, selections of the terminals for initiating the mission, for example, picking up the payload and completing the mission, for example, delivering the payload, become optimization variables. The times for initiating the mission and completing the mission become additional optimization variables. Selecting the drone and an operator of the drone could be an optimization variable. Selecting one or more intermediate terminals for refueling could become an optimization variable. Balancing relocation and the one or more missions could become an optimization variable. In some implementations, the terminals are mobile and can relocate based on the needs of the drones and/or the customer. Selecting a location of the terminal for intermediate refueling or for initiating the mission or completing the mission could become an optimization variable. Additionally or alternatively, in some embodiments, the extent of fuel making the drone heavier is also an optimization variable. A type of drone is also an optimization variable. A balance of the utilization of a fleet of drones of different owners is also an optimization variable. Schedule requirements for the relocation and overnight parking are also optimization variables.

The extent of different optimization variables increases the complexity of the joint combinatorial problem of optimal control. Hence, it should not come as a surprise that to the best of our knowledge, the management and control platform uniting all these independent participants has not been considered before.

To that end, it is an object of some embodiments to provide a management and control platform configured for combinatorial control of the one or more missions performed by drones. Additionally or alternatively, it is an object of some embodiments to provide a management and control platform configured for considering different objectives, needs, and capabilities of independent participants of the platform such as the customers, the drone operators, and terminal operators for jointly optimizing and competing objectives.

Some embodiments perform scheduling and control of the drones to execute the one or more missions using a multi-stage optimization. Further, objectives of the multi-stage optimization include a simplification of optimization problems at each stage of the multi-stage optimization to perform a multi-objective optimization by considering the multiple optimization variables. Additionally or alternatively, the objectives of the multi-stage optimization include focusing on the needs and objectives of different participants of the management and control platform at different stages of the multi-stage optimization. Doing this in such a manner allows separating the optimization variables in time because the needs of the different participants are separated in time.

For example, some embodiments use two-stage optimization, in which, for the different stages of the multi-stage optimization, different optimization variables are fixed. For example, in one embodiment, during the first stage of the multi-stage optimization, previous assignments to the drones for the one or more missions are fixed. Hence, during the first stage of the multi-stage optimization, the joint combinatorial problem can select a feasible execution path for the one or more missions, for example, for picking up and delivering the payload on the terminals at times convenient for the customers, and feasible to at least some drones based on the previous assignments while leaving the previous assignment unchanged. During the second stage of the multi-stage optimization, the feasible execution path is fixed thereby preserving the time and location of the one or more missions as well as the schedule for landing at the terminals, while the drone assignment to perform the mission according to the fixed execution path is optimized.

Notably, this separation simplifies the size of each combinatorial problem performed at each stage of the multi-stage optimization. In addition, this staging is strategically selected based on specifics of the one or more missions allowing for the separation of the times of execution of the different stages, the type of optimizations at different stages, and the participants of the optimization.

For example, in one embodiment, during the first stage of the multi-stage optimization, only the optimization variables pertinent to customers and/or terminals are optimized, while the optimization variables pertinent to drone operators are allowed to remain suboptimal. For example, during the first stage of the multi-stage optimization, the feasible execution path for the one or more missions, for example, a package delivery mission can be selected heuristically based on the feasibility of mission considering mission requirements and previous mission assignments. This is beneficial because it allows for online exploration of the optimization variables pertinent to the customers. As a result, a customer may explore different options for pick-up and drop-off terminals at different times without running a computationally expensive optimization. Hence, the customer may explore different delivery options in real-time.

Similarly, during the second stage of the multi-stage optimization, the complex optimization for making the drone assignment is simplified by fixing execution paths. Also, the optimization is performed for optimization variables of drone operators without disturbing the optimization variables pertinent to the customers and/or terminal. Moreover, the second stage of the multi-stage optimization can be performed later after completion of the first stage of the multi-stage optimization, and/or can be performed multiple times for the same results of the first stage of the multi-stage optimization, and/or can be performed for different drones than drones that participated in the calculation of the first stage of the multi-stage optimization, and/or can be completed using different optimization methods than methods used during the first stage of the multi-stage optimization.

In other words, knowing the specifics of the one or more missions by drone operations allows different embodiments to separate the different stages of the multi-stage optimization in time and space by designing a sequence of optimization stages without or at least with an optional feedback loop.

In the end, multi-stage optimization of different embodiments allows to jointly consider the different objectives of the different participants in a computationally efficient manner and in the manner that makes sense for the specifics of the one or more missions. In addition, the multi-stage optimization of different embodiments allows the optimization of the different optimization variables of the different participants separately while considering their joint optimality. For example, during the first stage of multi-stage optimization, the mission is optimized individually for a new request to deliver a package, while during the second stage of the multi-stage optimization, the delivery is optimized jointly for all current requests.

Accordingly, one embodiment discloses a multi-stage optimization platform for controlling drones to perform a mission, wherein the multi-stage optimization platform is operatively connected with a fleet of drones of different types and a bank of drone landing terminals of different capabilities, comprising: at least one processor and a memory having instructions stored thereon that cause the at least one processor of the optimization platform to receive a request for a new mission including data indicative of specifics of the new mission; access a list of current assignments of the drones in the fleet of drones to perform other missions, wherein each of the current assignments specifies an execution path for performing the mission and a drone assigned to perform the mission according to the execution path, wherein each execution path specifies a sequence of terminals starting at an initial terminal for initiating the mission and ending at a final terminal for completing the mission and specifies times for the assigned drone to be serviced at each of the terminals in the sequence of terminals; perform a first stage of a multi-stage optimization based on the specifics of the new mission, the different types of drones, and the capabilities of the drone landing terminals subject to constraints fixing the current assignments of the drones to perform other missions to produce an assignment for the new mission specifying an execution path for the new mission, a timeline of the new mission according to the execution path and a drone assigned for the new mission; perform a second stage of the multi-stage optimization to update the list of current assignments by preserving the execution paths in the list of current assignments while changing the assignments of at least some of the drones to perform the package according to the execution path; and control one or a combination of the drones in the fleet of drones to perform one or more missions according to the updated list of assignments and the bank of terminals to service the fleet of drones performing the one or more missions according to the updated list of assignments.

Accordingly one embodiment discloses a system for controlling one or more UAVs of a fleet of UAVs for a mission. The system comprises a memory configured to store executable instructions, and at least one processor configured to execute the instructions to receive request data from a service consumer for the mission. The at least one processor is further configured to obtain a first list of assignments corresponding to one or more UAVs of the fleet of UAVs and obtain assignment data corresponding to each assignment of the first list of assignments. The at least one processor is further configured to determine an assignment for the one or more UAVs corresponding to the request data by performing a first stage of a multi-stage optimization subject to a first set of constraints. The first set of constraints is associated with the request data and the assignment data. The at least one processor is further configured to update the first list of assignments by adding the determined assignment to the first list of assignments. The at least one processor is further configured to determine a second list of assignments for the one or more UAVs by performing a second stage of the multi-stage optimization subject to a second set of constraints. The second set of constraints is associated with the updated first list of assignments. The at least one processor is further configured to control the one or more UAVs of the fleet of UAVs based on the second list of assignments to perform the mission.

Accordingly, another embodiment discloses a method for controlling one or more UAVs of a fleet of UAVs for a mission. The method comprises receiving request data from a service consumer for the mission. The method further comprises obtaining a first list of assignments corresponding to one or more UAVs of the fleet of UAVs. The method further comprises obtaining assignment data corresponding to each assignment of the first list of assignments. The method further comprises determining an assignment for the one or more UAVs corresponding to the request data by performing a first stage of a multi-stage optimization subject to a first set of constraints. The first set of constraints is associated with the request data and the assignment data. The method further comprises updating the first list of assignments by adding the determined assignment to the first list of assignments. The method further comprises determining a second list of assignments for the one or more UAVs by performing a second stage of the multi-stage optimization subject to a second set of constraints. The second set of constraints is associated with the updated first list of assignments. The method further comprises controlling the one or more UAVs of the fleet of UAVs based on the second list of assignments to perform the mission.

Accordingly, yet another embodiment discloses a non-transitory computer readable storage medium embodied thereon a program executable by a processor for performing a method for controlling one or more UAVs of a fleet of UAVs for a mission. The method comprises receiving request data from a service consumer for the mission. The method further comprises obtaining a first list of assignments corresponding to one or more UAVs of the fleet of UAVs. The method further comprises obtaining assignment data corresponding to each assignment of the first list of assignments. The method further comprises determining an assignment for the one or more UAVs corresponding to the request data by performing a first stage of a multi-stage optimization subject to a first set of constraints. The first set of constraints is associated with the request data and the assignment data. The method further comprises updating the first list of assignments by adding the determined assignment to the first list of assignments. The method further comprises determining a second list of assignments for the one or more UAVs by performing a second stage of the multi-stage optimization subject to a second set of constraints. The second set of constraints is associated with the updated first list of assignments. The method further comprises controlling the one or more UAVs of the fleet of UAVs based on the second list of assignments to perform the mission.

BRIEF DESCRIPTION OF THE DRAWINGS

Figure 1A:
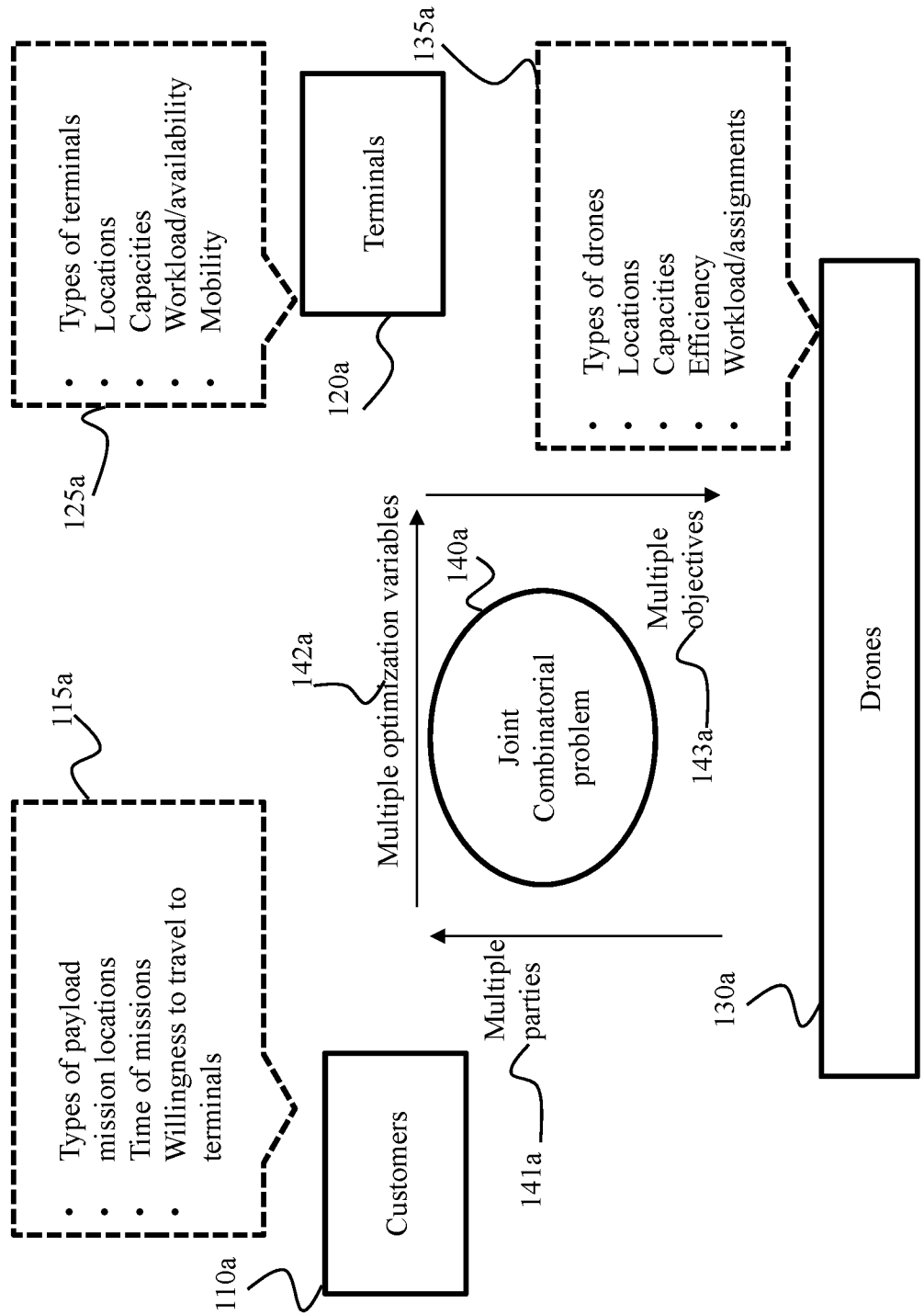

Having thus described example embodiments of the disclosure in general terms, reference will now be made to the accompanying drawings, which are not necessarily drawn to scale, and wherein:

FIG. 1A shows a schematic of a joint combinatorial problem addressed by some embodiments to enable a platform for controlling drones to perform a mission.

Figure 1B:
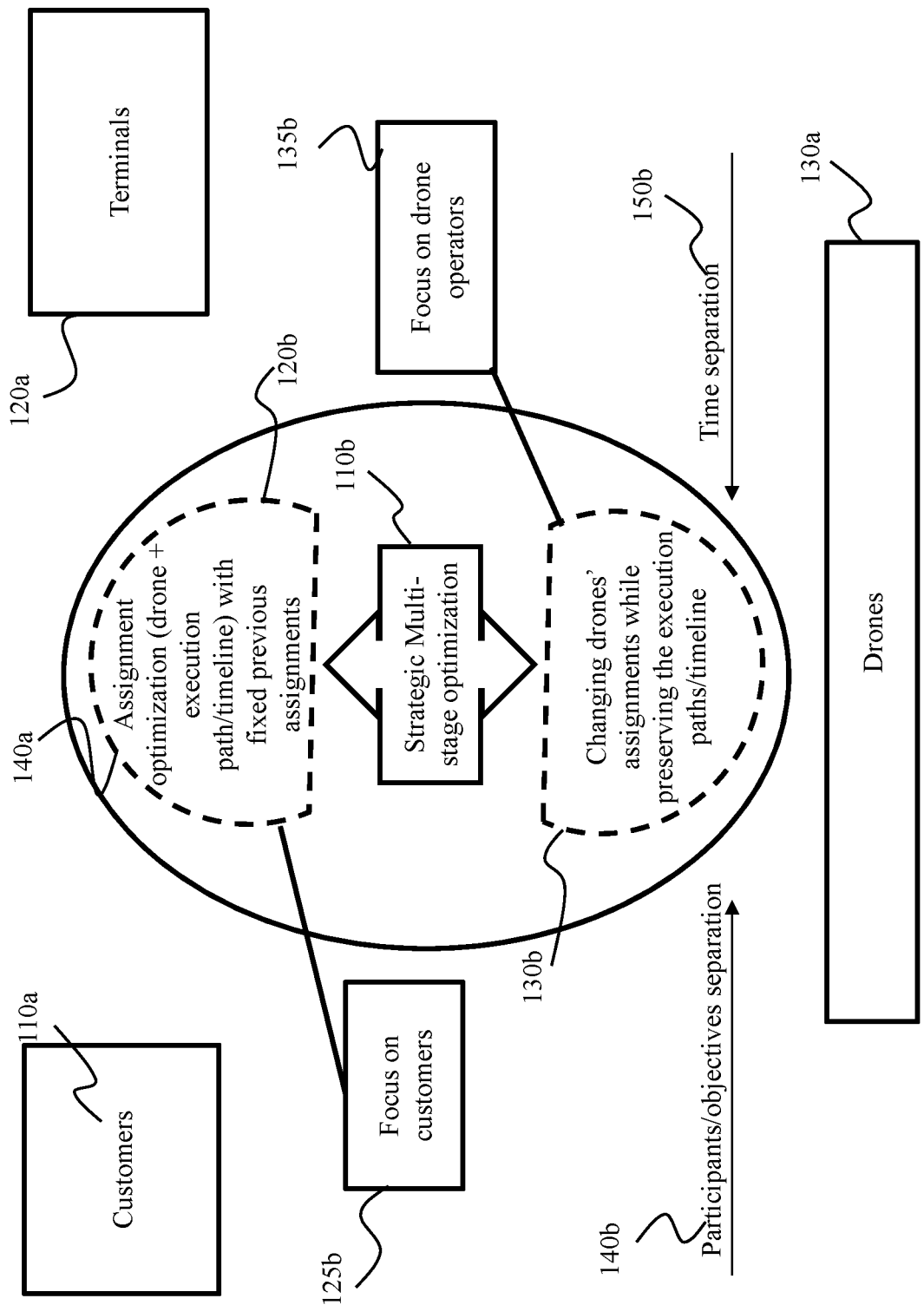

FIG. 1B shows a schematic of a multi-stage optimization platform for controlling drones to perform the mission, according to some embodiments.

Figure 1C:
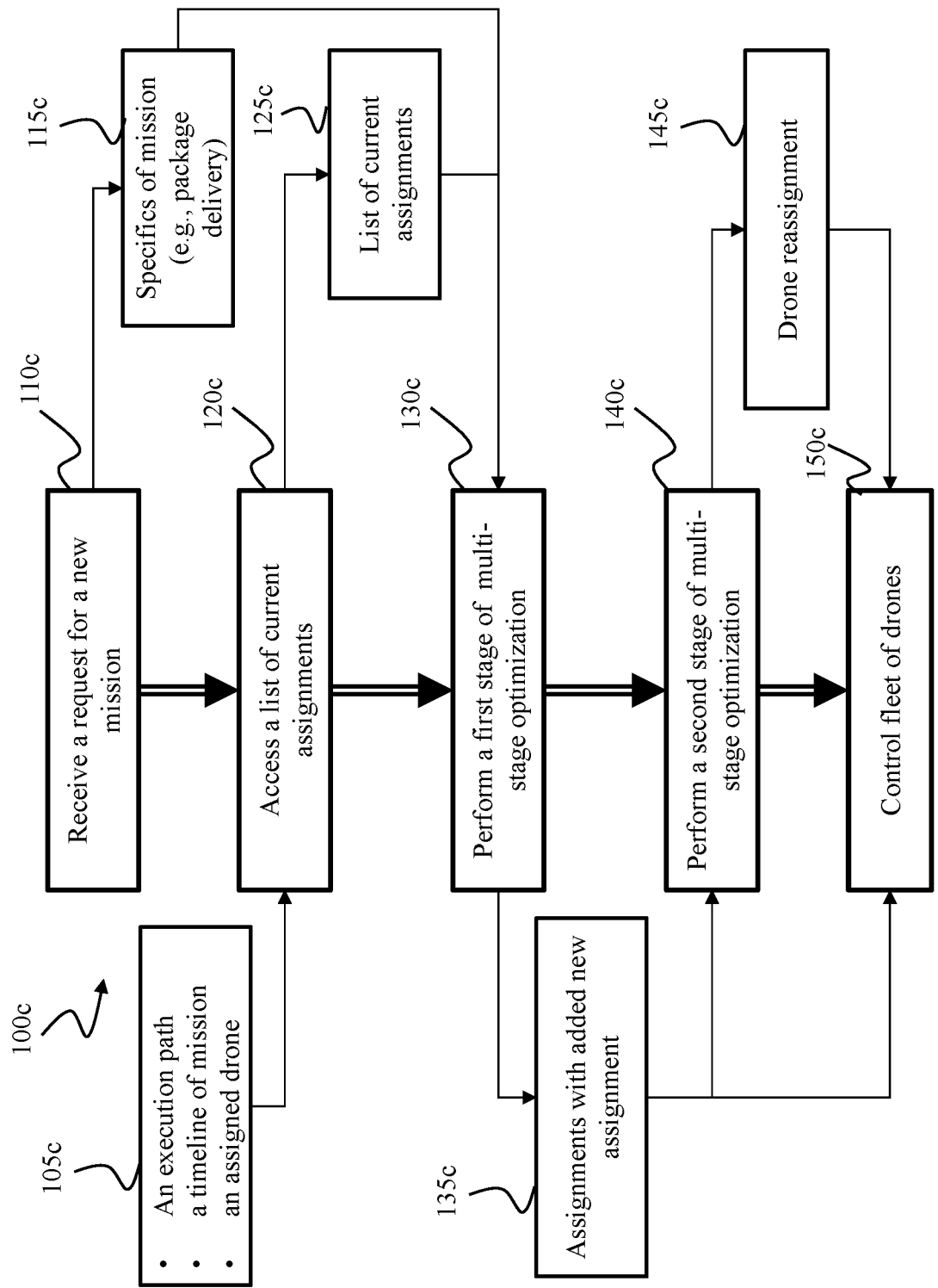

FIG. 1C shows a block diagram of method performed by the multi-stage optimization platform for controlling the drones to perform the mission, according to some embodiments.

Figure 1D:
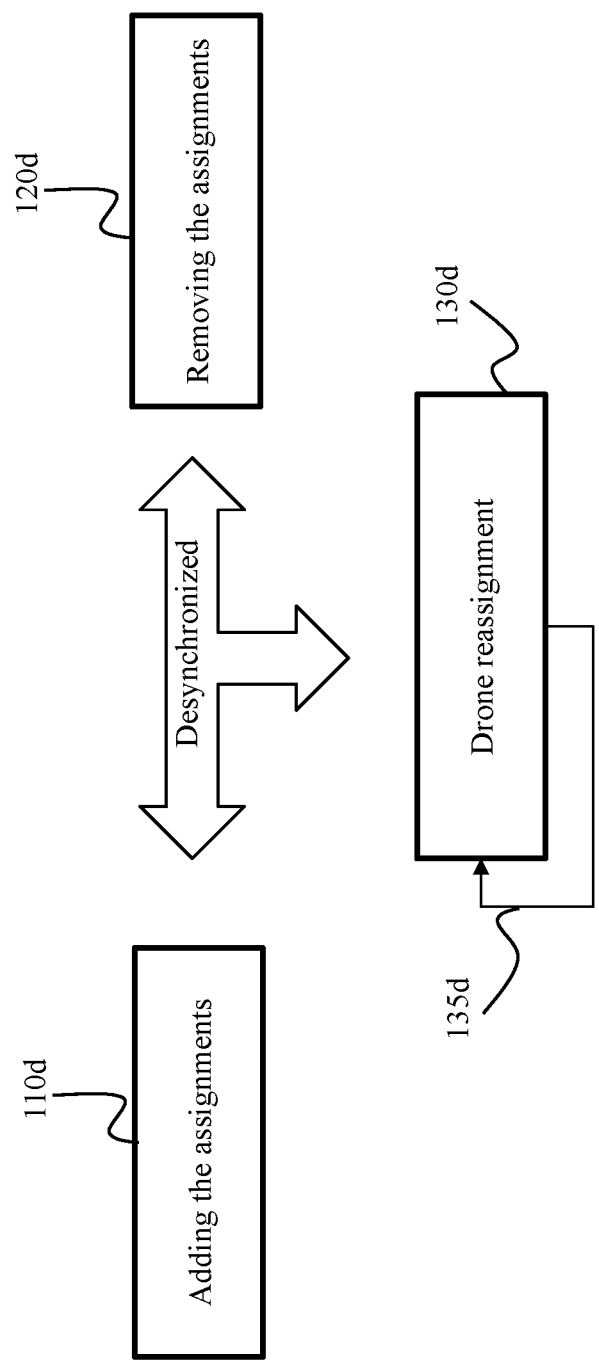

FIG. 1D shows a schematic of desynchronization of different stages of multi-stage optimization employed by some embodiments.

Figure 1E:
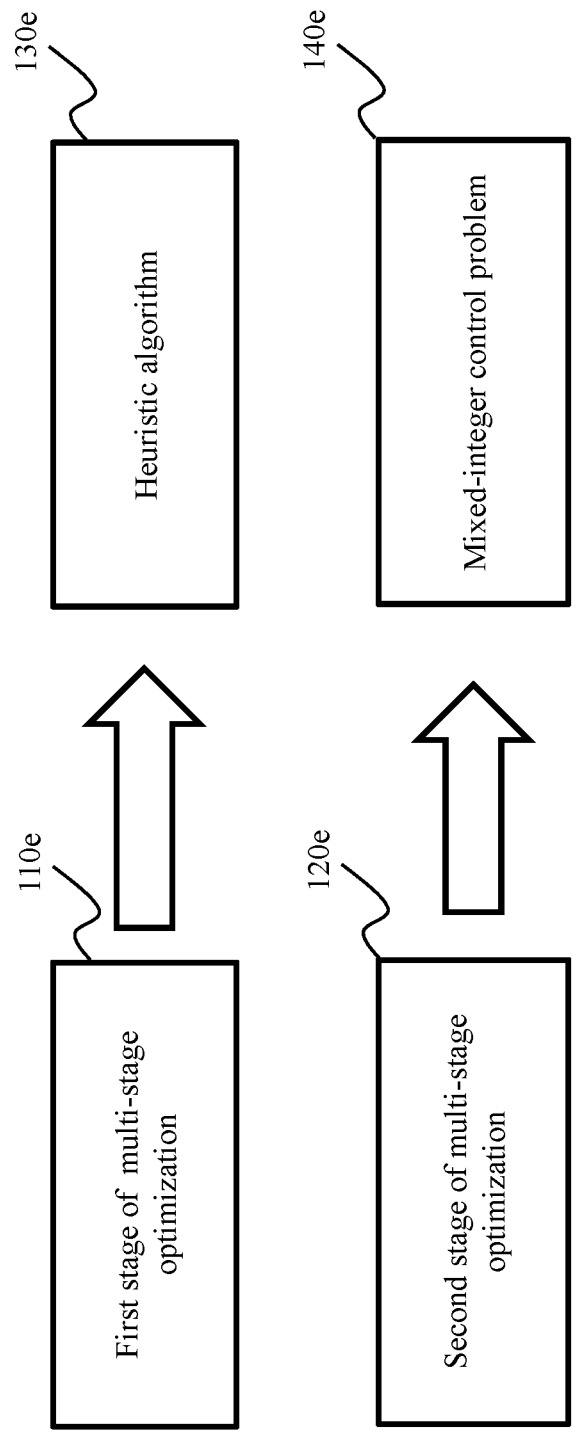

FIG. 1E shows a schematic of different methods used for performing the different stages of the multi-stage optimization, according to some embodiments.

Figure 2A:
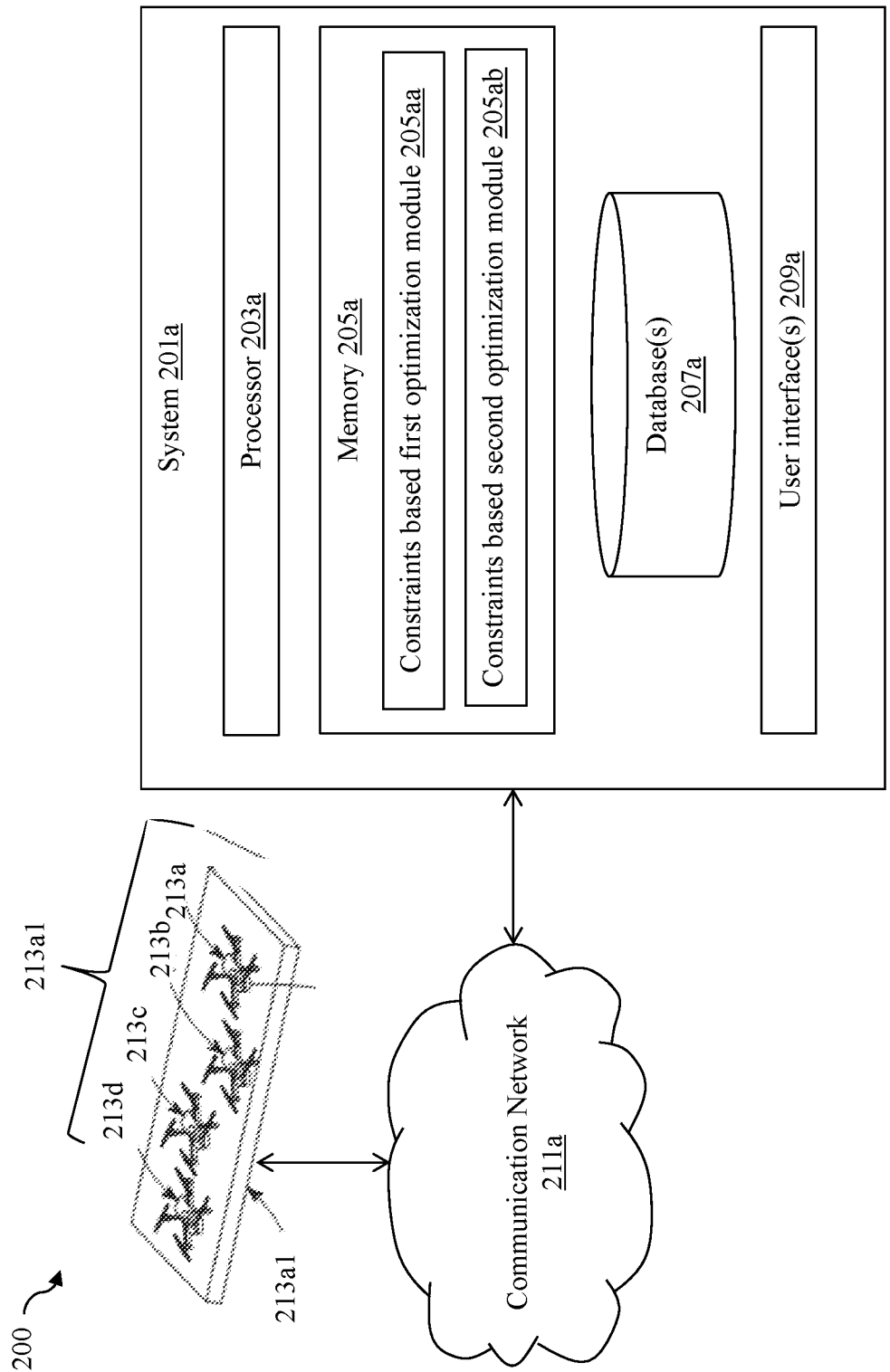

FIG. 2A illustrates an environment of a system implemented for controlling a fleet of Unmanned Aerial Vehicles (UAVs), in accordance with an example embodiment.

Figure 2B:
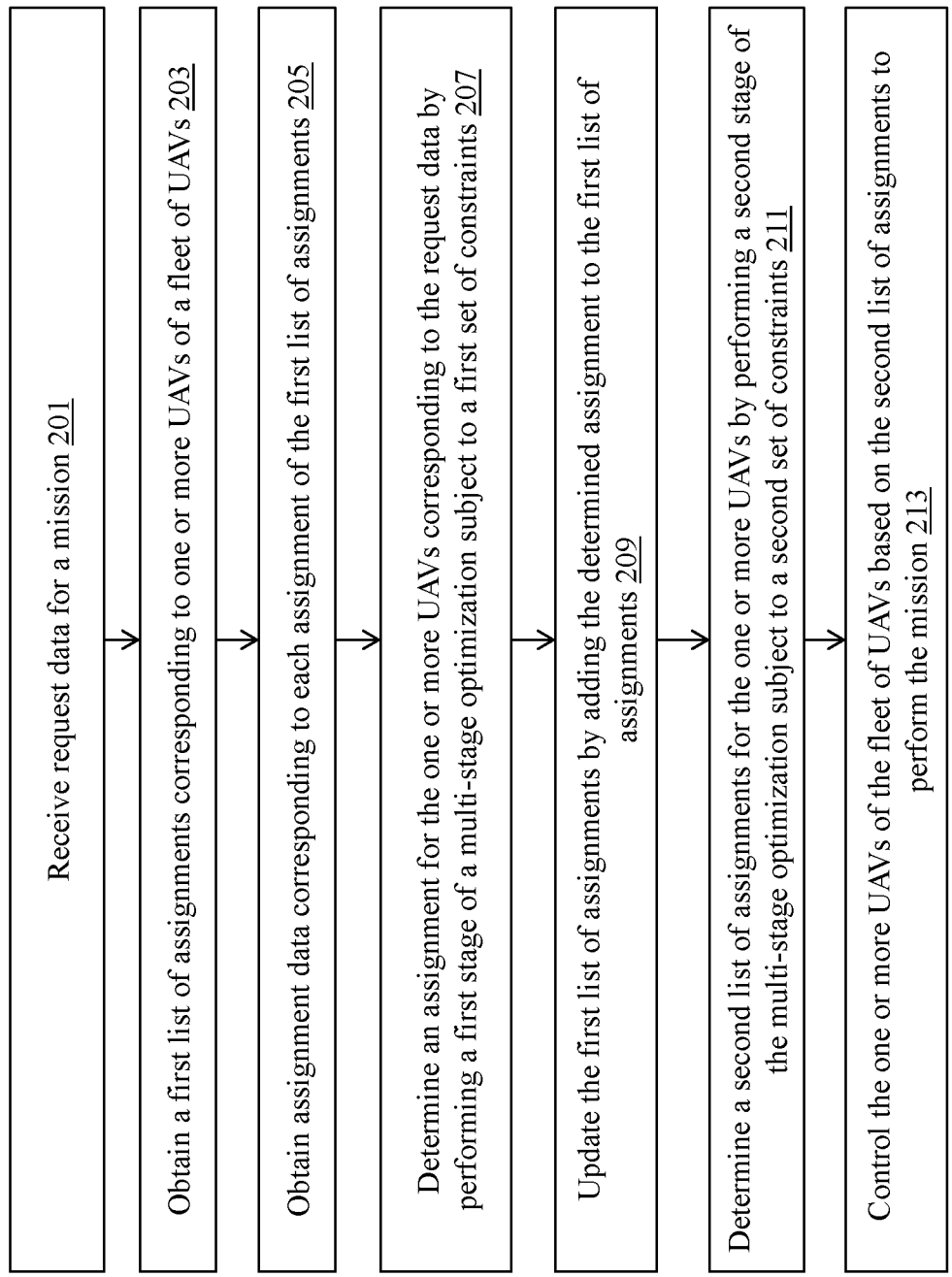

FIG. 2B illustrates a flowchart of a method for controlling the fleet of UAVs, in accordance with an example embodiment.

Figure 2C:
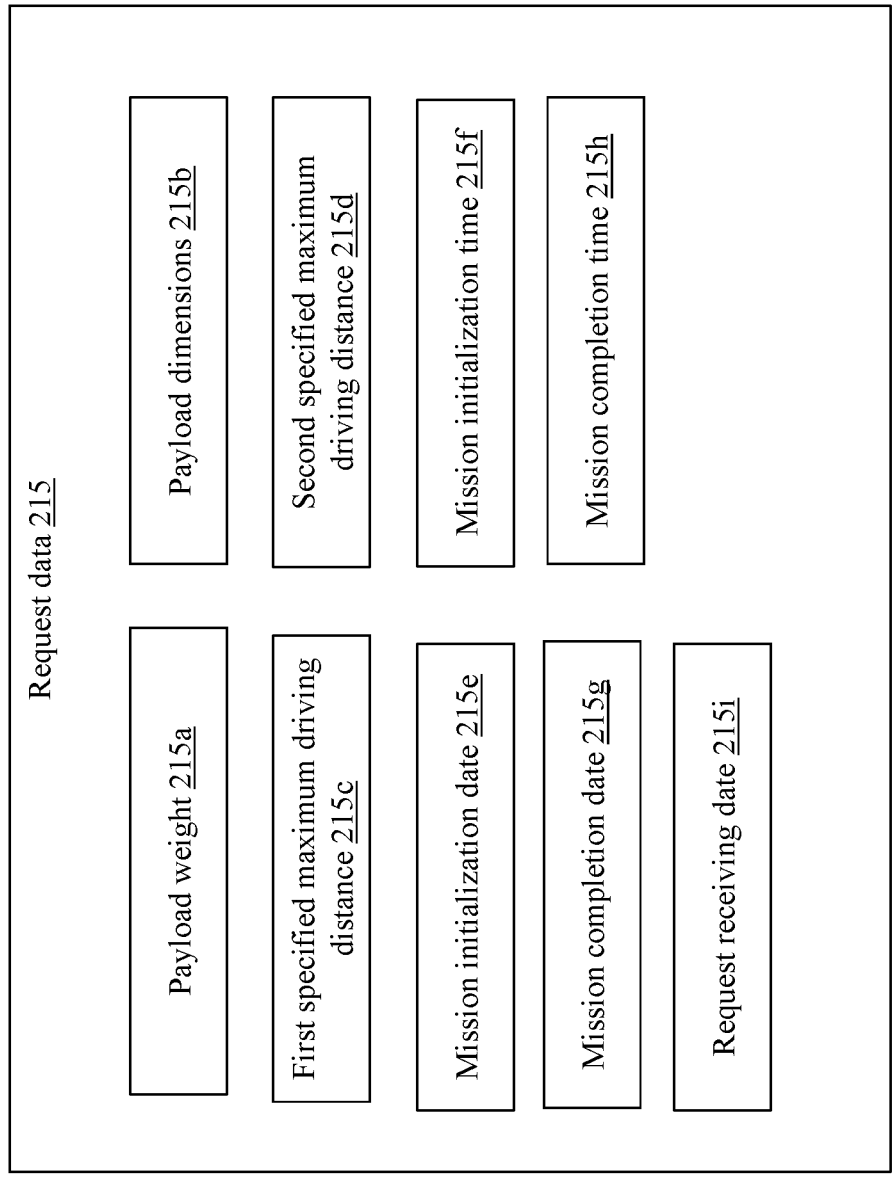

FIG. 2C illustrates a block diagram for request data, in accordance with one or more example embodiments.

Figure 2D:
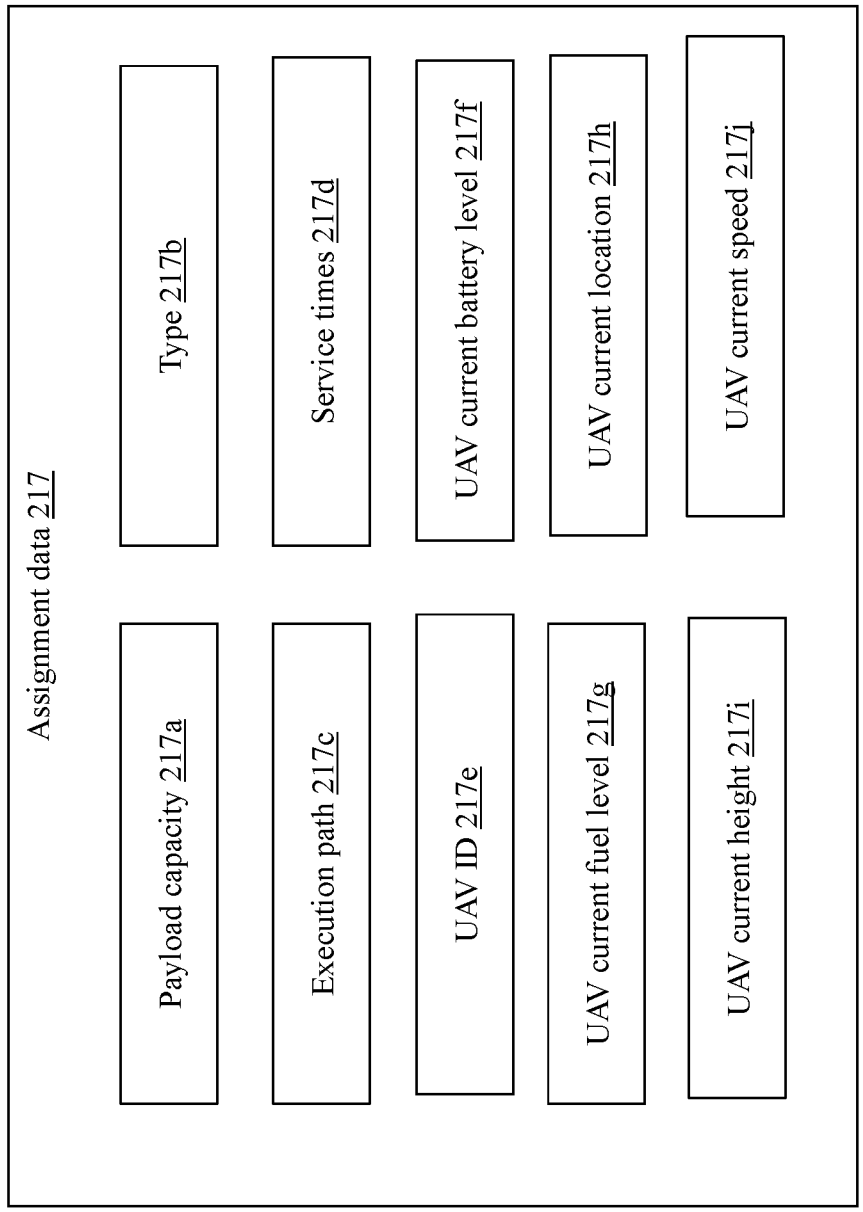

FIG. 2D illustrates a block diagram for assignment data, in accordance with one or more example embodiments.

Figure 2E:
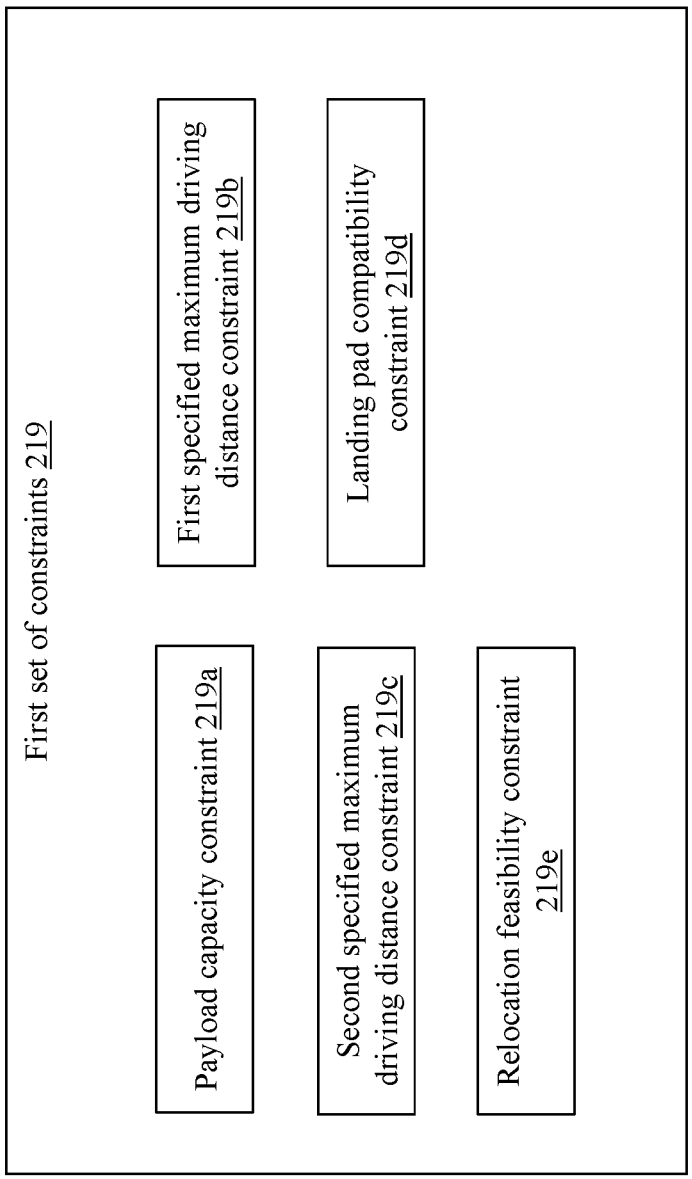

FIG. 2E illustrates a block diagram for a first set of constraints, in accordance with one or more example embodiments.

Figure 2F:
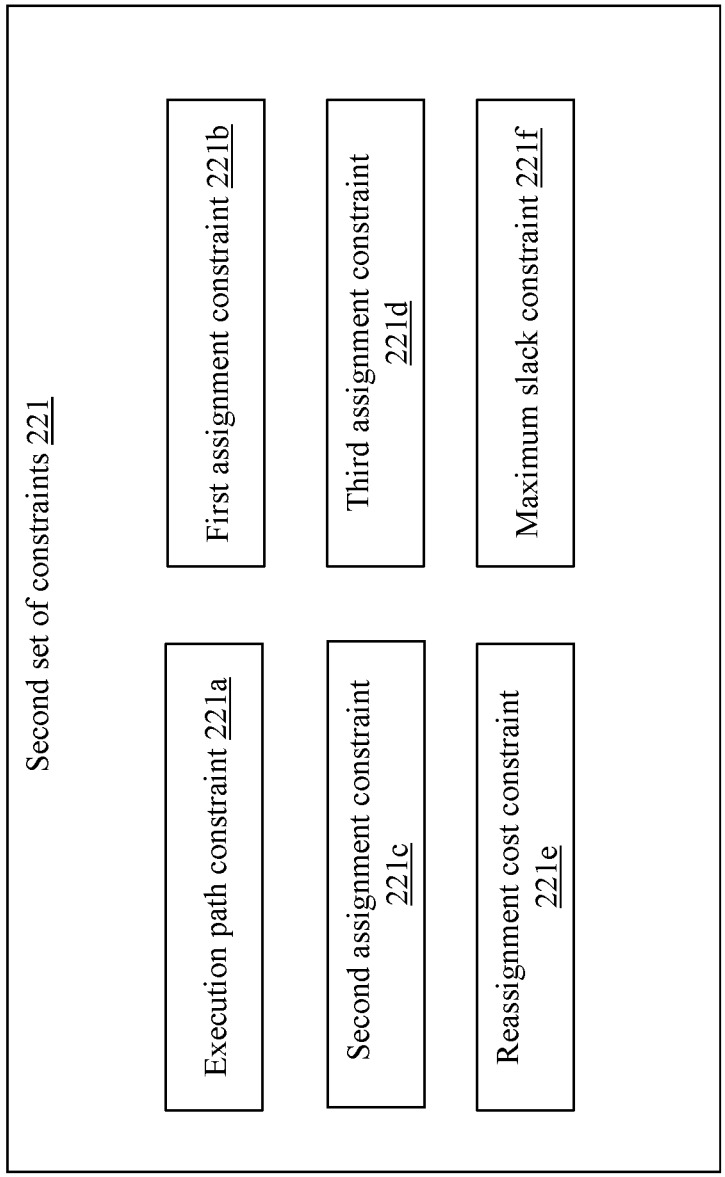

FIG. 2F illustrates a block diagram for a second set of constraints, in accordance with one or more example embodiments.

Figure 3:
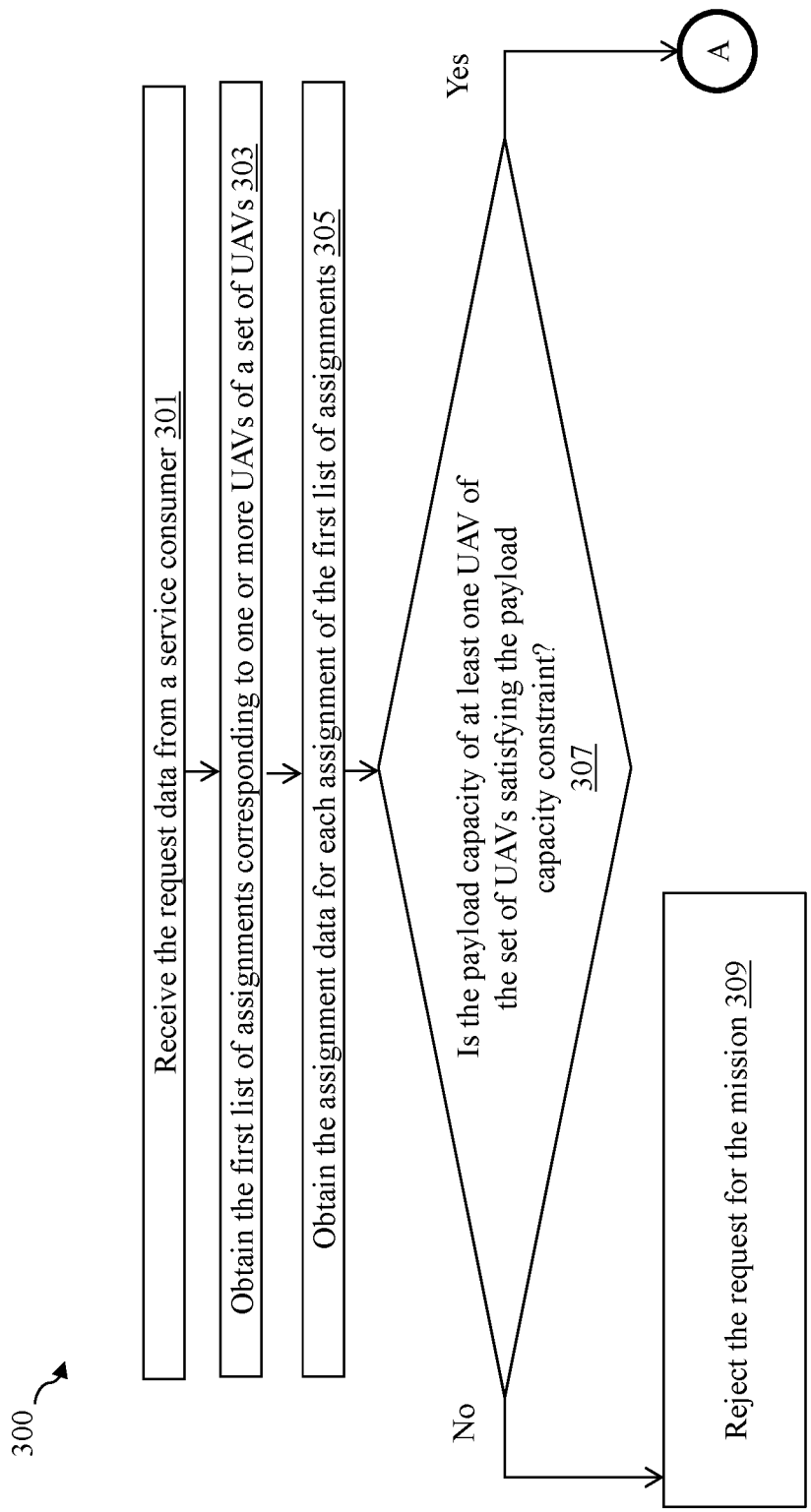
Figure 3:
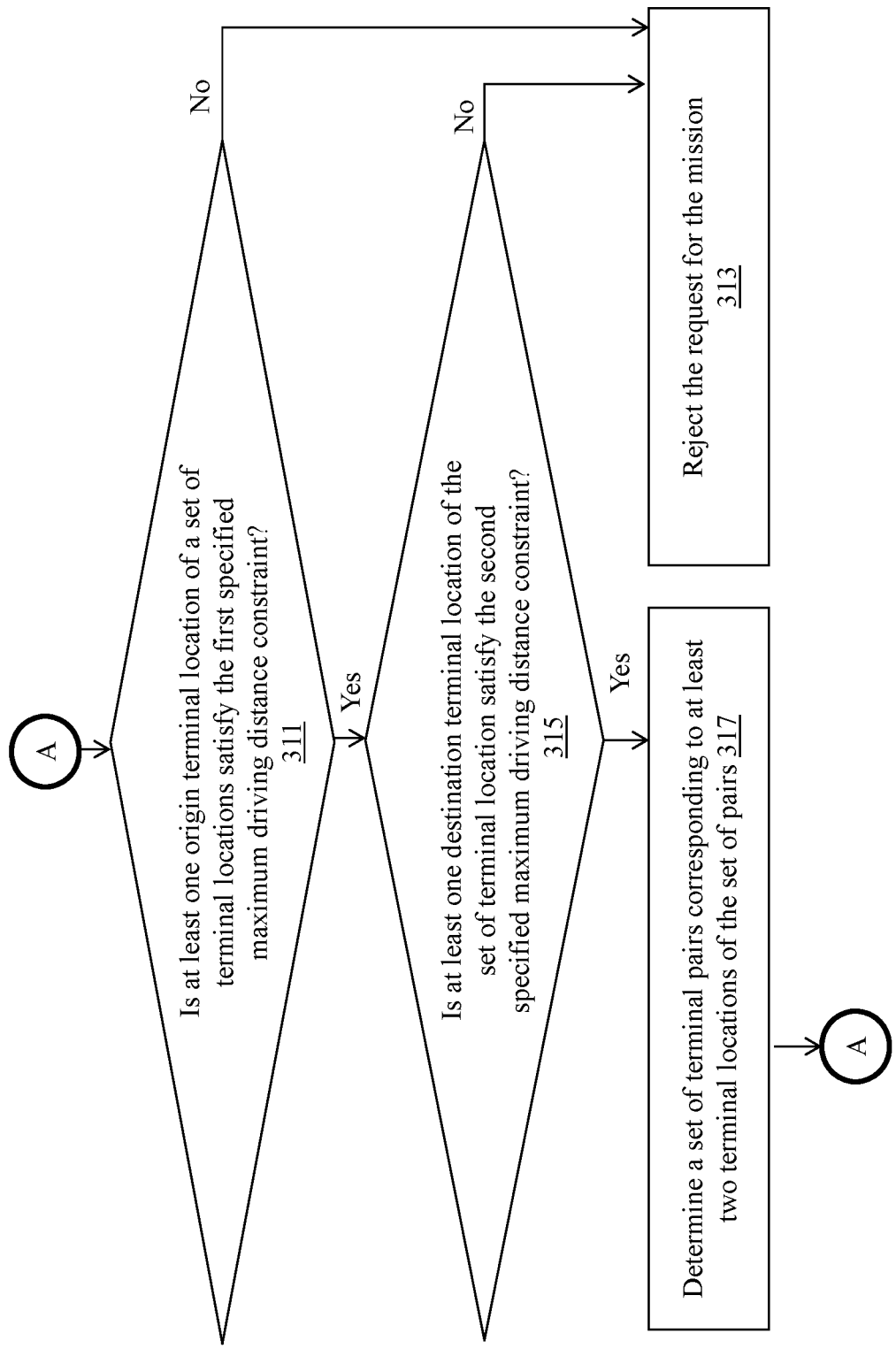
Figure 3:
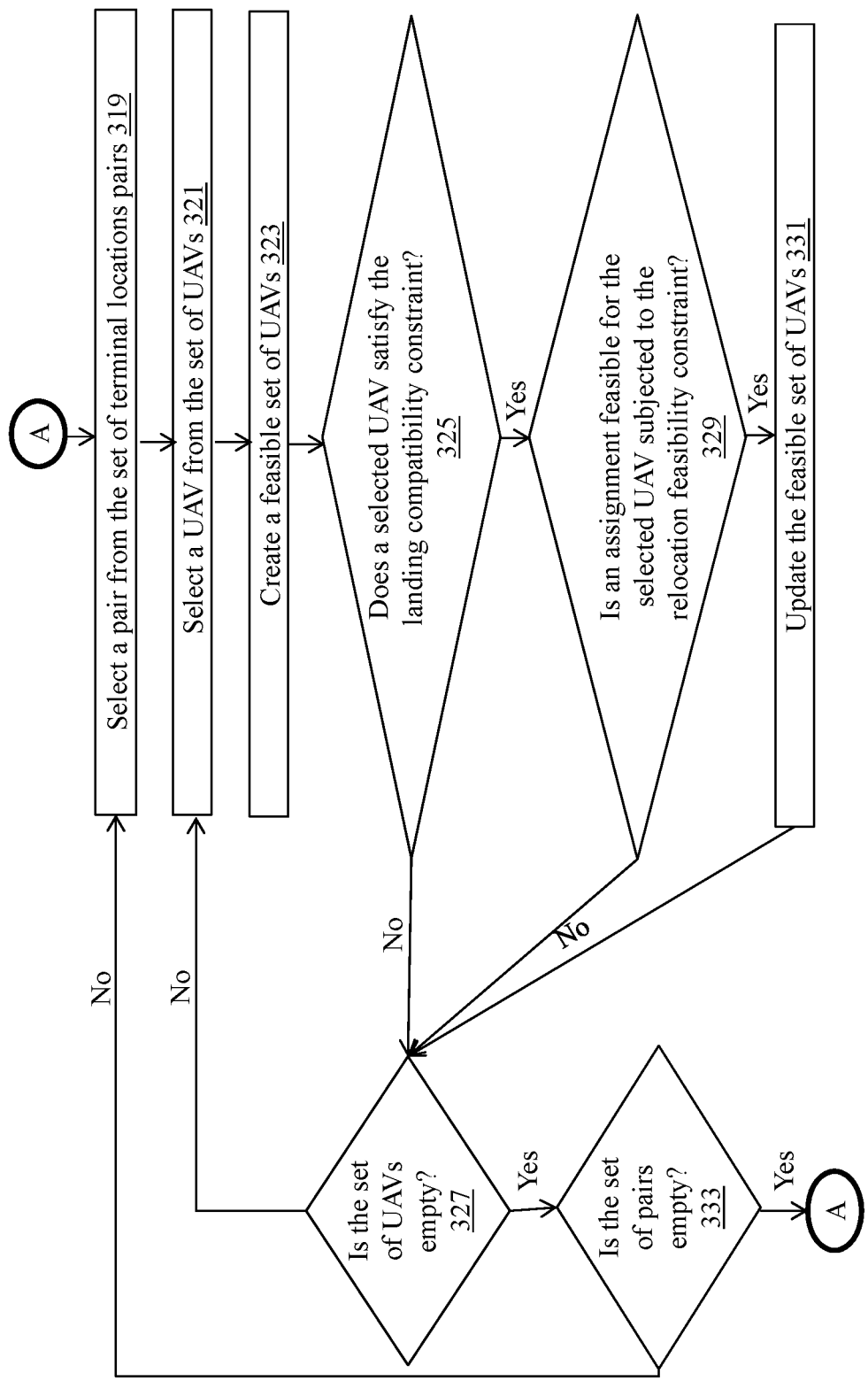
Figure 3:
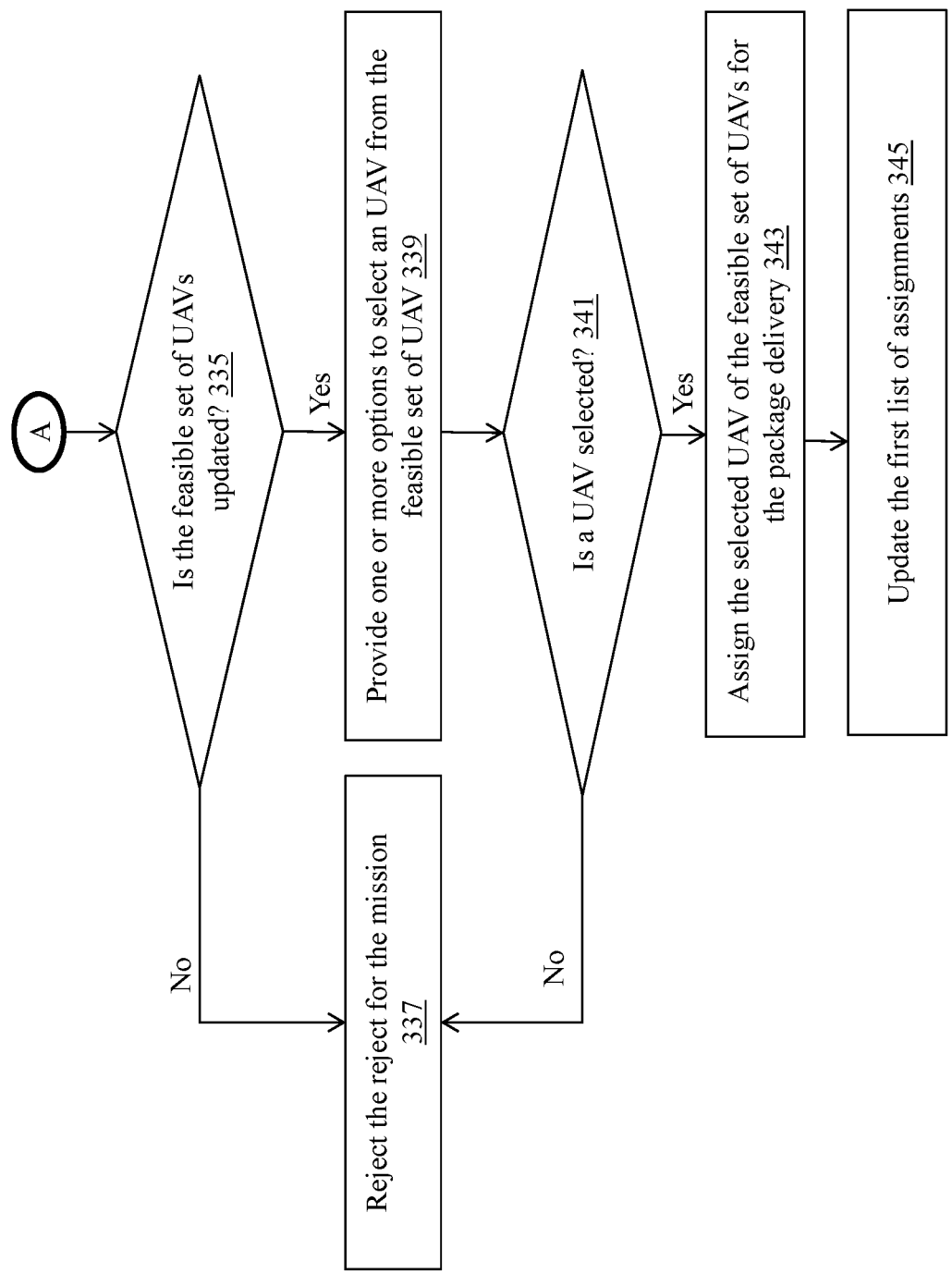

FIG. 3 illustrates a flowchart of a method of a first stage of a multi-stage optimization using a heuristic algorithm, in accordance with an example embodiment.

Figure 4:
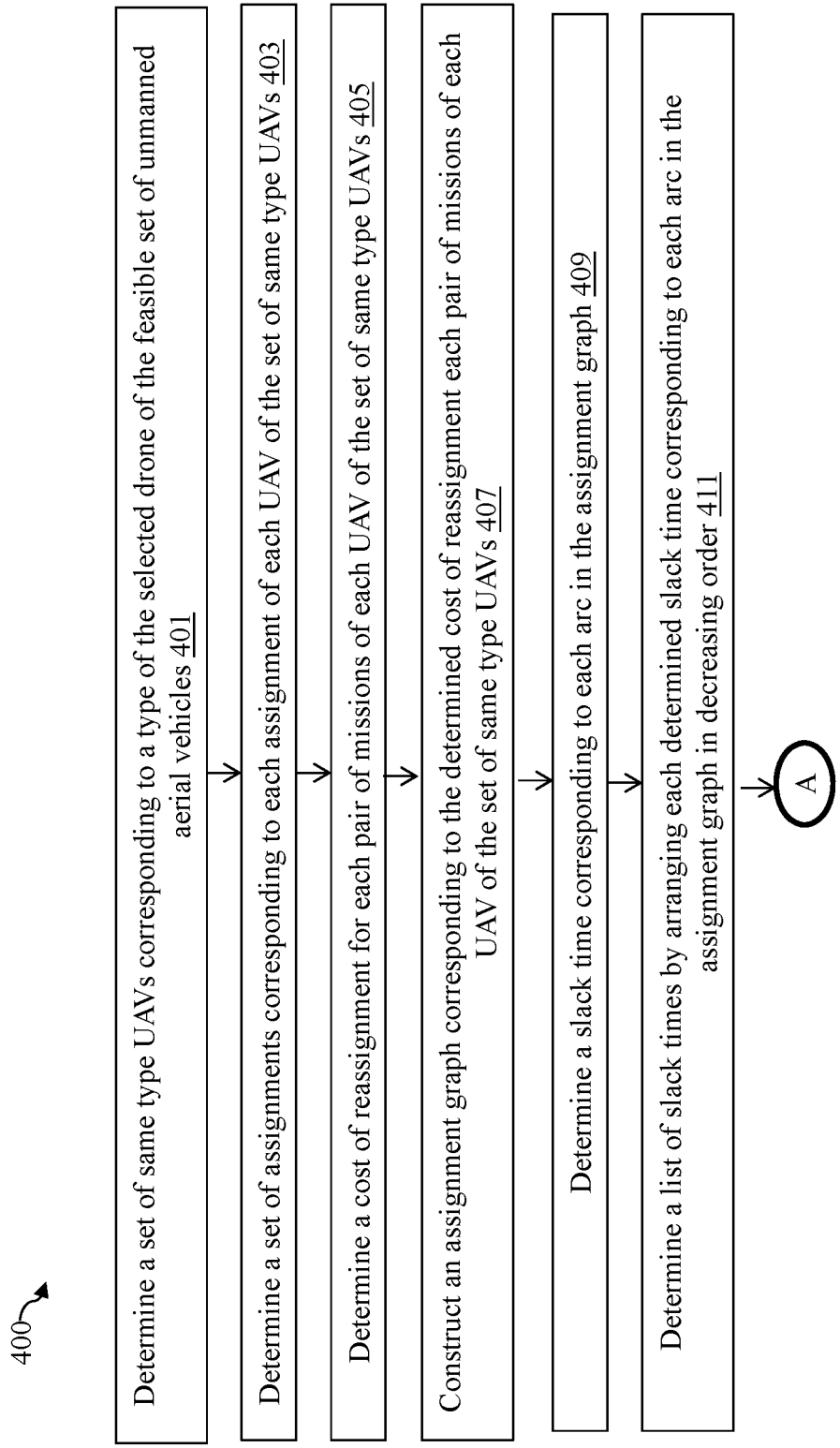
Figure 4:
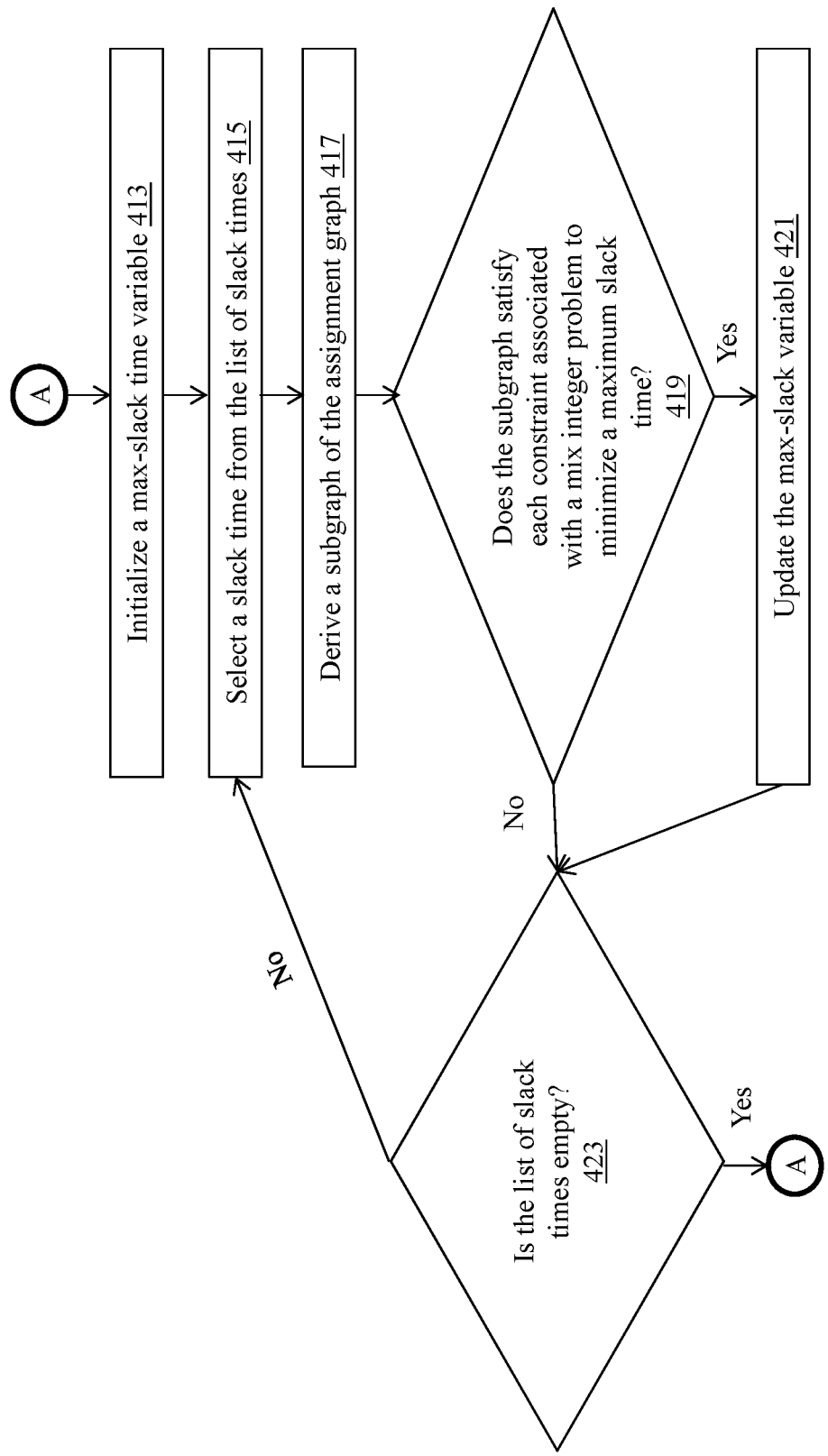
Figure 4:
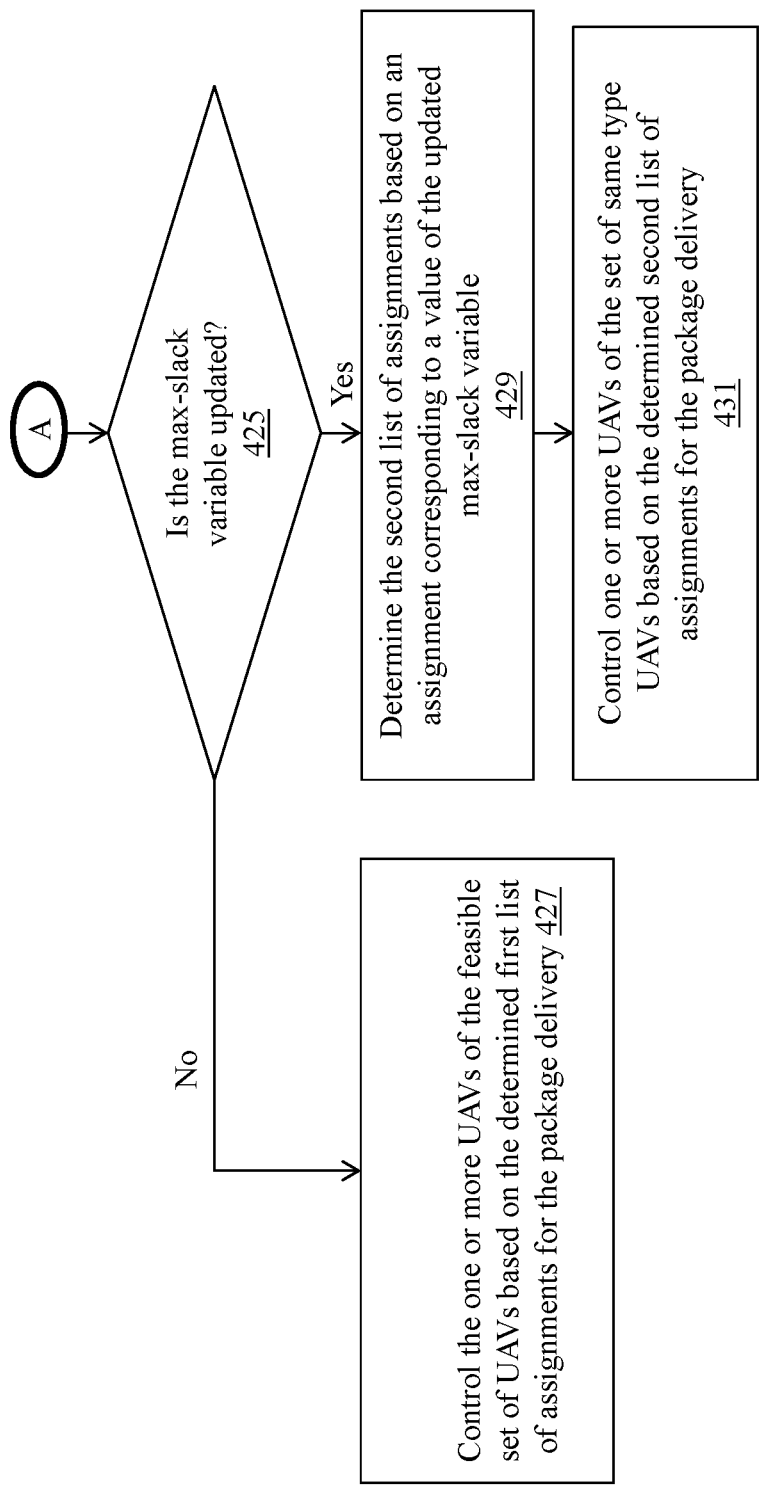

FIG. 4 illustrates a flowchart of a method of a second stage of the multi-stage optimization using a mixed integer control problem, in accordance with an embodiment.

Figure 5A:
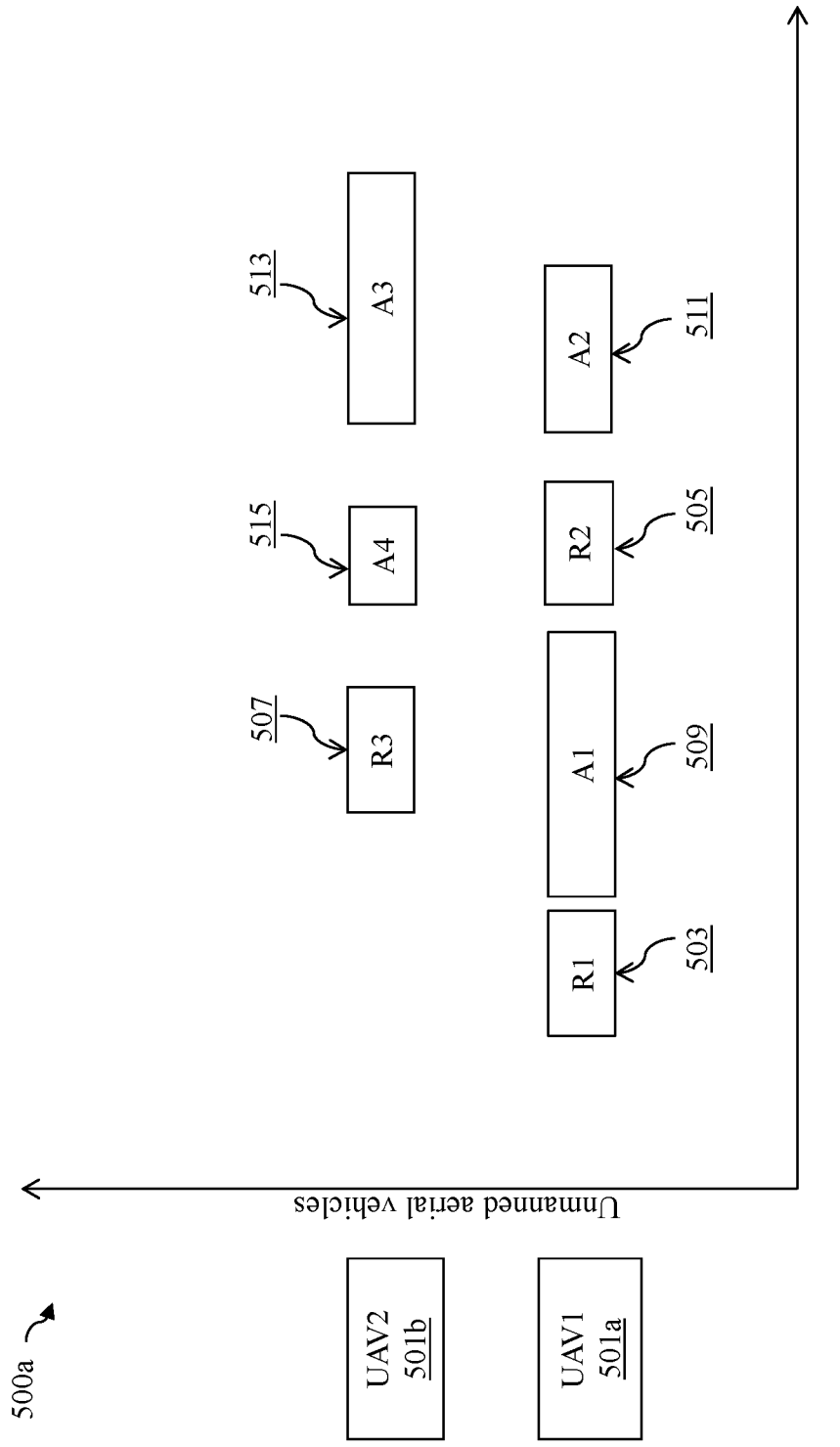

FIG. 5A illustrates a graph corresponding to assignments of one or more UAVs, in accordance with an example embodiment.

Figure 5B:
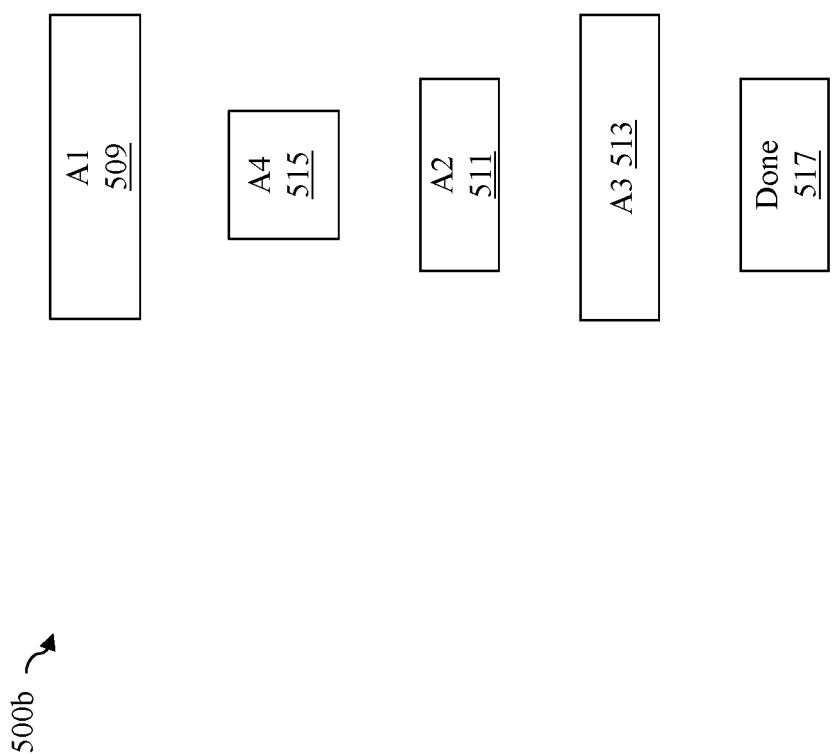

FIG. 5B illustrates a first step of constructing an assignment graph, in accordance with one or more example embodiments.

Figure 5C:
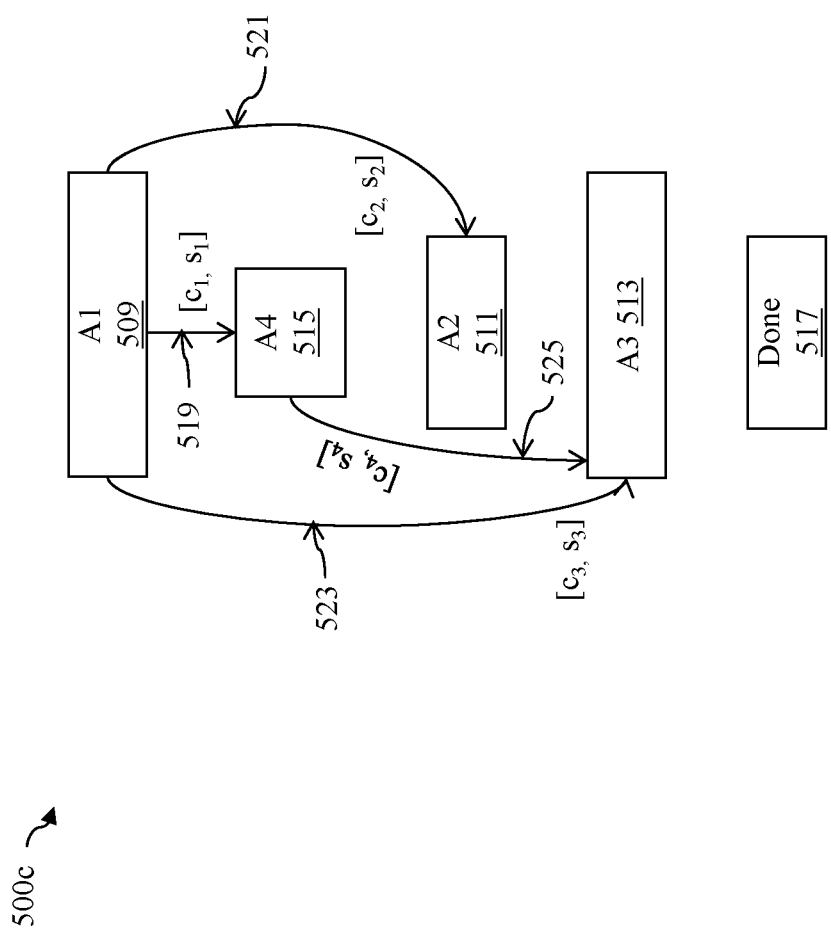

FIG. 5C illustrates a second step of constructing the assignment graph, in accordance with one or more example embodiments.

Figure 5D:
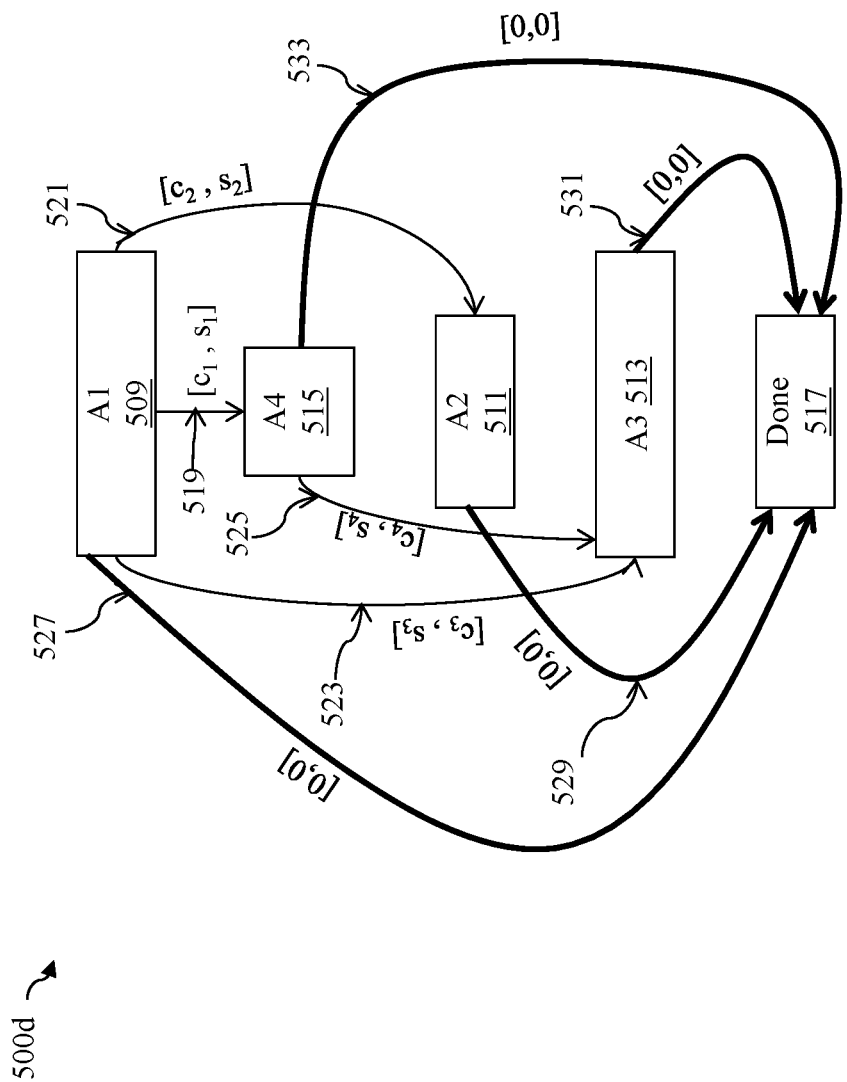

FIG. 5D illustrates a third step of constructing the assignment graph, in accordance with one or more example embodiments.

Figure 5E:
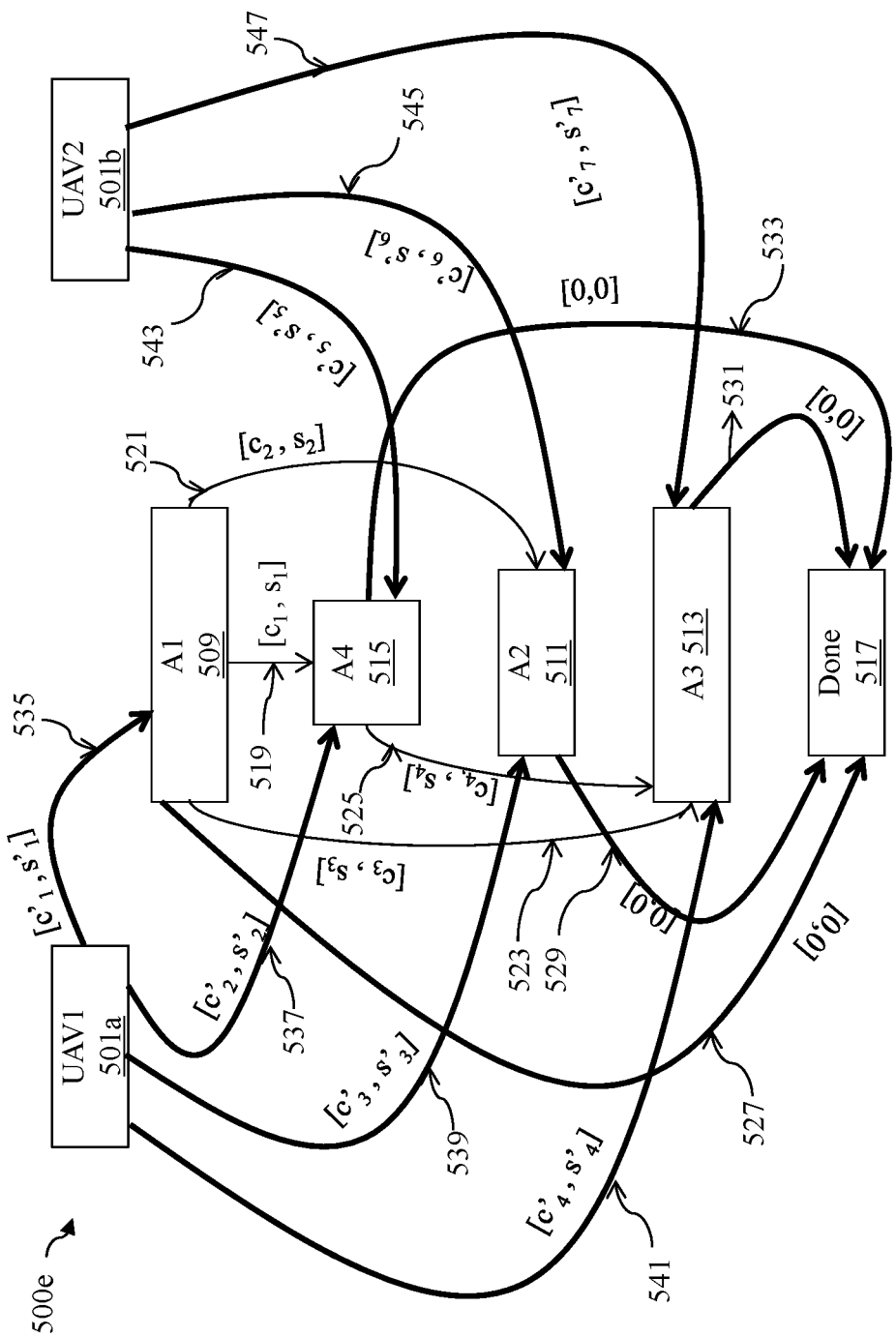

FIG. 5E illustrates a fourth step of constructing the assignment graph, in accordance with one or more example embodiments.

Figure 5F:
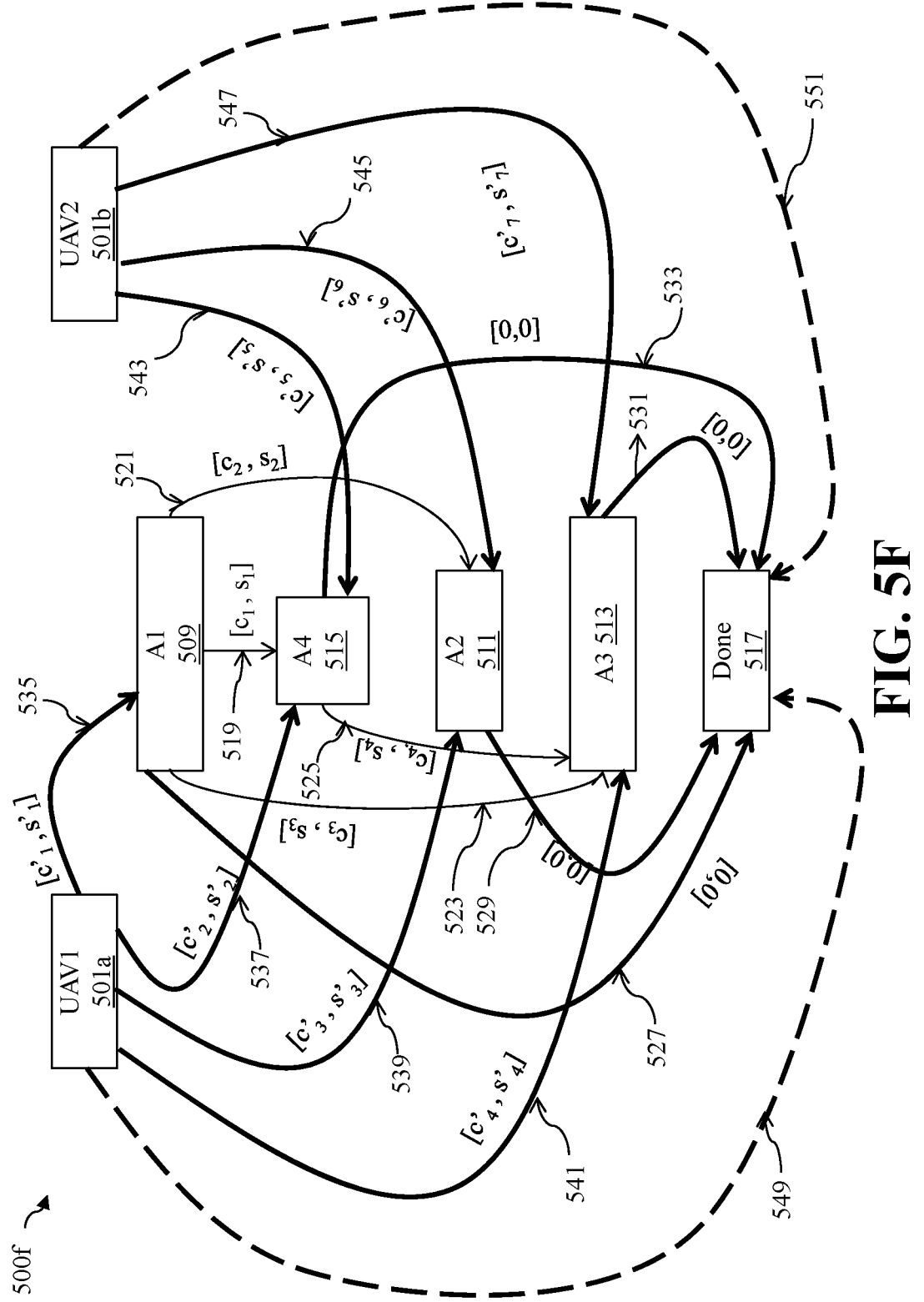

FIG. 5F illustrates a final step of constructing the assignment graph, in accordance with one or more example embodiments.

Figure 6:
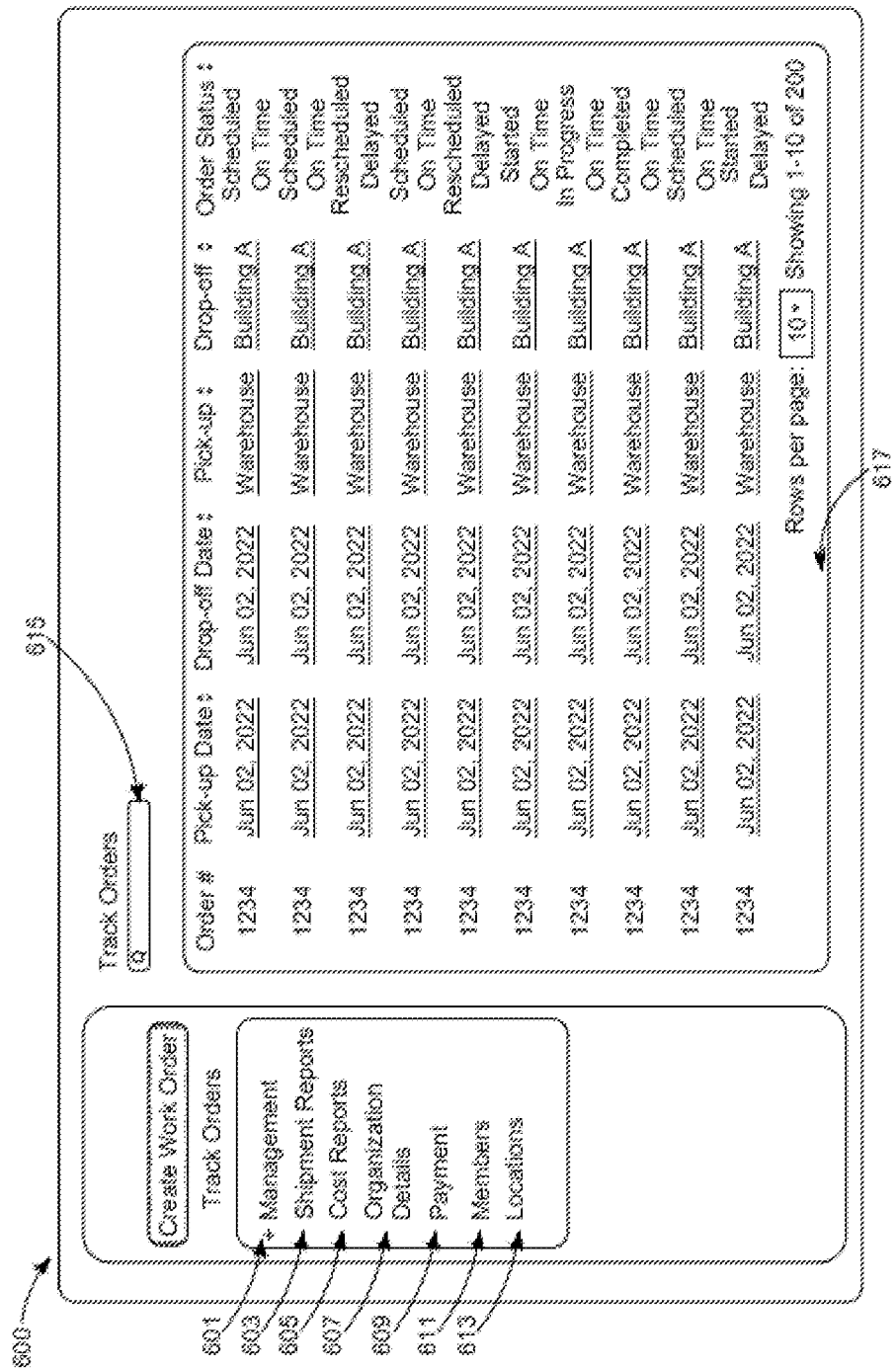

FIG. 6 illustrates a consumer interface for receiving the request data, in accordance with an embodiment.

Figure 7:
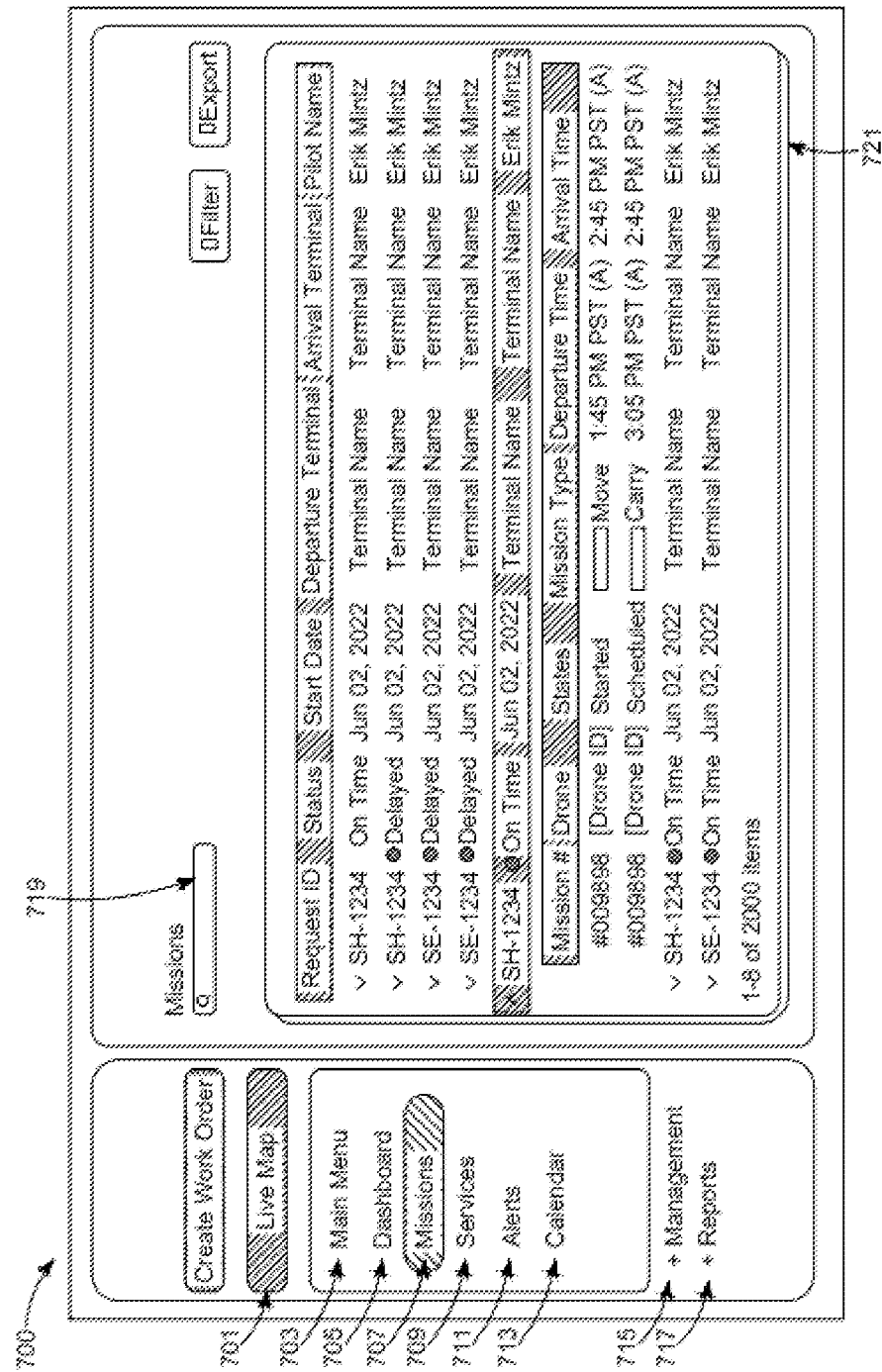

FIG. 7 illustrates a shipment interface for receiving shipment data, in accordance an example embodiment.

Figure 8:
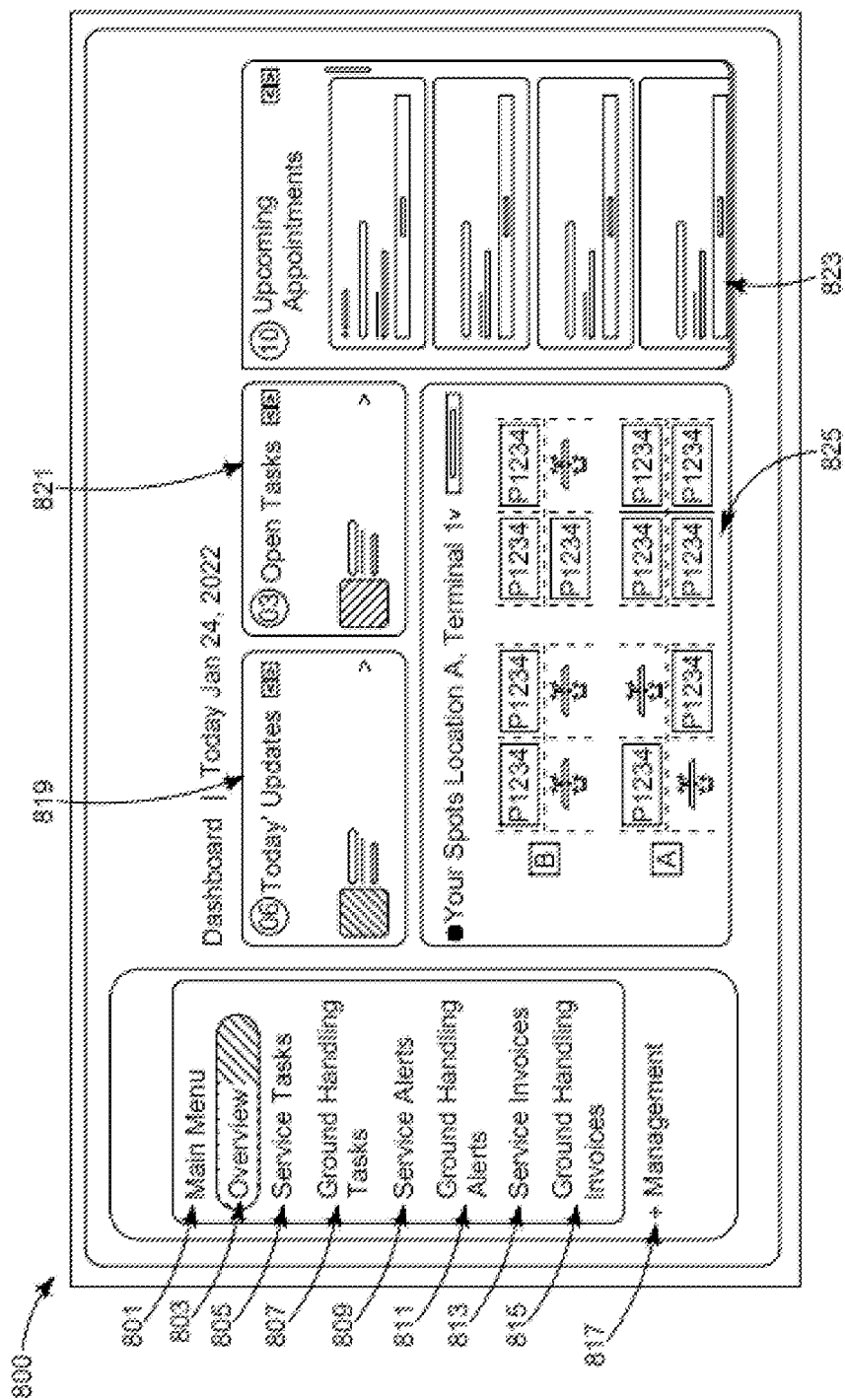

FIG. 8 illustrates a service interface for receiving service data, in accordance an example embodiment.

Figure 9:
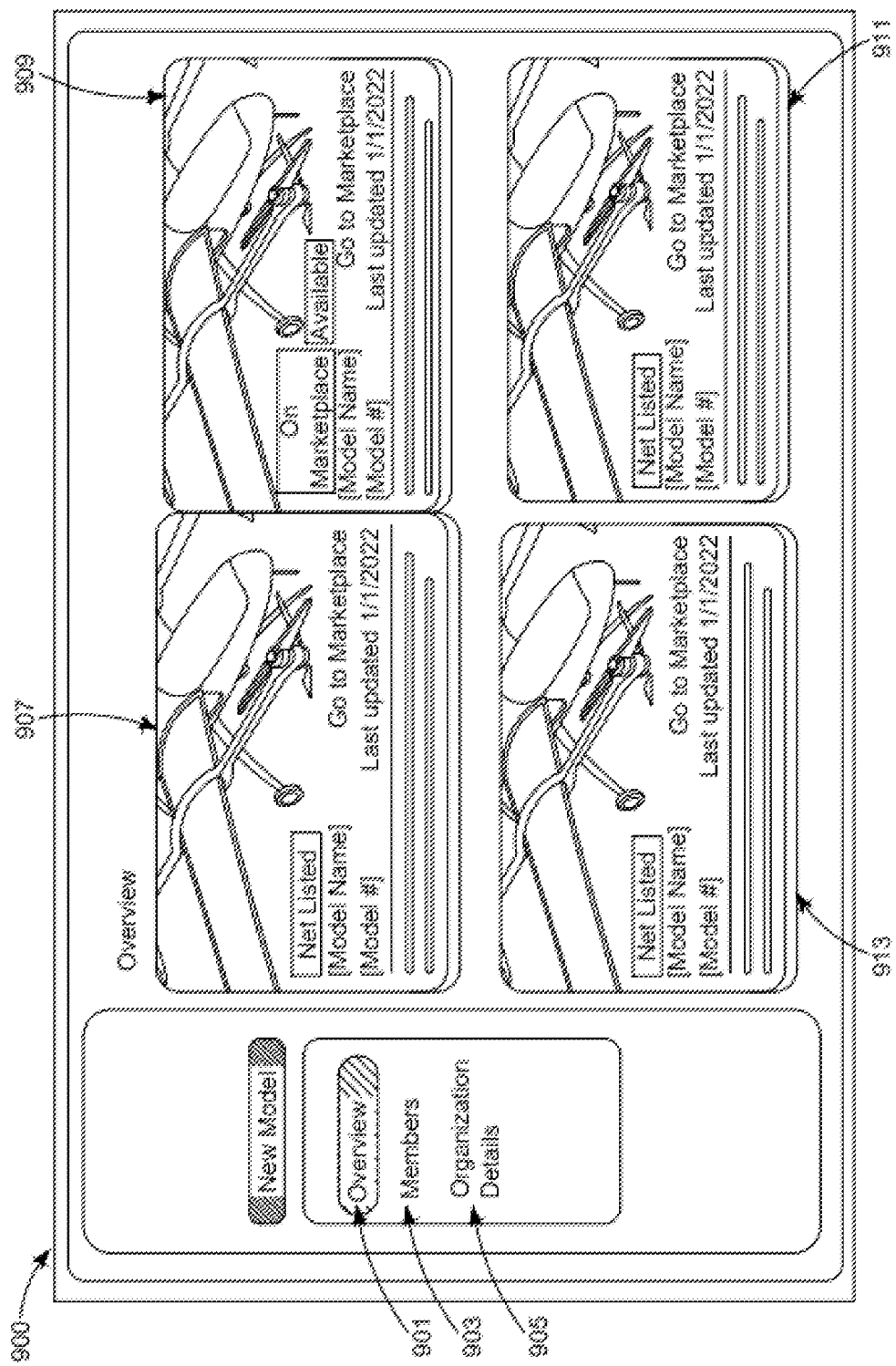

FIG. 9 illustrates a manufacturer interface for receiving manufacture data, in accordance an example embodiment.

Figure 10A:
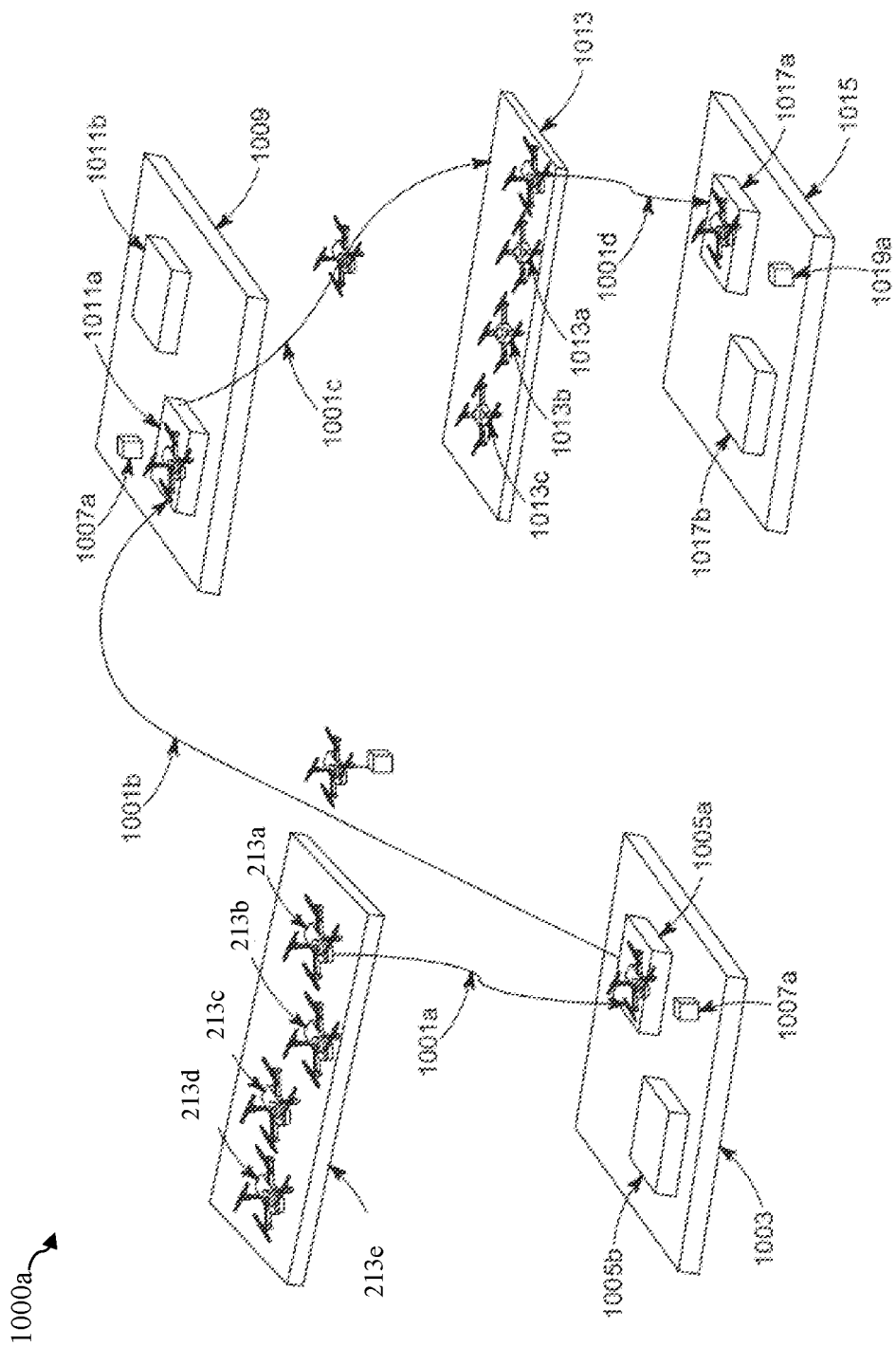

FIG. 10A illustrates controlling of a UAV of the fleet of UAVs for a package delivery mission, in accordance with an example embodiment.

Figure 10B:
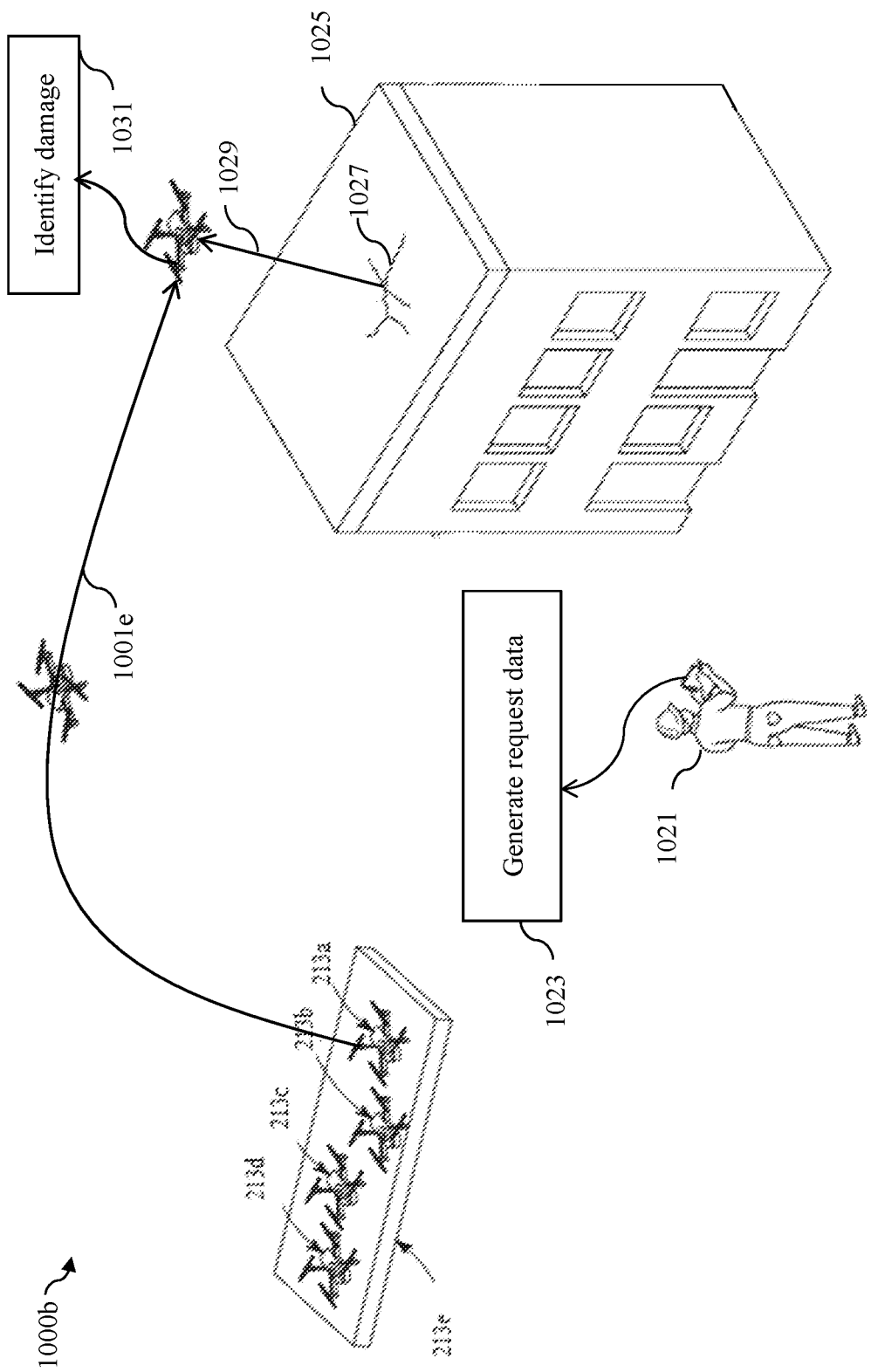

FIG. 10B illustrates controlling of the UAV of the fleet of UAVs for an infrastructure inspection mission, in accordance with an example embodiment.

Figure 11:
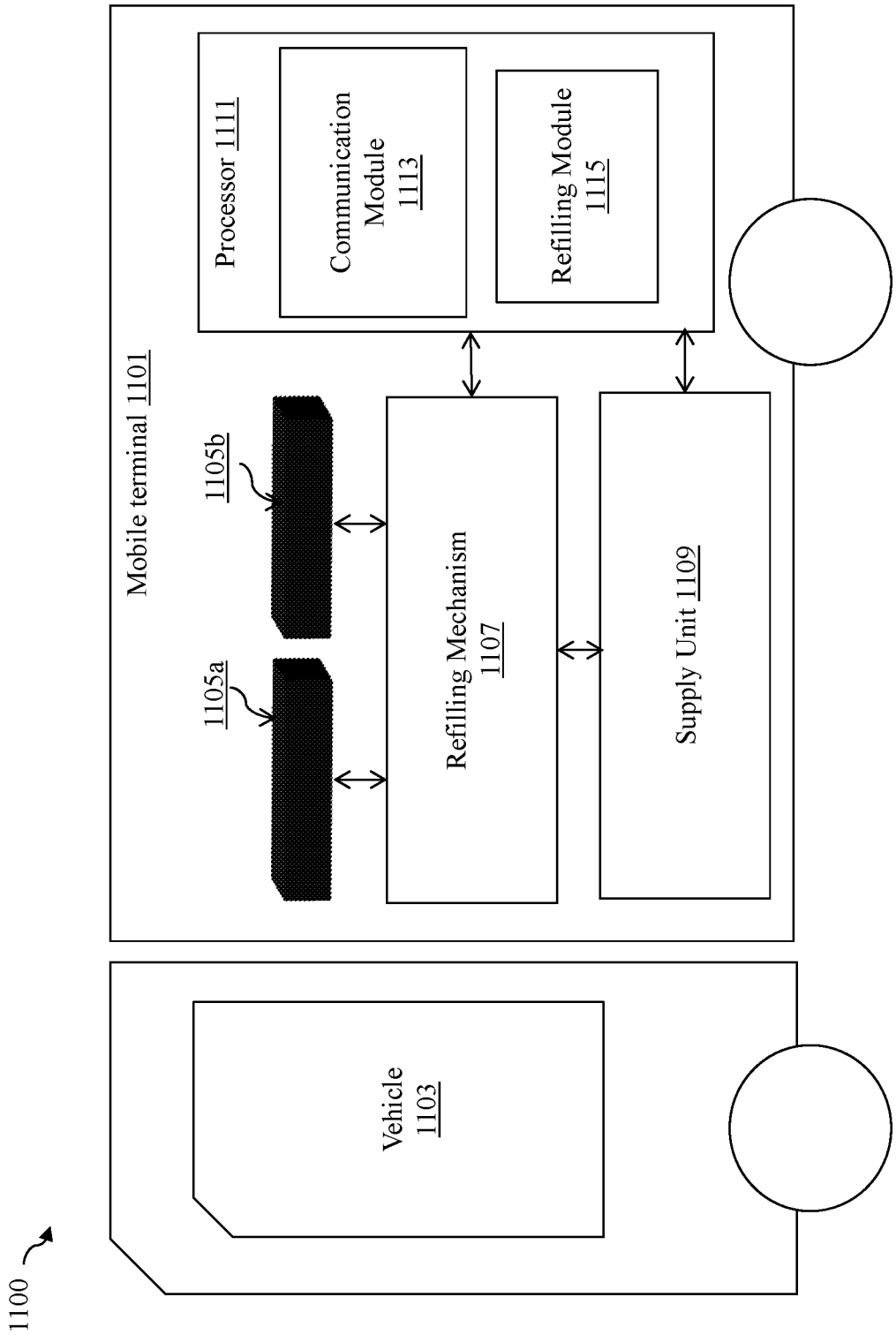

FIG. 11 illustrates an architecture diagram of a mobile terminal, in accordance with an example embodiment.

Figure 12:
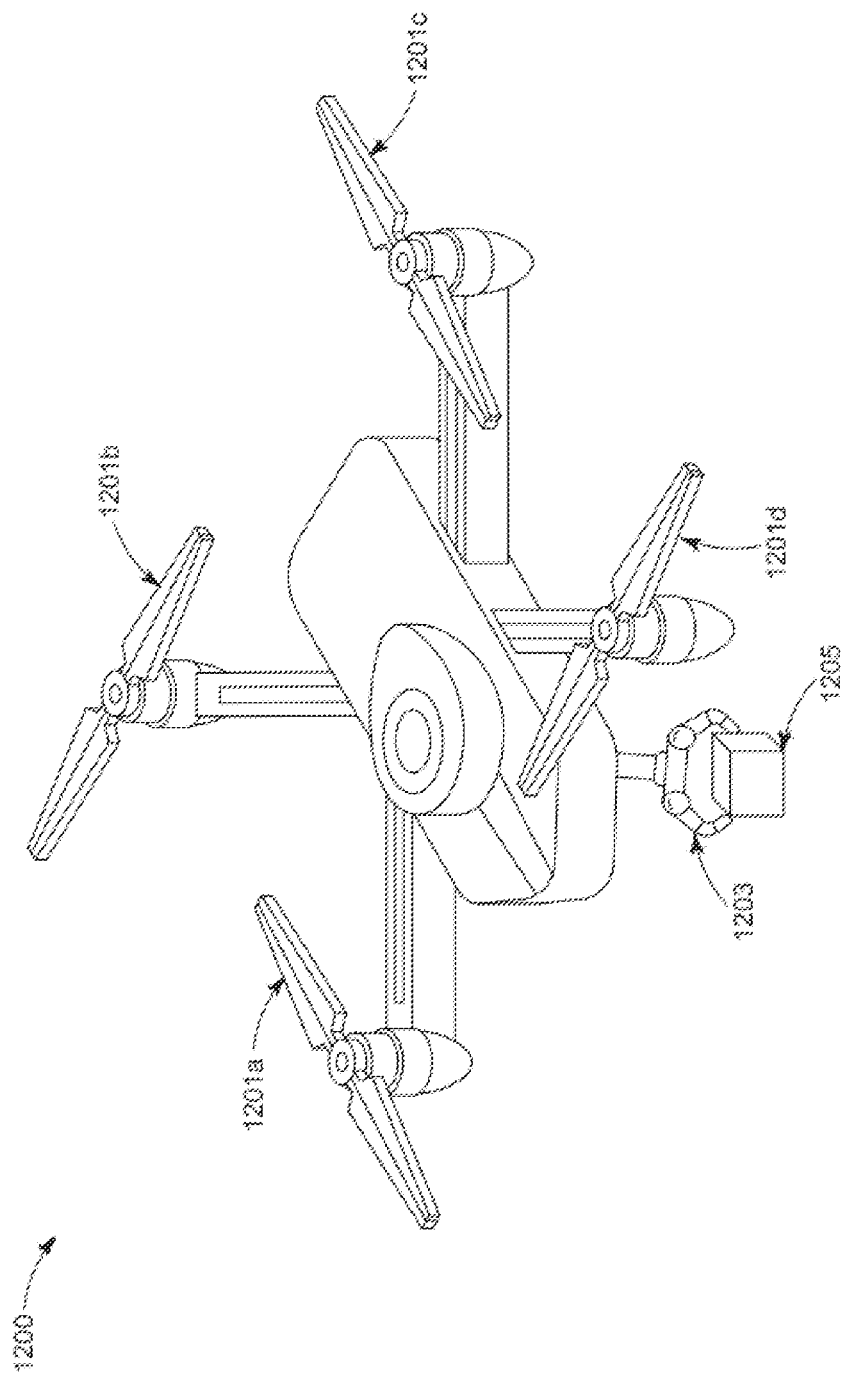

FIG. 12 illustrates an exemplar UAV, in accordance with an example embodiment.

Figure 13:
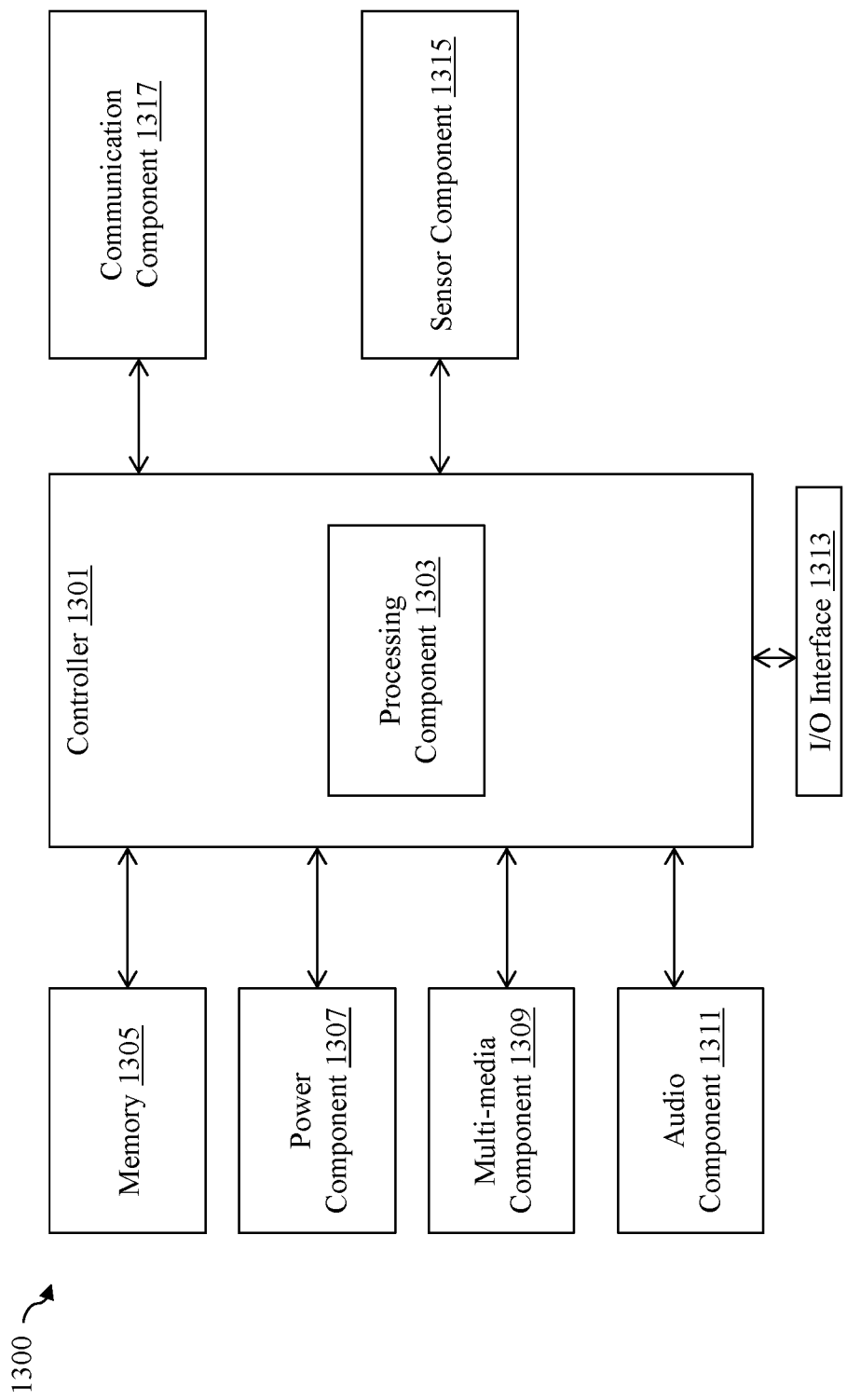

FIG. 13 illustrates a block diagram of a controller for the exemplar UAV, in accordance with an example embodiment.

Figure 14:
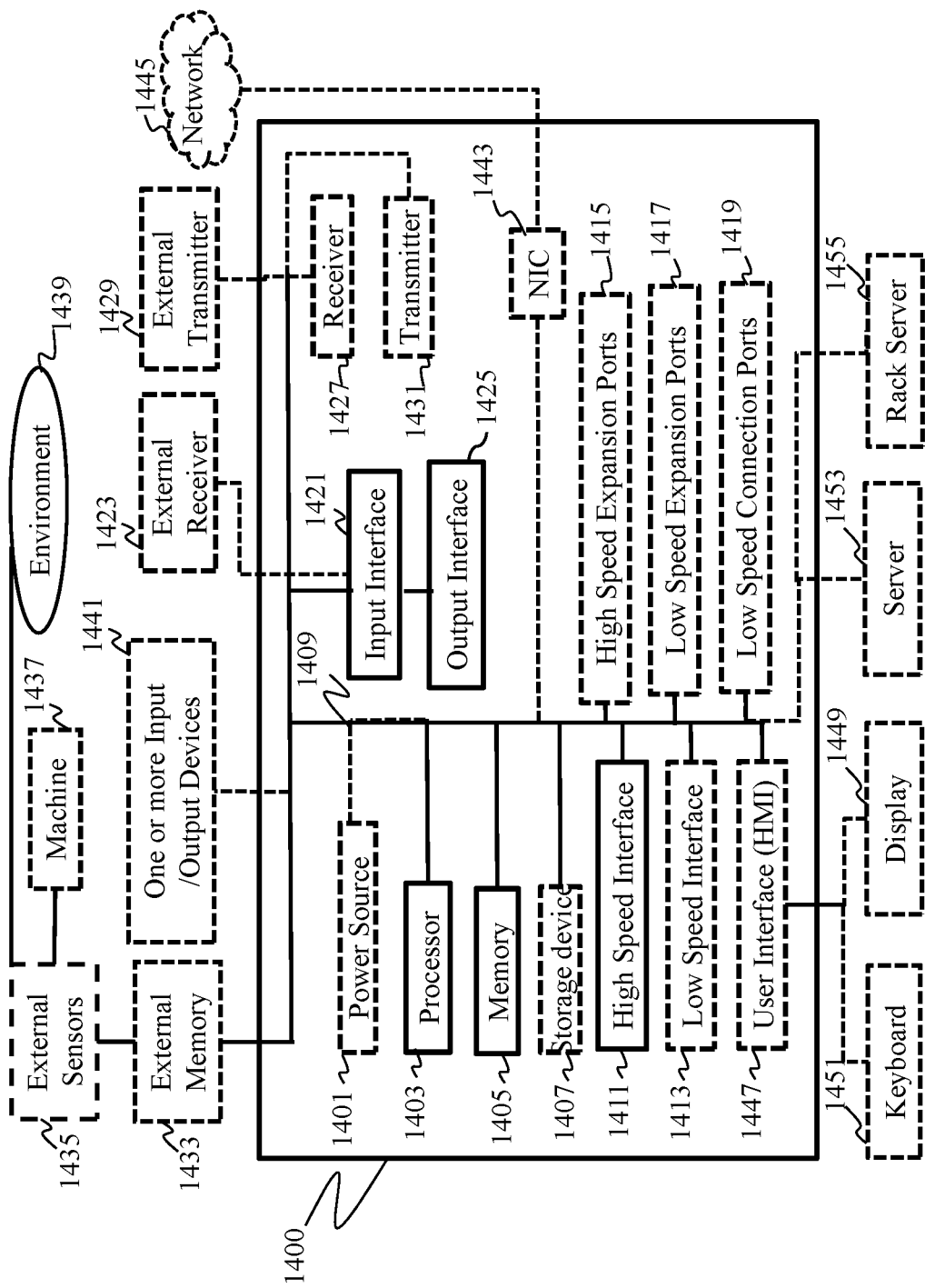

FIG. 14 illustrates a schematic of a computing device for implementing the system, in accordance with an example embodiment.

DETAILED DESCRIPTION

Definitions

The term "unmanned aerial vehicle" or UAV may refer to an autonomous vehicle that may use one or more electric motors for propulsion above ground surface, i.e., in air. In an example, the electric motors may be powered or propelled by electricity from extravehicular sources or a battery system. In an example, the UAV may use a traction battery pack to power the electric motor. For example, the battery pack may be plugged to a power outlet or a charging equipment, for charging. For example, the UAV may include charging port, battery pack, converters, one or more electric motors, charger, controller, cooling system, and transmission connects. In an example, the UAV may be a drone.

The term "execution path" may refer to a planned or a developed path that may be used by the UAV to reach from one point to another point. The execution path includes, for example, roads, lanes, links, air space, and so forth. Further, the execution path includes a sequence of terminals starting from an initial terminal and ending at a destination terminal. In some embodiments, the execution path may be used by the UAV to perform a mission. Additionally or alternatively, the execution path may refer to as "delivery path" corresponding to a delivery mission.

The term "payload" refers to all types of items and/or packaging suitable for delivery or carrying and may be known by other terms including but not limited to object, freight, payload, goods, parcel, box, bag, shrink-wrap, blister pack, electronic device, or some combination thereof. In some embodiments, the term "payload" may be referred to as "cargo" or "package".

The term "scheduling horizon" may refer to a time period over which a system receives request data from one or more service consumers.

The term "origin location" may refer to a location of a service consumer that is incompatible for initiating the mission, for example, landing/picking up of package by the UAV.

The term "destination location" may refer to a location of the service consumer that is incompatible for completing the mission, for example, landing/dropping the package by the UAV.

The term "initial terminal" may refer to a first terminal location at which the UAV is located before reception of the request data from the one or more service consumers.

The term "original terminal" may refer to a second terminal location from which the UAV initiates the mission, for example, picks up the package on a mission initialization day and a mission initialization date.

The term "destination terminal" may refer to a third terminal location at which the UAV completes the mission, for example, drops the package on a mission completion date. Additionally or alternatively, the destination terminal may be referred to as "final terminal".

The term "landing pad" may refer to an infrastructure provided at one or more terminals on which the UAV may land or take-off.

The term "slack time" may refer to a time period between at least two assignments when the UAV is not performing a relocation.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

FIG. 1A shows a schematic of a joint combinatorial problem 140a addressed by some embodiments to enable a platform for controlling drones to perform the mission. The mission includes one or a combination of an aerial photography mission, a search and rescue mission, a surveillance and security mission, an environmental monitoring mission, an infrastructure inspection mission, a package delivery mission, a research mission, a disaster response mission, and the like. Additionally or alternatively, the mission may be referred to as "drone service". Some embodiments are based on a recognition that to increase the capacity and flexibility of the drone service there is a need to consider the objectives of three independent participants, i.e., customers 110a in a need to utilize one or more drone services, drones and drone operators 130a with capabilities perform the one or more drone services, and terminals 120a for hosting drones to perform one or multi-leg drone services. These three independent participants have different objectives, different capabilities, and different needs, 115a, 135a, and 125a, respectively. Joining them together within the same management and control platform results in solving a joint combinatorial problem 140a needed to optimize the one or more drone services. This is because different objectives, capabilities, and needs of these independent participants can be considered by adding a corresponding degree of freedom and/or an optimization variable into a joint optimization problem under the umbrella of the common platform. Different embodiments consider some or all of these optimization variables.

For example, in some embodiments, the mission may correspond to a package delivery. Hence, some embodiments are based on an objective to solve the joint combinatorial problem 140a to optimize the package delivery. Further, because customer's pick-up and delivery locations are different from locations of terminals suitable for landing a drone, selections of terminals for placing and picking up a package become optimization variables. The times of pick-up and delivery of the packages to the pick-up and delivery terminals become additional optimization variables. Selecting a drone and an operator of the drone can be an optimization variable. Selecting one or more intermediate terminals for refueling may become an optimization variable. Balancing relocation and delivery missions may become an optimization variable. In some implementations, the terminals are mobile and can relocate based on the needs of the drones and/or a customer. Selecting a location of the terminal for intermediate refueling or for picking up or delivering the package may become an optimization variable. Additionally or alternatively, in some embodiments, an extent of fuel making a drone heavier is also an optimization variable. Type of drone is also an optimization variable. A balance of the utilization of a fleet of drones of different owners is also an optimization variable. Schedule requirements for relocation and overnight parking are also optimization variables.

The extent of different degrees of freedom increases the complexity of the joint combinatorial problem 140a. Such the joint combinatorial problem 140a needs to optimize multiple objectives 143a of multiple parties 141a with different and possible competing optimization variables 142a that may vary over time. Hence, it should not come as a surprise that to the best of our knowledge, the management and control platform uniting all the independent participants has not been considered before.

To that end, it is an object of some embodiments to provide a management and control platform configured for combinatorial control of package delivery services provided by drones. Additionally or alternatively, it is an object of some embodiments to provide a management and control platform configured for considering different objectives, needs, and capabilities of the independent participants of the platform such as customers, drone operators, and terminal operators for jointly optimizing competing objectives.

FIG. 1B shows a schematic of a multi-stage optimization platform for controlling drones to perform the mission according to some embodiments. Objectives of the multi-stage optimization include simplification of optimization problems at each stage, allowing to perform a multi-objective optimization considering multiple optimization variables. Additionally or alternatively, the objectives of the multi-stage optimization include focusing on the needs and objectives of the different participants of the management and control platform at different stages of the multi-stage optimization. Doing this in such a manner allows for strategic separation 110b of the joint combinatorial problem 140a in time 150b and across the participants 140b because the needs of different participants are separated in time.

For example, some embodiments use two-stage optimization, in which, for different stages of the multi-stage optimization, different optimization variables are fixed. For example, in one embodiment, during a first stage of the multi-stage optimization 120b, previous assignments to the drones for the one or more missions are fixed. Hence, during the first stage of the multi-stage optimization 120b, the joint combinatorial problem 140a can select a feasible execution path for the one or more missions, for example, picking up and delivering the payload on the terminals at times convenient for the customers 110a, and feasible to at least some drones based on the previous assignments while leaving the previous assignment unchanged. During a second stage of the multi-stage optimization 130b, the feasible execution path is fixed thereby preserving the time and location of the one or more missions as well as the schedule for landing at the terminals, while the drone assignment to perform the mission according to the fixed execution path is optimized. Notably, such a separation simplifies the size of each combinatorial problem performed at each stage of the multi-stage optimization problem. In addition, such staging is strategically selected based on specifics of the one or more missions allowing for the separation of the times of execution of the different stages, the type of optimizations at different stages, and the participants of the optimization.

For example, in one embodiment, during the first stage of the multi-stage optimization 120b, only the optimization variables pertinent to customers and/or terminals are optimized, while the optimization variables pertinent to drone operators are allowed to remain suboptimal. For example, during the first stage of the multi-stage optimization 120b, the feasible execution path for the one or more missions, for example, a package delivery mission can be selected heuristically based on the feasibility of mission considering mission requirements and previous mission assignments. This is beneficial because it allows for online exploration of the optimization variables pertinent to the customers 110a. As a result, the first stage of the multi-stage optimization 120b is focused 125b on the customers 110a allowing an exploration of different options for the initial terminals and the destination terminals at different times without running a computationally expensive optimization. Hence, the customer may explore different mission options, for example, delivery options in real time.

Similarly, during the second stage 130b, the joint combinatorial problem 140a for making the drone assignment is simplified by fixing execution paths. Also, the optimization is performed for optimization variables focusing 135b on drone operators without disturbing the variables pertinent to the customers 110a and/or terminal. Moreover, the second stage 130b can be performed later after the completion of the first stage of the multi-stage optimization 120b, and/or can be performed multiple times for the same results of the first stage, and/or can be performed for different drones than drones that participated in the first stage of the multi-stage optimization 120b, and/or can be completed using different optimization methods than methods used during the first stage of the multi-stage optimization 120b.

In other words, knowing the specifics of the one or more missions allows different embodiments to separate different stages of a multi-stage delivery control process in time and space by designing a sequence of optimization stages without or at least with an optional feedback loop.

In the end, the joint combinatorial problem 140a that is strategically 110b formulated as a multi-stage optimization allows to jointly consider different objectives of different participants in a computationally efficient manner and in the manner that makes sense for the specifics of the one or more missions. In addition, the multi-stage optimization of different embodiments allows the optimization of the different optimization variables of different participants separately while considering their joint optimality. For example, during the first stage of the multi-stage optimization 120b, the mission, for example, a package delivery mission is optimized individually for a new request to perform the mission, for example, the package delivery mission, while during the second stage 130b, the mission, for example, the package delivery mission is optimized jointly for all current requests.

FIG. 1C shows a block diagram of method 100c performed by the multi-stage optimization platform for controlling drones to perform the mission according to some embodiments. The multi-stage optimization platform is operatively connected with a fleet of drones of different types and a bank of drone landing terminals of different capabilities. The multi-stage optimization platform includes at least one processor and a memory having instructions stored thereon that cause the optimization platform to perform the method 100c.

The multi-stage optimization platform is configured to receive 110c a request for a new mission including data indicative of specifics 115c of the new mission. The request can be received via wired and/or wireless communication channels and include data indicative of time of mission, place of mission, and information about the payload associated with the mission. For example, the request can specify dimensions and weight of the payload.

In response to receiving the request, the multi-stage optimization platform is configured to access 120c a list of current assignments 125c of the drones in the fleet of drones to perform other missions. The list of current assignments 125c can include all incomplete assignments received and/or accepted for missions prior to the request for the new mission. Each of the current assignments specifies 105c an execution path for performing the mission, a schedule for the mission according to the execution path, and a drone assigned to perform the mission according to the execution path. Accordingly, each execution path specifies a sequence of terminals starting at an initial terminal for initiating the mission and ending at a final terminal for completing the mission and specifies times for the assigned drone to be serviced at each of the terminals in the sequence of terminals.

The multi-stage optimization platform is configured to perform a first stage 130c of a multi-stage optimization based on the specifics of the new mission, the types of drones, and the capabilities of the terminals subject to constraints fixing the list of current assignments 125c of the drones to perform other missions to produce an assignment for the new mission. The assignment for new mission specifies an execution path for the new mission, a timeline of the new mission according to the execution path and a drone assigned for the new mission. The objective of the first stage 130c is to determine a feasible new assignment 135c of a drone to perform the mission satisfying customer needs in the request 110c without disturbing previous assignments specified in the list of current assignments 125c.

To that end, some embodiments determine a new assignment defining assignment data of the new mission by performing a first stage of a multi-stage optimization of the assignments subject to a first set of constraints preserving the assignment data in the obtained assignments and update the assignments with the determined new assignment to include the new mission in the missions of the fleet of UAVs. Under such a constraint specified by the first set of constraints, the assignment may be suboptimal for the drone operators but simplifies the computation improving the performance of the processor of the multi-stage optimization platform.

In addition, the multi-stage optimization platform is configured to perform a second stage 140c of the multi-stage optimization to perform the drone reassignment 145c, i.e., to update the list of current assignments 125c by preserving the execution paths in the list of current assignments 125c while changing the assignments of at least some of the drones to perform the mission according to the execution path. Doing in such a manner allows to optimize the assignments for the missions including the new mission by performing a second stage of the multi-stage optimization of the assignments subject to a second set of constraints allowing reassignment of the UAVs while preserving the execution paths in each of the assignments Next, the multi-stage optimization platform is configured to control 150c one or a combination of the drones in the fleet of drones to perform the missions according to the updated list of assignments and the bank of terminals to service the fleet of drones performing the missions according to the updated list of assignments.

For example, to control the drones, the multi-stage optimization platform can submit schedule of the assignments to specific drones for execution by control system of the drones. Additionally or alternatively, the multi-stage optimization platform can submit control commands for the drones to follow.

FIG. 1D shows a schematic of desynchronization of different stages of the multi-stage optimization employed by some embodiments. For example, in some embodiments, the processor of the multi-stage optimization platform is configured to add 110d the assignment for the new mission to the list of current assignments 125c upon completion of the first stage of the multi-stage optimization. Additionally or alternatively, the processor is further configured to remove 120d the assignment for the new mission from the list of current assignments 125c upon one or a combination of receiving a request to cancel the new mission and receiving a confirmation for completion of the new mission.

Notably, the operation of the second stage can be desynchronized from the operations of adding and/or removing the assignments to the list of current assignments 125c. For example, in some embodiments, the multi-stage optimization platform is configured to perform the second stage of the multi-stage optimization multiple times 130d to update the assignment of the drone for the new mission multiple times 135d before the completion of the new mission. Additionally or alternatively, the processor is further configured to perform the second stage of the multi-stage optimization updating the assignment of the drone for the new mission in response to receiving a request for another mission.

FIG. 1E shows a schematic of different methods used for performing different stages of the multi-stage optimization, according to some embodiments. Some embodiments are based on the realization that different methods can be used for performing different stages of the multi-stage optimization. For example, in one embodiment, a first stage 110e of the multistage optimization is performed using a heuristic algorithm 130e and a second stage 120e of the multistage optimization is performed by solving a mixed-integer control problem. The heuristic algorithm 130e involves selecting a feasible subset of drones capable to perform the new mission within one or multiple transportation legs reachable within time windows not disturbing the current assignments of the subset of drones to perform other missions and assigning a drone from the subset of drones to the new mission based on a metric of performance of mission. The mixed-integer control problem 140e minimizes one or a combination of a total waiting time parameter and a total relocation miles parameter of the fleet of drones. The heuristic algorithm 130e is explained in detail below in FIG. 3. The mixed-integer control problem 140e is explained in detail below in FIG. 4.

To this end, different stages of the multi-stage optimization are desynchronized in terms of methods used to perform each stage.

Some embodiments are based on the further realization that the different stages of the multi-stage optimization can be desynchronized in time. In other words, each stage of the multi-stage optimization can be performed at different time instances. For example, in an embodiment, a date for receiving the request for the new mission is different from a date of actual mission specified by the specifics of the mission. The heuristic algorithm 130e is executed on the date of receiving the request for the new mission, and the mixed-integer control problem 140e is solved on the date of the actual mission to perform the second stage of the multi-stage optimization.

FIG. 2A illustrates an environment 200 comprising a system 201a implemented for controlling a fleet of Unmanned Aerial Vehicles (UAVs), according to some embodiments. The system 201a is an implementation of the multi-stage optimization platform described above in FIGS. 1A-1E. In some embodiments, one or more UAVs of the fleet of UAVs may correspond to one or more drones. Alternatively, the one or more UAVs of the fleet of UAVs may correspond to one or more autonomous aerial vehicles. The one or more UAVs may be used to perform one or more missions.

Some embodiments are based on recognition that there is an underutilization of UAVs in performing the one or more missions. Some embodiments are based on a realization that the underutilization is due to unjustified assumptions corresponding to behavior and objectives of one or more participants of the one or more missions. The unjustified assumptions include, but are not limited to, that a UAV may perform the one or more missions by traversing from an origin terminal to a destination terminal in a single flight, the UAV may pick up or deliver the package at one or more places specified by a consumer, the UAV may deliver any package, etc. The unjustified assumptions restrict a flexibility of the one or more missions resulting in the underutilization and failure to fulfill consumers' requests.

It is an object of some embodiments to overcome the unjustified assumptions and consider one or more variables associated with the one or more participants of the one or more missions. The one or more participants include, but not limited to, one or more service consumers, one or more UAV operators, and one or more service providers. The one or more participants may have one or more objectives, one or more capabilities, and one or more requirements. The one or more participants may be joined together by the system 201a to solve a joint combinatorial problem 140a for optimization of the one or more drone services. The one or more objectives, the one or more capabilities, and the one or more requirements of the one or more participants are considered by considering one or more variables into a multi-stage optimization for optimization of the one or more drone services.

The system 201a performs the multi-stage optimization to control the fleet of one or more UAVs to perform the one or more missions efficiently. A manner in which the system 201a controls the fleet of UAVs by performing the multi-stage optimization is described in detail below with reference to FIG. 2A and FIG. 2B.

As shown in FIG. 2A, the environment 200 includes the system 201a communicatively coupled to a fleet of UAVs 213a1 via a communication network 211a. The fleet of UAVs 213a1 comprises a UAV 213a, a UAV 213b, a UAV 213c, and a UAV 213d. The fleet of UAVs 213a1 may be stationed at an initial terminal 213e. The system 201a includes a processor 203a, a memory 205a, a database 207a, and a user interface 209a. The memory 205a includes a constraint based first optimization module 205aa and a constraint based second optimization module 205ab.

All the components in the environment 200 may be coupled directly or indirectly to the communication network 211a. The communication network 211a may be wired, wireless, or any combination of wired and wireless communication networks, such as cellular, Wi-Fi, internet, local area networks, or the like. In some embodiments, the communication network 211a may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, International Mobile Telecommunications (ITU-IMT) 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. The components described in the environment 200 may be further broken down into more than one component and/or combined together in any suitable arrangement. Further, one or more components may be rearranged, changed, added, and/or removed.

In some embodiments, the one or more UAVs of the fleet of UAVs 213a1 include one or more sensors, a user equipment and/or a communication interface (not shown in the FIG. 2A). Additional, fewer, or different components may be provided. For example, a proxy server, a name server, a map server, a cache server or cache network, a router, a switch or intelligent switch, an additional database, additional computers or workstations, administrative components, such as an administrative workstation, a gateway device, a backbone, ports, network connections, and network interfaces may be provided. While the components in FIG. 2A are shown as separate from one another, one or more of these components may be combined. In this regard, the system 201a may be communicatively coupled to the components shown in FIG. 2A to carry out the desired operations and wherever required modifications may be possible within the scope of the present disclosure.

The system 201a includes suitable logic, circuitry, and interfaces that may be configured to control the one or more UAVs of the fleet of UAVs 213a1 to perform the one or more missions efficiently. In some embodiments, the fleet of UAVs 213a1 may be stationed at the initial terminal 213e. Further, at least one of the UAV 213a, the UAV 213b, the UAV 213c, and the UAV 213d may be used to perform the one or more missions efficiently. In some embodiments, the system 201a may be embodied as a chip or chip set. In other words, the system 201a may comprise one or more physical packages (such as chips) that includes materials, components and/or wires on a structural assembly (such as, a baseboard).

The memory 205a of the system 201a may include one or more modules related to, but not limited to, related to, but not limited to, geocoding, routing (multimodal, intermodal, and unimodal), clustering algorithms, machine learning in location based solutions, natural language processing algorithms, and artificial intelligence algorithms. Data for the one or more modules of the memory 205a may be collected using a plurality of technologies including, but not limited to drones, sensors, connected cars, cameras, interfaces, probes, and chipsets.

In some embodiments, the memory 205a may be non-transitory and may include, for example, one or more volatile and/or non-volatile memories. In other words, for example, the memory 205a may be an electronic storage device (for example, a computer readable storage medium) comprising gates configured to store data (for example, bits) that may be retrievable by a machine (for example, a computing device like the processor 203a). The memory 205a may be configured to store information, data, content, applications, instructions, or the like, for enabling the apparatus to carry out various functions in accordance with an example embodiment of the present invention. For example, the memory 205a may be configured to buffer input data for processing by the processor 203a. As exemplarily illustrated in FIG. 1, the memory 205a may be configured to store instructions for execution by the processor 203a. As such, whether configured by hardware or software methods, or by a combination thereof, the processor 203a may represent an entity (for example, physically embodied in circuitry) capable of performing operations according to an embodiment of the present invention while configured accordingly. Thus, for example, when the processor 203a is embodied as an ASIC, FPGA or the like, the processor 203a may be specifically configured hardware for conducting the operations described herein. Alternatively, as another example, when the processor 203a is embodied as an executor of software instructions, the instructions may specifically configure the processor 203a to perform the algorithms and/or operations described herein when the instructions are executed. However, in some cases, the processor 203a may be a processor specific device (for example, a mobile terminal or a fixed computing device) configured to employ an embodiment of the present invention by further configuration of the processor 203a by instructions for performing the algorithms and/or operations described herein. The processor 203a may include, among other things, a clock, an arithmetic logic unit (ALU) and logic gates configured to support operation of the processor 203a.

In some embodiments, the system 201a includes the processor 203a for conducting processing functions associated with the system 201a and the database 207a for storing and retrieving the data. In an embodiment, the system 201a may comprise one or more processors configured to process requests received from the system 201a. Further, in some embodiments, the database 207a comprises suitable logic, circuitry, and interfaces that may be configured to store the data associated with the one or more participants of the one or more missions.

FIG. 2B illustrates a flowchart for controlling the one or more UAVs fleet of UAVs 213a1 by the system 201a of FIG. 1, in accordance with an example embodiment. FIG. 2A is explained in conjunction with FIG. 1.

In one embodiment, at block 201, the processor 203a of the system 201a is configured to receive request data for a mission. The request data is explained in detail below in FIG. 2C. In some embodiments, the database 207a of the system 201a is configured to store the request data. Further, the processor 107 is further configured to retrieve the request data from the database 207a for processing by the one or more modules such as the constraints based first optimization module 205aa, the constraints based second optimization module 205ab, and the like.

Further, at block 203, the processor 203a is further configured to obtain a first list of assignments for each UAV of the fleet of UAVs 213a1. In some embodiments, the database 207a of the system 201a is further configured to store the first list of assignments. Further, the processor 107 is further configured to obtain the first list of assignments from the database 207a for processing by the one or more modules such as the constraints based first optimization module 205aa, the constraints based second optimization module 205ab, and the like. Each assignment of the first list of assignments corresponds to a control instruction for a UAV of the fleet of UAVs 213a1 assigned to perform the one or more missions. In some embodiments, based on the multi-stage optimization, at least one of the UAV 213a, the UAV 213b, the UAV 213c, and 213d may be assigned to perform the one or more missions.

At block 205, the processor 203a is further configured to obtain assignments for performing different missions by the fleet of UAVs, each assignment includes assignment data indicative of a UAV of the fleet of UAVs assigned to perform a corresponding mission over an execution path formed by a sequence of terminals and service times at which the assigned UAV is scheduled to be serviced at terminals of the sequence of the terminals. These assignments form the list of current assignment for the fleet of UAVs and is also rereferred to herein as the first list of assignments. The assignment data is explained in detail below in FIG. 2D. In some embodiments, the database 207a of the system 201a is further configured to store the assignment data for each assignment of the first list of assignments. Further, the processor 107 is further configured to obtain the assignment data corresponding to each assignment of the first list of assignment from the database 207a for processing by the one or more modules such as the constraints based first optimization module 205aa, the constraints based second optimization module 205ab, and the like.

At block 207, the processor 203a is further configured to determine an assignment for the one or more UAVs of the fleet of UAVs 213a1 corresponding to the request data by performing a first stage of the multi-stage optimization 207 subject to a first set of constraints. For example, the embodiments determine a new assignment defining assignment data of the new mission by performing a first stage of a multi-stage optimization of the assignments subject to a first set of constraints preserving the assignment data in the obtained assignments. The determined assignment includes details of the mission, such as, execution path, a type of UAV for the mission, time and date for the mission, and the like. The first set of constraints is associated with the request data and the assignment data. The first set of constraints is explained in detail below in FIG. 2E. In some embodiments, the processor 203a of the system 201a is further configured to obtain the first set of constraints from the database 207a. Further, in some embodiments, the processor 203a is further configured to update the one or more constraints of the first set of constraints corresponding to one or more features associated with the one or more missions performed by the one or more UAVs of the fleet of UAVs 213a1. The one or more features associated with the one or more missions performed by the one or more UAVs of the fleet of UAVs 213a1 include, but are not limited to, the transportation cost, a mission completion time, an operational cost, a request response time, environmental conditions, and legal obligations. Further, in some embodiments, the processor 203a is further configured to store the first set of constraints after updating the one or more constraints of the first set of constraints.

At block 209, the processor 203a is further configured to update the first list of assignments by adding the determined assignment to the first list of assignments. Further, database 207a of the system 201a is further configured to store the updated first list of assignments 213. Doing in such a manner includes the new mission in the missions of the fleet of UAVs.

At block 211, the processor 203a is further configured to optimize the assignments for the missions including the new mission by performing a second stage of the multi-stage optimization of the assignments subject to a second set of constraints allowing reassignment of the UAVs while preserving the execution paths in each of the assignments. The second stage optimization determines a second list of assignments for the one or more UAVs of the fleet of UAVs 213a1. The second set of constraints is associated with the updated first list of assignments. The second set of constraints is explained in detail below in FIG. 2F.

At block 213, the processor 203a is further configured to control the one or more UAVs of the fleet of UAVs 213a1 based on the determined second list of assignments for the mission. In one embodiment, based on the determined second list of assignments, the processor 203a is further configured to control the one or more UAVs of the fleet of UAVs 213a1 to initiate the mission, for example, by picking up the package from an origin terminal and complete the mission, for example, by delivering the package to a destination terminal. Various embodiments associated with the controlling of the one or more UAVs of the fleet of UAVs 213a1 are explained in detail in FIG. 10.

FIG. 2C illustrates a block diagram of request data 215, in accordance with one or more example embodiments. As shown in FIG. 2C, the request data 215 comprises a payload weight 215a, one or more payload dimensions 215b, a first specified maximum driving distance 215c, a second specified maximum driving distance 215d, a mission initialization date 215e, a mission initialization time 215f, a mission completion date 215g, a mission completion time 215h, and a request receiving date 215i. The payload weight 215a refers to a weight of a payload, for example, the package that is to be delivered. The one or more payload dimensions 215b include length, breadth, and height of the package. The first specified maximum driving distance 215c refers to a maximum distance specified by the service consumer within which an original terminal has to be present. The second specified maximum driving distance 215d refers to a maximum distance specified by the service consumer within which a destination terminal has to be present. The mission initialization date 215e refers to a date on which the mission is initialized, for example, a date on which the package is to be picked up. The mission initialization time 215f refers to a time at which the mission is initialized, for example, a time at which the package is to be picked up. The mission completion date 215g refers to a date on which the mission is completed, for example, a date on which the package is to be delivered. The mission completion time 215h refers to a time at which the mission is completed, for example, a time at which the package is to be delivered. The request receiving date 215i refers to a date on which a request for the mission is received.

Further, in one embodiment, the request receiving date 215i and the mission completion date 215g are same. In another embodiment, the request receiving date 215i and the mission completion date 215g are different. Further, in some embodiments, the processor 203a is further configured to perform the first stage of the multi-stage optimization 207 on the request receiving date 215i. Further, in some embodiments, the processor 203a is further configured to perform the second stage of the multi-stage optimization 215 on the mission completion date 215g.

FIG. 2D illustrates a block diagram for assignment data 217, in accordance with one or more example embodiments. As shown in FIG. 2C, the assignment data 217 comprises a payload capacity 217a of an assigned UAV, a type 217b of the assigned UAV an execution path 217c to deliver the one or more packages by the assigned UAV, one or more service times 217d, a UAV ID 217e, a UAV current battery level 217f, a UAV current fuel level 217g, a UAV current location 217h, a UAV current height 217i, and a UAV current speed 217j. The assigned UAV refers to a UAV that is already assigned to perform other mission or previous missions. In some embodiments, the assignment data 217 may be received from one or more UAV operators. The payload capacity 217a refers to a maximum payload that the UAV can manage. The type 217b of the assigned UAV may include a single-rotor UAV, a Tri copter, a quadcopter, and a hex copter. The execution path 217c refers to a trajectory that the UAV has to follow to perform the mission. The one or more service times 217d refers to time instances at which the assigned UAV is scheduled to be serviced at one or more terminals. The UAV ID 217e refers to an identity number given to the UAV. The UAV current battery level 217f refers to an amount of charge remaining in battery of the UAV. The UAV current fuel level 217g refers to an amount of fuel remaining in the UAV. The UAV current location 217h refers to a geo-location of the UAV at which the UAV is currently present. The UAV current height 217i refers to a height from a ground level at which the UAV is operating. The UAV current speed 217j refers to a speed of the UAV at which the UAV is currently travelling.

FIG. 2E illustrates a block diagram for a first set of constraints 219, in accordance with one or more example embodiments. The first set of constraints 219 is associated with the request data 215 and the assignment data 217 comprises, but not limited to, a payload capacity constraint 219a, a first specified maximum driving distance constraint 219b, a second specified maximum driving distance constraint 219c, a landing pad compatibility constraint 219d, and a relocation feasibility constraint 219e corresponding to the one or more UAVs of the fleet of UAVs 213a1. The payload capacity constraint 219a corresponds to a payload capacity limitation of the one or more UAVs of the fleet of the UAVs. For instance, the payload capacity limitation is a maximum payload that the UAV can manage. The first specified maximum driving distance constraint 219b corresponds to a distance within which an original terminal has to be present. The second specified maximum driving distance constraint 219c corresponds to a distance within which a destination terminal has to be present. The landing pad compatibility constraint 219d corresponds to a requirement that original terminal locations and destination terminal locations should be compatible for initiating the mission and completing the mission, for example, picking-up and dropping-off the package. The relocation feasibility constraint 219e corresponds to a requirement that the UAV should be feasible for relocation.

FIG. 2F illustrates a block diagram for a second set of constraints 221, in accordance with one or more example embodiments. The second set of constraints 221 associated with the updated first list of assignments comprises, but is not limited to, an execution path constraint 221a, a first assignment constraint 221b, a second assignment constraint 221c, a third assignment constraint 221d, a reassignment cost constraint 221e, and a maximum slack constraint 221f corresponding to the one or more UAVs of the fleet of UAVs 213a1. The execution path constraint 221a corresponds to a fixed execution path enforced as a constraint for each assignment of the one or more UAVs of the fleet of UAVs 213a1. The first assignment constraint 221b corresponds to the current assignment enforced as a constraint for the one or more UAVs of the fleet of UAVs 213a1. The second assignment constraint 221c corresponds to a successor assignment limitation for the one or more UAVs of the fleet of UAVs 213a1. The third assignment constraint 221d corresponds to a UAV availability limitation for each assignment of the one or more UAVs of the fleet of UAVs 213a1. The reassignment cost constraint 221e corresponds to a cost that should not be exceeded, for each assignment of the one or more UAVs of the fleet of UAVs 213a1. The maximum slack constraint 221f is a relocation time limitation for the one or more UAVs of the fleet of UAVs 213a1.

In an embodiment, the processor 203a is further configured to perform the first-stage of the multi-stage optimization using a heuristic algorithm. The heuristic algorithm may consider one or more aspects to perform the one or more missions efficiently. Additionally or alternatively, the heuristic algorithm may correspond to a heuristic optimization algorithm. The heuristic optimization algorithm may perform a heuristic optimization corresponding to the one or more aspects. The one or more aspects include, but not limited to a response time for determining one or more assignments corresponding to the one or more UAVs of the fleet of UAVs 213al, fuel requirements of the one or more UAVs of the fleet of UAVs 213al, range limits of the one or more UAVs of the fleet of UAVs 213al, an availability of landing pads for the one or more UAVs of the fleet of UAVs 213al, an availability of parking pads for the one or more UAVs of landing pads for the one or more UAVs of the fleet of UAVs 213al, and availability of mobile terminals for the one or more UAVs of the fleet of UAVs 213a1.

FIG. 3 illustrates a flowchart of a method 300 of the first stage of the multi-stage optimization 207 using the heuristic algorithm, in accordance with an example embodiment. In one or more embodiments, the system 201a may perform one or more portions of the method 300 and may be implemented by, for instance the processor 203a. As such, the system 201a may provide means for accomplishing embodiments of other processes described herein in conjunction with other components of the system 201a. Although the method 300 is illustrated as a sequence of steps, its contemplated that various embodiments of the method 300 may be performed in any order or combination and need not include all of the illustrated steps.

At block 301, the request data 215 is received from the service consumer for the mission. In some embodiments, the processor 203a is further configured to receive the request data 215 (explained in FIG. 2C) via the user interface 209a.

At block 303, the first list of assignments 203 corresponding to the one or more UAVs of the fleet of UAVs 213a1 is obtained. In some embodiments, the fleet of UAVs 213a1 may be referred to as a set of UAVs. Further, the first list of assignments 203 comprises an initial terminal location corresponding to each UAV of the set of UAVs.

At block 305, the assignment data 217 for each assignment of the first list of assignments 203 is obtained. In some embodiments, the processor 203a is further configured to obtain the assignment data 217 corresponding to each assignment of the first list of assignments 203. Further, in some embodiments, the processor 203a is further configured to obtain the assignment data 217 from the database 207a, or any other database.

At block 307, a determination is made whether the payload capacity 217a of at least one UAV of the set of UAVs satisfies the payload capacity constraint 219a or not. In some embodiments, to satisfy the payload capacity constraint 219a, the payload capacity 217a of at least one UAV is required to be compatible with the payload weight 215a and one or more payload dimensions 215b. If the payload capacity constraint 219a is not satisfied, then at block 309, a request for the mission is rejected.

However, if the payload capacity constraint 219a is satisfied, then, at block 311, a determination is made whether at least one origin terminal location of a set of terminal locations satisfy the first specified maximum driving distance constraint 219b or not. In some embodiments, to satisfy the first specified maximum driving distance constraint 219b, the at least one original terminal location of the set of terminal locations is required to be in a range of the first specified maximum driving distance 215c. If the first specified maximum driving distance constraint 219b is not satisfied, at block 313, the request for the mission is rejected.

However, if the first specified maximum driving distance constraint 219b is satisfied, at block 315, a determination is made whether at least one destination terminal location of the set of terminal locations satisfy the second specified maximum driving distance constraint 219c or not. In some embodiments, to satisfy the second specified maximum driving distance constraint 219c, the at least one destination terminal location of the set of terminal locations is required to be in a range of the second specified maximum driving distance 215d. If the second specified maximum driving distance constraint 219c is not satisfied, then, at block 313, the request for the mission is rejected.

Further, if the second specified maximum driving distance constraint 219c is satisfied, then, at block 317, a set of terminal pairs corresponding to at least two terminal locations of the set of terminals is determined. In some embodiments, the processor 203a is further configured to determine each possible pair that is made by the combination of one or more origin terminals of the set of terminals with one or more destination terminals of the set of terminals. Further, the processor 203a is further configured to determine the set of terminal pairs by adding each possible pair to the set of terminal pairs.

At block 319, a pair from the set of terminal pairs is selected. In some embodiments, the processor 203a is further configured to select the pair from the set of terminal pairs. Further each pair of the set of terminal pairs comprises an origin terminal that is in the range of the first specified maximum driving distance 215c and a destination terminal that is in the range of the second specified maximum driving distance 215d.

At block 321, a UAV from the set of UAVs is selected. In some embodiments, the processor 203a is further configured to select the UAV from the set of UAVs based on a determination that the selected UAV satisfy the payload capacity constraint 219a. At block 323, a feasible set of UAVs is created. Further, each UAV of the feasible set of UAVs satisfy the landing pad compatibility constraint 219d and the relocation feasibility constraint 219e. The feasible set of UAVs may be initially empty.

At block 325, a determination is made whether the selected UAV satisfy the landing pads compatibility constraint 219d or not. In some embodiments, to satisfy the landing pad compatibility constraint 219d, the selected UAV is required to be compatible with at least one landing pad of corresponding original terminal and destination terminal of the selected pair. If the landing pads compatibility constraint 219d is not satisfied, then at block 327, a determination is made whether the set of UAVs empty or not.

However, if the landing pads compatibility constraint 219d is satisfied, then, at block 329, a determination is made whether an assignment is feasible for the selected UAV of the set of UAVs subjected to the relocation feasibility constraint 219e or not. In some embodiments, to determine the feasibility of assignment for the selected UAV of the set of UAVs subjected to the relocation feasibility constraint 219e, a starting time is required to be feasible corresponding to which the selected UAV performs a first relocation and a second relocation. In one embodiment, in the first relocation, the selected UAV relocates from a predecessors assignment's destination terminal to the origin terminal for initiating the mission, for example, picking up the package on the mission initialization date 215e and the mission initialization time 215f. The predecessor assignment's destination terminal refers to a destination location of a previous assignment of the selected UAV. In one embodiment, in the second relocation, after completing the mission, for example, package delivery on the mission completion date 215g and the mission completion time 215h at the destination terminal, the selected UAV relocates to a successor assignment's original terminal. The successor assignment's original terminal refers to an original terminal of a subsequent assignment of the selected UAV. If the assignment is not feasible, then, at block 327, the determination is made whether the set of UAVs empty or not.

However, if the assignment is feasible for the selected UAV subjected to the relocation feasibility constraint 219e, then, at block 331, the feasible set of UAVs is updated. In some embodiments, the processor 203a is further configured to update the feasible set of UAVs by adding the selected UAV of the set of UAVs and the corresponding determined assignment.

Further, at block 327, the determination is made whether the set of UAVs is empty or not. If the set of UAVs is not empty, then, processing of the method 300 goes back to the block 321, where another UAV is selected from the set of UAVs to update the feasible set of UAVs.

However, at the block 327, if the set of UAVs empty, then, at block 333, a determination is made whether the set of terminal pairs is empty or not. If the set of terminal pairs is not empty, then, processing of the method 300 goes back to the block 321, where another pair from the set of terminal pairs is selected to update the feasible set of UAVs.

Further, at the block 333, if the set of terminal pairs is empty, then, at block 335, a determination is made whether the feasible set of UAVs is updated or not. If the feasible set of UAVs is not updated, then at block 337, the request is rejected for the mission.

However, at the block 335, if the feasible set of UAVs is updated, then at block 339, one or more options to select a UAV from the feasible set of UAVs are provided to the service consumers. Further, at block 341, a determination is made whether the UAV is selected from the feasible set of UAVs or not. If the UAV is not selected from the feasible set of UAV, at block 337, the request is rejected for the mission.

However, if the UAV is selected, at block 343, the selected UAV of the feasible set of UAVs is assigned for the mission.

At block 345, the first list of assignments is updated by adding the assignment corresponding to the selected UAV of the updated feasible set of UAVs. In some embodiments, the processor 203a of the system 201a is further configured to receive a cancel request corresponding to the request data. Further, based on the reception of the cancel request, processor 203a is further configured to remove the determined assignment from the updated first list of assignments.

Accordingly, some embodiments perform the first stage of the multi-stage optimization using the heuristic algorithm configured to determine a subset of UAVs feasible to perform the new mission while satisfying the first set of constraints; select an UAV from the feasible subset of UAVs according to a metric of performance; and assign the selected UAV for the new mission. The metric of performance can vary for different implementations. Examples of the metric of performance include reducing fuel consumption, decreasing time of performing the mission, and reducing slack time.

In some embodiments, processor 203a is further configured to perform the second stage of the multi-stage optimization based on a mixed integer control problem algorithm to determine the second list of assignments. In some embodiments, the mixed integer control problem algorithm may solve a mixed integer control problem to determine the second list of assignments. The mixed integer control problem algorithm is explained below in FIG. 4.

FIG. 4 illustrates a flowchart for implementation of an exemplary method 400 for performing the second stage of the multi-stage optimization 215 using the mixed integer control problem, in accordance with an example embodiment. In one or more embodiments, the system 201a may perform one or more portions of the method 400 and may be implemented in, for instance the processor 203a. As such, the system 201a may provide means for accomplishing embodiments of other process described herein in conjunction with other components of the system 201a. Further, in one embodiments, the processor 203 is further configured to perform the second stage of the multi-stage optimization 215 for a pre-defined number of times to determine the second list of assignments before the completion of the mission. Although the method 400 is illustrated as a sequence of steps, its contemplated that various embodiments of the method 400 may be performed in any order or combination and need not include all of the illustrated steps.

At block 401, a set of same type UAVs is determined by selecting the one or more UAVs from the feasible set of UAVs as of same type of the selected UAV of the feasible set of UAVs. For instance, if the single-rotor UAV is the type of the selected UAV, then a set of single-rotor UAVs is selected from the feasible set of UAVs.

At block 403, a set of assignments corresponding to the set of same type UAVs is determined. The set of assignment may be represented by a symbol "S". Further, each assignment of the set of assignments is subjected to an execution path constraint 221a. The execution path constraint 221a corresponds to a fixed start time limitation and a fixed path limitation.

At block 405, a cost of reassignment corresponding to each pair of missions of each UAV of the set of same type UAVs is determined. Further, each pair of missions includes an assignment mission and a relocation mission corresponding to each UAV of the set of same type UAVs. In some embodiments, the assignment mission and relocation mission may be referred to as "assignment" and "relocation", respectively. Additionally or alternatively, the cost of reassignment may be referred to as "cost of relocation" Further, based on a determination that a respective pair of pair of missions not satisfies the relocation feasibility constraint 219e, the processor 203a is further configured to determine the cost of reassignment as an infinity corresponding to the respective pair of pair of missions. Further, based on a determination that an assignment mission of the respective pair of pair of missions do not satisfy the first assignment constraint 221b, the processor 203 is further configured to determine the cost of reassignment as the infinity corresponding to the assignment mission of the respective pair of pair of missions.

At block 407, an assignment graph corresponding to each UAV of the set of same type UAVs is constructed based on the determined cost of reassignment corresponding to each pair of missions of each UAV of the set of same type UAVs.

At block 409, a slack time corresponding to each arc in the assignment graph is determined by a function formulated as:
a) (drone, s)∈$A^{first}$(drone)—Set of arcs representing a first relocation of a UAV of the set of same type UAVs, wherein s E S is a first assignment.
b) (drone, s, s')∈$A^{trans}$ (drone)—Set of arcs representing a second relocation of the UAV of the set of UAVs, wherein mission request s' is performed by the UAV of the set of UAVs immediately after the completion of the request s
c) tslack(arc)—A function that takes as input an arc= (drone, s, s') in $A^{trans}$(drone) and returns a slack time that is available in the reassignment of the UAV for the movement between missions s and s'.

At block 411, a list of slack times is determined. In some embodiments, the processor 203a is further configured to determine a list of slack times by arranging each determined slack time corresponding to each arch of the assignment graph in decreasing order.

At block 413, a max-slack time variable is initialized to zero.

At block 415, a slack value from the list of slack times is selected.

At block 417, a subgraph of the assignment graph is derived. The subgraph of the assignment graph corresponds to a collection of paths from each UAV node of the assignment graph to a done node of the assignment graph. The processor 203a is further configured to derive the subgraph based on a determination that each mission is assigned to one path of collection of paths.

At block 419, a determination is made whether the subgraph satisfies each constraint associated with a mixed integer problem to minimize a maximum slack time or not. In some embodiments, to satisfy each constraint associated with the mixed integer problem to minimize a maximum slack time. In some embodiments, the minimization of the maximum slack time corresponds to minimization of a total waiting time and a total relocation miles of the one or more UAVs of the one or more UAVs of set of same type UAV. In other words, the minimization of the maximum slack time minimizes the total waiting time parameter and the total relocation miles parameter.

To satisfy the first assignment constraint 221b, for each UAV of the set of same type UAVs there is no more than one assignment that may be the first assignment performed by the UAV of the set of same type UAVs.

$$\sum\nolimits_{arc=(drone,s)\in A^{first}(drone)} x^{first}(arc) \leq 1 \quad \text{Eq (1)}$$

for all $s \in$ Mission, drone $\in$ Fleet

To satisfy the second assignment constraint 221c, the assignment s for the UAV of the set of same type UAVs must either be (i) a first assignment or intermediate one; or (ii) an intermediate one or last assignment.

$$\sum_{arc=(drone,s)\in A^{first}(drone)} x^{first}(arc) + \sum_{arc=(drone,s',s)\in A^{trans}(drone)} x^{trans}(arc) - \quad \text{Eq (2)}$$

$$\sum_{arc=(drone,s,s')} x^{trans}(arc) - x^{last}(drone, s) = 0$$

for all $s \in$ Shipment, drone $\in$ Fleet

To satisfy the third assignment constraint 221d, each assignment must be assigned to at least one UAV of the set of same type UAVs.

$$\sum_{drone \in Fleet} \left( \sum_{arc=(drone,s) \in A^{first}(drone)} x^{first}(arc) + \sum_{arc=(drone,s',s)\in A^{trans}(drone)} x^{trans}(arc) \right) = 1 \quad \text{Eq (3)}$$

for all $s \in$ Mission

To satisfy the reassignment cost constraint 221e, the determined cost of reassignment corresponding to each assignment of each UAV of the set of same type UAV should not exceed an original cost associated with the heuristic algorithm.

$$\sum\nolimits_{drone \in Fleet} \left( \sum\nolimits_{arc \in A^{first}(drone)} \text{cost}(arc) \cdot x^{first}(arc) + \sum\nolimits_{arc \in A^{trans}(drone)} \text{cost}(arc) \cdot x^{trans}(arc) \right) \leq \text{cost\_current} \quad \text{Eq (4)}$$

To satisfy the maximum slack constraint 221f, the determined slack time should not exceed a maximum slack time denoted by "maxslack".

$$tslack(arc) \cdot x^{trans}(arc) \leq \text{max}slack \quad \text{Eq (5)}$$

for all arc $\in A^{trans}$(drone), drone $\in$ Fleet

Further, the processor 203a is further configured to solve the mixed integer control problem formulated as:

Minimize max*slack* s.t. $Eq\ (1) - Eq\ (5)$ $x^{first}(arc) \in \{0, 1\}$ $x^{trans}(arc) \in \{0, 1\}$ $x^{last}(drone, s) \in \{0, 1\}$ $x^{first}$(arc)—Binary variable denoting if the assignment s is the first assignment performed by drone for all $\in A^{first}$ (drone, s);

$x^{trans}$(arc)—Binary variable denoting if the assignment s is satisfied prior to the s' by drone for all arc $\in A^{trans}$ (drone, s, s');

$x^{last}$(drone, s)—Binary variable denoting if the assignment s is the last assignment performed by drone; and maxslack—Maximum slack time for any of the drones Further, if each constraint associated with the mixed integer control problem is not satisfied, then, at block 423, a determination is made whether the list of slack times is empty or not.

However, if each constraint associated with the mixed integer control problem is satisfied, then, at block 421, a max-slack variable corresponding to the selected slack time is updated.

Further, at block 423, the determination is made whether the list of slack times is empty or not. If the list of slack times is not empty, then go back to the block 415, another slack time is selected from the list of slack times.

However, if the list of slack times is empty, then, at block 425, a determination is made whether the max-slack variable is updated or not. If the max-slack variable is not updated or the value of the max-slack variable is zero, then at block 427, the processor 203*a* is further configured to control the one or more UAVs of the feasible set of UAVs based on the determined first list of assignments.

Further, if the max-slack variable is updated, then, at block 429, the second list of assignments is determined. In some embodiments, the processor 203*a* is further configured to determine the second list of assignments, by adding an assignment corresponding to the value of the updated max-slack variable. In some embodiments, the processor 203*a* is further configured to determine the second list of assignments, by performing the second stage of the multi-stage optimization multiple times before the completion of the mission. In some alternate embodiments, the processor 203*a* is further configured to receive new request data for a new mission. Further, based on the new request data, the processor 203*a* is further configured to perform the second stage of the multi-stage optimization to update the second list of assignments. Further, the processor 203*a* is further configured to control the one or more UAVs of the fleet of UAVs 213*a*1 based on the updated second list of assignments.

At block 431, the one or more UAVs of the set of same type UAVs are controlled to perform the mission, for example, the package delivery. In some embodiments, the processor 203*a* is further configured to control the one or more UAVs of the set of same type UAVs based on the determined second list of assignments for the mission.

Further, in some embodiments, the processor 203*a* of the system 201*a* is further configured to receive confirmation data associated with completion of the mission.

Based on the reception of the confirmation data, the processor 203*a* is further configured to remove the determined assignment from the second list of assignments.

Accordingly, one or more blocks of the methods 300, and 400 support combinations of means for performing the specified functions and combinations of operations for performing the specified functions. It will also be understood that one or more blocks of the methods 300, and 400, and combinations of blocks in the methods 300, and 400 may be implemented by special purpose hardware-based computer systems which perform the specified functions, or combinations of special purpose hardware and computer instructions. Alternatively, the system 201*a* may comprise means for performing each of the operations described above. In this regard, according to an example embodiment, examples of means for performing operations may comprise, for example, the processor 203*a* and/or a device or circuit for executing instructions or executing an algorithm for processing information as described above. On implementing the methods 300, and 400 disclosed herein, the end result generated by the system 201*a* is a tangible application of the efficient delivery of the one or more packages.

In some embodiments, the processor 203*a* is further configured to construct the assignment graph corresponding to each UAV of the set of same type UAVs based on the determined cost of reassignment. Further, the assignment graph comprises a set of nodes corresponding to each assignment of the determined set of same type, and a set of arcs/paths corresponding to a feasibility of reassignment. One or more steps of constructing the assignment graph is explained below in FIG. 5A, FIG. 5B, FIG. 5C, FIG. 5D, FIG. 5E, and FIG. 5F. In one or more embodiments, the system 201*a* may perform the one or more steps of constructing the assignment graph and may be implemented in, for instance the processor 203*a*. As such, the system 201*a* may provide means for accomplishing embodiments of other process described herein in conjunction with other components of the system 201*a*. Although the one or more steps of constructing the assignment graph is illustrated as a sequence of steps corresponding to FIG. 5A, FIG. 5B, FIG. 5C, FIG. 5D, FIG. 5E, and FIG. 5F, its contemplated that various steps of constructing the assignment graph may be performed in any order or combination and need not include all of the illustrated steps.

To that end, some embodiments perform graph-based optimization of the second stage of the multi-stage optimization. These embodiments based on recognition that the graph-based optimization of the second stage of the multi-stage optimization has a structure that ensures polynomial complexity of the optimization problem thereby reducing computational requirement of the multi-stage optimization and allowing to increase the number of UAVs in the fleet.

For example, to perform graph-based optimization of the second stage of the multi-stage optimization, some implementations of these embodiments determine a cost of reassignment of different UAVs to each of the assignments for the missions including the new mission; determine an assignment graph corresponding to each of the different UAVs; determine a subgraph of each of the assignment graphs based on the second set of constraints; and determine, based on the subgraph, the optimized assignments that minimize at least one of a total waiting time and total relocation miles parameters of the fleet of UAVs.

FIG. 5A illustrates a graph 500*a* of corresponding assignments of the one or more UAVs, in accordance with an embodiment. As shown in FIG. 5A, the graph 500*a* indicates starting time for a first relocation R1 503, a first assignment A1 509, a second relocation R2 505, and a second assignment 511 A2 corresponding to a UAV1 501*a*. Further, the graph 500*a* indicates starting time for a third relocation R3 507, a fourth assignment A4 515, and a third assignment 513 corresponding to a UAV2 501*b*. In some embodiments, the UAV1 501*a* and the UAV2 501*b* may be referred to as the UAV1 node and the UAV2 node of the assignment graph, respectively. In some embodiments, the first assignment A1 509, the second assignment A2 511, the third assignment A3 513, and the fourth assignment A4 515 may be referred to as a first assignment node A1, a second assignment node A2, a third assignment node A3, and a fourth assignment node A4 of the assignment graph, respectively.

FIG. 5B illustrates a first step 500*b* of constructing the assignment graph, in accordance with one or more example embodiments. As shown in FIG. 5B, in the first step 500*b*, the processor 203*a* is further configured to arrange the first assignment A1 509, the second assignment A2 511, the third assignment A3 513, and the fourth assignment A4 515 in an ascending order corresponding to the assignments' starting time. Further, the processor 203a is further configured to add a done node 517 at last. Further, in some embodiments, the done node 517 may be referred to as a sink node.

FIG. 5C illustrates a second step 500c of constructing the assignment graph, in accordance with one or more example embodiments. As shown in FIG. 5C, in the second step 500c, the processor 203a is further configured to create an arc corresponding to each assignment if relocation is possible. Further, the processor 203a is further configured to label each arc as [ci, si], wherein ci indicates a reassignment cost and si indicates a slack time corresponding to at least two assignments of each arc. Hence, the processor 203a is further configured to label a first arc 519 between the first assignment node A1 509 and the fourth assignment node A4 515 as [$c_1$, $s_1$], label a second arc 521 between the first assignment node A1 509 and the second assignment node A2 515 as [$c_2$, $s_2$], label a third arc 523 between the first assignment node A1 509 and the third assignment node A3 513 as [$c_3$, $s_3$], and label a fourth arc 525 between the fourth assignment node A4 515 and the third assignment node A3 513 as [$c_3$, $s_3$].

FIG. 5D illustrates a third step 500d of constructing the assignment graph, in accordance with one or more example embodiments. As shown in FIG. 5D, in the third step 500d, the processor 203a is further configured to create an arc to the done node 517 from each assignment node. Further, the processor 203a is further configured to mark each arc to the done as [0, 0]. Hence, the processor 203a is further configured to label a fifth arc 527 between the first assignment node A1 509 and the done node 517 as [0, 0], label a sixth arc 529 between the second assignment node A2 509 and the done node 517 as [0, 0], label a seventh arc 531 between the third assignment node A3 509 and the done node 517 as [0,0], and an eight arc 533 between the fourth assignment node A4 515 and the done node 517 as [0,0]. In some embodiments, the fifth arc 527 is selected to indicate that the first assignment A1 509 is a last assignment corresponding to the UAV1 501a or the UAV2 501b.

FIG. 5E illustrates a fourth step 500e of constructing the assignment graph, in accordance with one or more example embodiments. As shown in FIG. 5E, in the fourth step 500e, the processor 203a is further configured to add the UAV1 node 501a and the UAV2 node 501b to the assignment graph. Further, the processor 203a is further configured to create arcs from the UAV1 node 501a and the UAV2 node 501b to each assignment node if a relocation feasible. Further, the processor 203a is further configured to label arcs as [$c'_i$, $s'_i$], wherein $c'_i$ indicates a reassignment cost and $s'_i$ indicates a slack time corresponding to the UAVs associated with the assignment graph. Hence, the processor 203a is further configured to label a ninth arc 535 between the UAV1 node 501a and the first assignment node A1 509 as [$c'_i$, $s'_1$], a tenth arc 537 between the UAV1 node 501a and the fourth assignment node A4 515 as [$c'_2$, $s'_2$], an eleventh arc 539 between the UAV1 node 501a and the second assignment node A2 511 as [$c'_3$, $s'_3$], a twelfth arc 541 between the UAV1 node 501a and the third assignment node A3 513 as [$c'_4$, $s'_4$], a thirteenth arc 543 between the UAV2 node 501b and the fourth assignment node A4 515 as [$c'_5$, $s'_5$], a fourteenth arc 545 between the UAV2 node 501b and the second assignment node A2 511 as [$c'_6$, $s'_6$], and a fifteenth arc 547 between the UAV2 node 501b and the third assignment node A3 513 as [$c'_7$, $s'_7$]. In some embodiment, one arc corresponding to a UAV node and an assignment node is selected to indicate that the corresponding assignment is the first assignment.

FIG. 5F illustrates a final step 500f of constructing the assignment graph, in accordance with one or more example embodiments. As shown in FIG. 5F, in the final step 500f, the processor 203a is further configured to add from each UAV node to the done node 517. Further, the processor 203a is further configured to label a sixteenth arc 549 between the UAV1 and the done node 517 as [0, 0], and a seventeenth arc 551 between the UAV2 and the done node 517 as [0, 0]. In some embodiments, the processor 203a is further configured to select the sixteenth arc 549 to indicate that the UAV1 501a performed the one or more package deliveries.

In such a manner, the assignment graph is constructed. Further, the slack time corresponding to each arc in the assignment graph is determined based on the function, as explained above at block 409 of FIG. 4. Furthermore, the determined slack time corresponding to each arc in the assignment graph is used to determine the second list of assignments, as explained above in FIG. 4.

In some embodiments, the request data 215 (explained in FIG. 2C) and service data may be received from different participants involved in the delivery services. Different user interfaces may be provided for the different participants. For instance, a consumer interface may be provided for one or more service consumers, and a service interface may be provided for one or more service providers. The one or more service consumers may input the request data 215 via the service interface, and the one or more service providers may input the service data via the service interface. Each of such different user interfaces are described in detail below in FIG. 6, FIG. 7, FIG. 8, and FIG. 9.

FIG. 6 illustrates a consumer interface 600 for receiving the request data 215, in accordance with an embodiment. In some embodiments, the processor 203a is further configured to receive the request data 215 from the one or more service consumers via a consumer interface 600. As shown in FIG. 6, the consumer interface 600 includes a package-management option 601, a shipment-report option 603, a cost-report option 605, an organization option 607, a payment option 609, a member-detail option 611, a locations-details option 613, a request information User Interface (UI) box 617, and a track-orders search bar 615.

Further, the payload-management option 601 is configured to update at least one of the request receiving date 215i, the mission completion date 215g, the payload weight 215a, and one or more payload dimensions 21b corresponding to the request data 215.

The shipment-report option 603 is configured to generate a shipment report based on at least one of the request receiving date 215i, the mission completion date 215g, the payload weight 215a and the one or more payload dimensions 215b, to provide shipment details corresponding to the request data 215.

The cost-report option 605 is configured to generate a cost report based on at least one of the request receiving date 215i, the mission completion date 215g, the payload weight 215a and the one or more payload dimensions 215b, to provide cost details corresponding to the request data 215.

The organizations option 607 is configured to display organization details, wherein the organization details include an organization name and organization location.

The payment option 609 is configured to receive payment details corresponding to the one or more service consumers.

The members-detail option 611 is configured to display details of the one or more service consumer, wherein the members-details include a member name, a member ID, and an order history.

The locations-details option 613 is configured to display one or more locations corresponding to the one or more terminal locations.

The request information UI box 617 is configured to display content associated with the one or more options associated with the consumer interface 600, wherein the content includes, but is not limited to text, lists, images, and media.

The track-orders search bar 615 is configured to search the content associated with one or more options associated with the consumer interface 600. In one embodiment, the request information UI box 617 is configured to display a requests data table. The request data table comprises a payload order-id list corresponding to an order-id associated with one or more missions, a pick-up date list corresponding to the mission initialization date 215*e* associated with one or more packages deliveries, a drop-off date list corresponding to the mission completion date 215*g* associated with the one or more packages, a pick-up location list corresponding to the one or more origin terminal locations, a drop-off location list corresponding to the one or more destination location, a first order status list corresponding to an order status such as an on-time status and delayed status of the one or more missions, for example, one or more delayed package deliveries. The consumer interface 600 is configured to display real-time media data of the one or more UAVs to the one or more consumers. The real-time media data, for example, includes real time video data associated with a camera of the UAV. In some embodiments, the consumer interface 600 is configured to display alerts corresponding to the one or more options of the consumer interface 600. In some embodiments, the consumer interface 600 is configured to display a mission cancel alert, for example, a package cancel alert corresponding to the cancel request. In some embodiments, the consumer interface 600 is configured to display a mission confirmation alert, for example, a package confirmation alert corresponding to the confirmation of the mission. In some embodiments, the consumer interface 600 is configured to display a delay alert corresponding to a delay in the mission, for example, the one or more delayed package deliveries.

In some embodiments, the options of the consumer interface 600 allow the one or more consumers to track the one or more missions, for example, one or more package orders. For example, the one or more consumers may track the one or more package orders using the track-orders search bar 615 and the request information UI box 617 options of the consumer interface 600.

FIG. 7 illustrates a shipment interface 700 for receiving the shipment data, in accordance an example embodiment. In some embodiments, the shipment interface 700 is configured to receive the assignment data 217. As shown in FIG. 7, the shipment interface 700 comprises a live-map option 701, a mission-main-menu option 703, a dashboard option 705, a mission option 707, a service option 709, an alerts-option 711, a calendar option 713, a shipment-management option 715, a shipment-reports option 717, a missions search bar 719, and a shipment-information UI box 721.

The live-map option 701 is configured to live-location data corresponding to at least one assignment of the first list of assignments and the second list of assignments. The mission-main-menu option 703 is configured to display a mission-main menu corresponding to the at least one assignment of the first list of assignments and the second list of assignments, wherein the mission-main menu includes one or more of a title, a logo, an option list, a bonus section, and mission records, for example, delivery records corresponding to the one or more package deliveries. The dashboard option 705 is configured to display one or more charts, one or more graphs, one or more data tables, one or more filters and one or more navigation buttons. The mission option 707 is configured to display at least one of a start date, the initial terminal location, a destination terminal location, and a pilot name. The service option 709 is configured to display one or more locations where unmanned aerial services are enabled. The alerts-option 711 is configured to display a first alert after the initialization of the mission, for example, picking up of the package from the initial terminal and display a second alert after the completion of the mission, for example, package delivery at the destination terminal. The calendar option 713 is configured to display a calendar to the one or more drone operators. The shipment-management option 715 is configured to open a shipment management interface, wherein the management interface is configured to manage one or more shipments of the one or more UAVs. The shipment-reports option 717 is configured to a report interface, wherein the report interface is configured to generate one or more shipment reports corresponding to the one or more shipments and display the one or more shipment reports.

The shipment-information UI box 721 is configured to display shipment-content corresponding to the one or more options associated with the shipment interface 700, wherein the shipment-content includes, but is not limited to text, lists, images, and media. The missions search bar 719 is configured to search the content associated with the one or more options associated with the shipment interface 700. In one embodiment, the shipment-information UI box 721 is configured to display a shipment table. The shipment table comprises a request id corresponding to the one or more assignments of the one or more UAVs, a second order status list corresponding to the order status such as an on-time status and delayed status of the one or more packages, a start-date list corresponding to the mission initialization date 215*e* associated with the one or more packages, a departure terminal list corresponding to the one or more origin terminal locations, an arrival terminal list corresponding to the one or more destination terminal locations, and a UAV pilot name list corresponding to the one or more UAV operators.

In some embodiments, the shipment interface 700 is configured to provide one or more flight controls of the one or more UAVs to the one or more UAV operators. In some embodiments, the shipment interface 700 is configured to provide real-time media data of the one or more UAVs to the one or more UAV operators. In some embodiments, the shipment interface 700 is configured to display a UAV status to the one or more UAV operators. The UAV status comprises a battery level, a signal strength, a UAV speed, a UAV altitude, and the like. In some embodiments, the shipment interface 700 is configured to display an unrestricted-area access alert corresponding to a UAV flight in an unrestricted area. In some embodiments, the shipment interface 700 is configured to enable an automatic flight option of the one or more UAVs.

According to some embodiments, the options of the shipment interface 700 allow the drone operators to analyze various shipments. For instance, the drone operators may use the shipment-reports option 717 to generate the shipment report. Further, the options of the shipment interface 700 provide regular updates to the service consumers regarding the mission. For instance, the alerts-option 711 is configured to display the first alert after the initialization of the mission, for example, picking up of the package from the initial terminal and display the second alert after the completion of the mission, for example, package delivery at the destination terminal.

FIG. 8 illustrates a service interface 800 for receiving the service data, in accordance an example embodiment. In some embodiments, the service interface 800 is configured to receive service data from one or more service providers. The service data includes, but is not limited to, one or more service-tasks data, ground handling data, service invoice data, and ground handling invoices data. As shown in FIG. 8, the service interface includes a service-main-menu option 801, an overview option 803, a service-tasks option 805, a ground-handling-tasks-option 807, a service-alerts-option 809, a ground-handling-alerts-option 811, a service-invoices-option 813, a ground-handling-invoices-option 815, a service-management-option 817, a first service-information UI content box 819, a second service-information UI content box 821, a third service-information UI content box 823, and a fourth service-information UI content box 825.

The service-main-menu option 801 is configured to display a service main-menu to the one or more service providers. The overview option 803 is configured to display an overview associated with the service data. The service-tasks option 805 is configured to receive the service-tasks data, wherein the service tasks data includes one or more pre-flight inspection service data, battery recharging service data, and parking services data. Further, the service-tasks option 805 is configured to display the service tasks data to the one or more service providers. The ground-handling-tasks-option 807 is configured to receive the ground handling data that includes refueling service data and maintenance service data. Further, the ground handling-tasks-option 807 is configured to display the ground handling data to the one or more service consumers. The service-alerts option 809 is configured to display a first service-alert corresponding to the service tasks data. The ground handling alerts option 811 is configured to display a second alert corresponding to the ground handling tasks data. The service-invoices option 813 is configured to receive the service invoice data, wherein the service invoice data includes a list of service invoices corresponding to the service data. Further, the service-invoices option 813 is configured to display the list of service invoices to the one or more service consumers. The ground-handling invoices option 815 is configured to receive the ground handling invoices data that includes a list of ground handling invoices corresponding to the ground handling data. Further, the ground-handling invoices option 815 is configured to display the list of ground handling invoices to the one or more consumers. The service management option 817 is configured to update the list of service invoices and the list of ground handling invoices.

Further, the first service-information UI content box 819, the second service-information UI content box 821, the third service-information UI content box 823, and the fourth service-information UI content box 825 are configured to display service-content corresponding to the one or more options associated with the service interface 800. The service-content includes, but is not limited to, text, lists, images, and media. In one embodiment, the first service-information UI content box 819 is configured to display one or more updates corresponding to the assignment data 217 of the one or more UAVs. In one embodiment, the second service-information UI content box 821 is configured to display one or more open tasks corresponding to the assignment data 217 of the one or more UAVs. In one embodiment, the third service-information UI content box 823 is configured to display a list of upcoming assignments corresponding to the assignment data 217 of the one or more UAVs. In one embodiment, the fourth service-information UI content box 825 is configured to display one or more images corresponding to the one or more origin terminal locations and the one or more destination terminal locations.

In some embodiments, the service interface 800 is configured to display a maintenance alert to alert one or more UAV operators for scheduled servicing at the one or more terminal locations. In some embodiments, the service interface 800 is configured to display an overdue alert to one or more UAV operators for due servicing at the one or more terminal locations. In some embodiments, the service interface 800 is configured to generate a service-history of the one or more UAVs. Further, the service interface 800 is further configured to display the service-history to the one or more UAVs operators.

According to some embodiments, the options of the service interface 800 allow the service providers to efficiently maintain the UAVs. For example, the ground-handling-tasks-option 807 is configured to receive the refueling service data and maintenance service data. The service-alerts option 809 is configured to provide different alters related to the service tasks data that includes one or more of the pre-flight inspection service data, the battery recharging service data, and the parking services data.

FIG. 9 illustrates a manufacturer interface 900 for receiving manufacture data, in accordance with an example embodiment. In some embodiments, the processor 203a is further configured to receive the manufacture data via the manufacturer interface 900. The manufacture data includes specifications of each UAV of the fleet of UAVs, a list of one or more UAV manufacturers, and a list of details corresponding to each UAV manufacturer. As shown in FIG. 9, the manufacturer interface 900 includes a manufacturer-overview option 901, a manufacturer-member option 903, a manufacturer-organization-details option 905, a first manufacture-information UI content box 907, a second manufacture-information UI content box 909, a third manufacture-information UI content box 911, and a fourth manufacture-information UI content box 913. The manufacturer-overview option 901 is configured to display the specifications of each UAV manufactured by a particular manufacturer, or one or more manufacturers, wherein the specifications of each UAV include UAV status, UAV model, UAV weight, and a maximum speed of the UAV, and the like. The manufacturer-members option 903 is configured to display the list of the one or more UAV manufacturers. The manufacturer-organization-detail option 905 is configured to display the list of details corresponding to each UAV manufacturer in the list of the one or more UAV manufactures.

Further, the first manufacture-information UI content box 907, the second manufacture-information UI content box 909, the third manufacture-information UI content box 911, and the fourth manufacture-information UI content box 913 are configured to display manufacture-content corresponding to the one or more options associated with the manufacturer interface 900. The manufacture-content includes, but is not limited to, text, lists, images, and media. In one embodiment, the first manufacturer-information UI content box 907 is configured to display the manufacture data corresponding to a first type of UAV. In one embodiment, the second manufacture-information UI content box 909 is configured to display the manufacture data corresponding to a second type of UAV. In one embodiment, the third manufacture-information UI content box 911 is configured to display the manufacture data corresponding to a third type of UAV. In one embodiment, the fourth manufacture-information UI content box 913 is configured to display the manufacture data corresponding to a fourth type of UAV.

In some embodiments, the manufacturer interface 900 is configured to display UAV manual data to the one or more drone operators. The UAV manual data includes but is not limited to a user manual, a technical documentation, and a maintenance guide. In some embodiments, the manufacturer interface 900 is configured to display a UAV warranty data of the one or more UAVs to the one or more UAV operators. In some embodiments, the manufacturer interface 900 is configured to display one or more 3D models of the one or more UAVs.

According to some embodiments, the options of the manufacturer interface 900 allow the service consumers to view the one or more UAV manufacturers. For instance, the service consumers may use the manufacturer-members option 903 which is configured to display the list of the one or more UAV manufacturers. Further, the service consumers may view details of a particular manufacturer using the manufacturer-organization-detail option 905.

Further, in some embodiments, the one or more missions correspond to one or more package delivery missions. Accordingly, a use case of the system 201*a* of the present disclosure is described below in FIG. 10A. In particular, controlling of a UAV according to a trajectory for performing the package delivery mission is explained below in FIG. 10A.

FIG. 10A illustrates a schematic of a trajectory diagram 1000*a* for controlling of the UAV 213*a* of the fleet of UAVs 213*a*1 for performing the package delivery mission, in accordance with an example embodiment. As shown in FIG. 10A, the trajectory diagram 1000*a* includes the initial terminal 213*e*, an origin terminal 1003, a destination terminal 1009, a static service terminal 1013, and a successor assignment's origin terminal 1015. In one embodiment, the fleet of the UAVs comprises the UAV 213*a*, the UAV 213*b*, the UAV 213*c*, the UAV 213*d* located at the initial terminal 213*e*, and the UAV 1013*a*, the UAV 1013*b*, the UAV 1013*c* located at the static service terminal 1013. Further, the initial terminal 213*e* comprises a landing pad 1005*a*, and a landing pad 1005*b*. The destination terminal 1009 comprises a landing pad 1011*a*, and a landing pad 1011*b*. The successor assignments' origin terminal 1015 comprises a landing pad 1017*a*, and the landing pad 1017*b*.

In one embodiment, the processor 203*a* is further configured to determine a trajectory 1001*a* for the UAV 213*a* for picking up the package 1007*a* from the origin terminal 1003, based on a delivery assignment corresponding to the UAV 213*a* in the second list of assignments. The processor 203*a* is further configured to determine a first set of control commands to track the trajectory 1001*a*. Further, the processor 203*a* is further configured to control the UAV 213*a* based on the determined first set of control commands for picking up the package 1007*a*. In one embodiment, the processor is further configured to determine a trajectory 1001*b* for delivering the package 1007*a* to the destination terminal 1009, based on the assignment corresponding to the UAV 213*a* in the second list of assignments. The processor 203*a* is further configured to determine a second set of control commands to track the trajectory 1001*b*. Further, the processor 203*a* is configured to control the UAV 213*a* based on the determined second set of control commands for delivering the package 1007*a*. In one embodiment, the processor 203*a* is further configured to determine a trajectory 1001*c* for the UAV 213*a* for servicing at the service terminal 1013, based on the assignment corresponding to the UAV 213*a* in the second list of assignments. The processor 203*a* is further configured to determine a third set of control commands to track the trajectory 1001*c*. Further, the processor 203*a* is further configured to control the UAV 213*a* based on the determined third set of control commands for servicing at the service terminal 1013. In one embodiment, the processor 203*a* is further configured to determine a trajectory 1001*d* for the UAV 213*a* for picking up a package 1019*a* from the successor assignments' origin terminal 1015, based on the assignment corresponding to the UAV 213*a* in the second list of assignments. The processor 203*a* is further configured to determine a fourth set of control commands to track the trajectory 1001*d*. Further, the processor 203*a* is further configured to control the UAV 213*a* based on the determined fourth set of control commands for picking up the package 1019*a*.

Further, in some embodiments, the one or more missions correspond to one or more infrastructure inspections missions. Accordingly, a use case of the system 201*a* of the present disclosure is described below in FIG. 10B. In particular, controlling of the UAV according to a trajectory for performing an infrastructure inspection mission is explained below in FIG. 10B.

FIG. 10B illustrates controlling of the UAV 213*a* of the fleet of UAVs 213*a*1 for performing the infrastructure inspection mission, in accordance with an example embodiment. As shown in FIG. 10B, a drone operator 1021 generates request data 1023 for an inspection of an infrastructure 1025 via the system 201*a*. In one embodiment, the processor 203*a* is further configured to receive the request data 215. The request data 215 may include an infrastructure location data, an infrastructure portion data, and the like. The infrastructure location data indicate a location of the infrastructure 1025 that is to be inspected. The infrastructure portion data indicate one or more portions of the infrastructure 1025 that are to be inspected. Further, based on the received request data 215, the processor 203*a* is further configured to determine a trajectory 1001*e* for the UAV 213*a* for performing the inspection of the infrastructure 1025, based on an inspection assignment corresponding to the UAV 213*a* in the second list of assignments. The processor 203*a* is further configured to determine a first set of control commands to track the trajectory 1001*e*. Further, the processor 203*a* is further configured to control the UAV 213*a* based on the determined first set of control commands for the inspection of the infrastructure 1025. In some embodiments, the processor 203*a* is further configured to control one or a combination of the UAV current location 217*h*, UAV current height 217*i* and UAV current speed 217*j* based on the request data 215. Further, the processor 203*a* is further configured to control the UAV 213*a* to receive an infrastructure inspection data 1029 associated with the one or more portions of the infrastructure 1025, for example an infrastructure portion 1027. The infrastructure inspection data 1029 include, but are not limited to, infrastructure rooftop data, infrastructure blueprint data, infrastructure media data, and the like Further, based on the infrastructure inspection data 1029, the processor 203*a* is further configured to identify damage 1031 corresponding to the infrastructure portion 1027.

In some embodiments, the processor 203*a* is configured to display the infrastructure inspection data 1029 on the user interface(s) 209*a* of the system 201*a*. Further, based on the displayed infrastructure inspection data 1029, the drone operator 1021 may inspects the infrastructure 1025.

Some embodiments are based on the realization that a combination of the static service terminal 1013 and a mobile terminal may be used to provide efficient delivery services. To that end, additionally or alternatively, in some embodiments, a mobile terminal may be used to provide one or drone services by deploying the mobile terminal to one or more remote locations.

FIG. 11 illustrates a block diagram 1100 of a mobile terminal 1101, in accordance with an example embodiment. As shown in FIG. 11, the mobile terminal 1101 includes a landing pad 1105a, a landing pad 1105b, a refilling mechanism 1107, a supply unit 1109, a processor 1111, a communication module 1113, a refilling module 1115. The mobile terminal 1101 is mounted on a vehicle 1103 such as a truck that may be operated by a driver or autonomously by a ground vehicle controller. The vehicle 1103 may comprise one or more sensors. The one or more sensors include, but are not limited to geolocation sensors, light sensors, proximity sensors, image sensors, and the like. In some embodiments, the processor 1111 is further configured to determine a reduced amount of fuel of each UAV of the fleet of UAVs 213a1 based on the first stage of the optimization.

Further, based on the determined reduced amount of fuel, the processor 1111 is further configured to transform a non-feasible UAV of the fleet of UAVs to a feasible UAV to perform the mission. Further, in some embodiments, the processor 1111 is further configured to transform the non-feasible UAV to the feasible UAV 117 by changing a location of the mobile terminal 1101 based on the first stage of the optimization. In one embodiment, the processor is configured to recover the non-feasible UAV on the landing pad 1105a of the mobile terminal 1101. In one embodiment, the processor 1111 is configured to transform the non-feasible UAV to the feasible UAV by refilling fuel using the refilling mechanism 1107. Further, the refilling mechanism 1107 is associated with the refilling module 1115 and the supply unit 1109.

The refilling mechanism 1107 is integrated into the mobile terminal 1101 and is coupled with each landing pad of the mobile terminal 1101 via the communication module 1113. The communication module 1113 is configured to obtain the assignment data 217 of a UAV, for example, the UAV 213a, that is landed on a respective landing pad of the mobile terminal 1101, for example, the landing pad 1105a. Further, based on the obtained assignment data 217, the refiling mechanism 1107 is configured to perform refiling of resources for the one or more missions associated with the one or more UAVs. The resources may include, but are not limited to: fuel, energy, consumables, fluids and materials. The refilling mechanism 1107 may include resource containers, flow control valves, resource compatibility sensors, a pumping mechanism, a recharging mechanism, a pressure monitoring system, flow rates sensors, safety interlocks, a leak detection system, and a refiling control panel.

Further, the supply unit 1109 is connected with the refilling mechanism 1107 via the refilling module 1115. The refilling module 1115 is configured to receive a resource request from the refilling mechanism 1107. Further, based on the resource request, the supply unit 1109 is configured to provide the resources to the refilling mechanism 1107. Additionally, the supply unit 1109 is further configured to store, distribute, control, and monitor the resources for the one or more missions.

FIG. 12 illustrates an exemplar UAV 1200 used for delivery services, in accordance with an example embodiment. The UAV 1200 corresponds to one of UAVs of the fleet of UAVs 213a1, e.g., the UAV 213a. As shown in FIG. 12, the UAV 1200 comprises a rotor blade 1201a, a rotor blade 1201b, a rotor blade 1201c, a rotor blade 1201d, and a mechanical claw 1203 for carrying a package 1205.

In some embodiments, the UAV 1200 may be a single-rotor UAV that comprises a single rotor blade. In some embodiments, the UAV 1200 may be a Tri copter that comprises three rotor blades. In some embodiments, the UAV 1200 is a quadcopter that comprises four rotor blades. In some embodiments, the UAV 1200 is a hex copter that comprises six rotor blades. In some embodiments, the UAV 1200 is an octocopter that comprises eight rotor blades. In some embodiments, the UAV 1200 having more than one rotor blade may be referred to as multi-rotor UAV. Further, in some embodiments, the UAV 1200 is a fixed-wing UAV that comprises a fixed wing. In some embodiments, the UAV 1200 is a fixed-wing hybrid vertical take-off landing (VTOL) UAV that is a hybrid of the fixed-wing UAV and VTOL aircrafts. In some embodiments, the one or more rotors may be referred to as "one or more propellers".

Further, the UAV 1200 may include one or more means for carrying the package 1205. The one or more means include, but are not limited to, vacuum mechanism, magnetic mechanism, electro-magnetic mechanism, or suction cup fastening mechanism.

In some embodiments, the UAV 1200 may comprise a rotor assembly (not shown) to generate lift and thrust. The rotor assembly includes, but is not limited to a rotor hub, a rotor blade, a drive system, a fuselage, and a payload module. In some embodiments, the rotor hub is mounted on central axis of fuselage, allowing for rotation around the central axis of fuselage. The rotor blade is attached to the rotor hub. Further the rotor blade is rotated to generate the lift and thrust. The drive system is integrated into a power source to impart rotational motion to the rotor blade, enabling flight operation of the exemplary UAV 1200.

In some embodiments, the fuselage is a rigid structure that comprises one or more components for enabling the flight operation of the UAV 1200. The one or more components include, but are not limited to, the power source, and a flight control system. The power source is used to provide power to the rotor assembly. In one embodiment, the power source is an electric motor. Further, in some embodiments, the power source is a combustion engine. In some embodiments, the flight control system is used for maintaining stability of the UAV 1200. In some embodiments, the flight control system is used for controlling one or more flight parameters. Further, in some embodiments, the flight control system is used to receive and process input commands. The payload module enables attachment and transportation of one or more payloads. In one embodiment, the payload module is positioned beneath the rotor assembly. In one embodiment, the payload module is centrally located within the fuselage. In one embodiment, the payload module is integrated into a separate compartment. The payload module includes, but is not limited to cameras, sensors, and delivery mechanisms.

In some embodiments, a variable-pitch mechanism is incorporated in the UAV 1200. The variable pitch mechanism allows for dynamic adjustment of the rotor blade's angle during flight. The variable-pitch mechanism enables precise control over the lift and thrust generation. The variable-pitch mechanism provides maneuverability, stability, and responsiveness in bad weather conditions such as snowstorm, heavy rainfall and the like. In some embodiments, the variable-pitch mechanism is used to perform complex flight maneuvers.

In some embodiments, a gyroscopic stabilization mechanism is incorporated in the UAV 1200. The gyroscopic stabilization mechanism provides stability and counteracts a torque generated by rotation of the rotor blade. The gyroscopic stabilization mechanism comprises one or more sensors. The one or more sensors are used to detect and measure an angular movement of the UAV 1200. Based on the measured angular mechanism, the flight control system adjusts a rotation speed of rotor blade and a blade pitch of rotor blade for maintaining balance during the flight.

In some embodiments, a swashplate mechanism is integrated into the UAV 1200. The swashplate mechanism allows for cyclic control the pitch of rotor blade at one or more points along a length of rotor blade. By adjusting the pitch of the blade pitch cyclically, the UAV 1200 achieves movement in one or more directions such as forward, backward, sideways, rotation, and the like.

In some embodiments, one or more avionics systems are incorporated in the UAV 1200 for controlling and monitoring the flight. The one or more avionics systems comprise one or more sensors, one or more onboard processors, and a communication module. The one or more avionics systems collect data from the one or more sensors such as GPS, altimeters, gyroscopes, accelerometers, and magnetometers, multispectral sensors, thermal sensors to determine an exemplary UAV position, an exemplary UAV altitude, an exemplary UAV orientation and the like. The one or more avionics systems process the collected data to adjust the one or more control surfaces.

In some embodiments, a communication module facilitates communication between the UAV 1200 and a ground control station (GCS). The communication module enables a real-time data transmission, a telemetry monitoring, a control signal exchange, and the like between the UAV 1200 and a drone operator. In some embodiments, the communication module employs one or more wireless technologies such as a radio frequency (RF), a satellite communication, one or more cellular networks, and the like to communicate with the GCS.

In some embodiments, the assignment determined by the system 201*a* for the UAV of the fleet of UAVs 213*a*1 for the mission is transmitted to a controller associated with the UAV. The controller of the UAV is configured to determine a trajectory for the mission based on the received assignment. Further, the controller determines control commands that cause the UAV to track the trajectory. Alternatively, in some embodiments, the system 201*a* determines the control commands to track the trajectory. The system 201*a* further transmits determined control commands to the controller. The controller controls the UAV according to the control commands to track the trajectory for the mission. Such a controller of the UAV is explained below in FIG. 13.

FIG. 13 illustrates a block diagram 1300 of a controller 1301 for the exemplar UAV 1200 according to an exemplary embodiment. Referring to FIG. 12, the exemplar UAV 1200 comprises the controller 1301 for controlling the exemplar UAV 1200. As shown in FIG. 13, the controller 1301 of the UAV 1200 according to an exemplary embodiment may be a computer, a mobile phone, a digital broadcast terminal, a messaging device, a game console, a tablet device, a medical device. Equipment, fitness equipment, personal digital assistants, drone controllers, etc. The controller 1301 includes a processing component 1303, a memory 1305, a power component 1307, a multimedia component 1309, an audio component 1311, an input/output (I/O) interface 1313, a sensor component 1315, and a communication component 1317. The processing component 1303 typically controls the overall operation of the controller 1301, such as operations associated with display, telephone calls, data communications, camera operations, and recording operations. The processing component 1303 can include one or more processors to execute instructions to perform all or part of the steps of the above described methods. Moreover, processing component 1303 can include one or more modules to facilitate interaction between the components. For example, the processing component 1303 can include a multimedia module to facilitate interaction between the multimedia component 1309 and the processing component 1303. The memory 1305 is configured to store various types of data to support operation at the controller 1301. Examples of data include instructions for any application or method operating on the controller 1301, contact data, phone book data, messages, pictures, videos, and the like. The memory 1305 can be implemented by any type of volatile or non-volatile storage device, or a combination thereof, such as static random access memory (SRAM), electrically erasable programmable read only memory (EEPROM), erasable. Programmable Read Only Memory (EPROM), Programmable Read Only Memory (PROM), Read Only Memory (ROM), Magnetic Memory, Flash Memory, Disk or Optical Disk. The power component 1307 provides power to various components of controller 1301. Power component 1307 can include a power management system, one or more power sources, and other components associated with generating, managing, and distributing power for controller 1301.

The multimedia component 1309 includes a screen between the controller 1301 and the user that provides an output interface. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touch or sliding action, but also the duration and pressure associated with the touch or slide operation. In some embodiments, the multimedia component 1309 includes a front camera and/or a rear camera. When the controller 1301 is in an operation mode, such as a shooting mode or a video mode, the front camera and/or the rear camera can receive external multimedia data. Each front and rear camera can be a fixed optical lens system or have focal length and optical zoom capabilities. The audio component 1311 is configured to output and/or input an audio signal. For example, the audio component 1311 includes a microphone (MIC) that is configured to receive an external audio signal when the controller 1301 is in an operational mode, such as a call mode, a recording mode, and a voice recognition mode. The received audio signal may be further stored in memory 1305 or transmitted via communication component 1317. In some embodiments, the audio component 1311 also includes a speaker for outputting an audio signal. The I/O interface 1313 provides an interface between the processing component 1303 and a peripheral interface module, which may be a keyboard, a click wheel, a button, or the like. These buttons may include, but are not limited to, a home button, a volume button, a start button, and a lock button.

The sensor component 1315 includes one or more sensors for providing various aspects of state assessment for controller 1301. For example, sensor component 1315 can detect an open/closed state of controller 1301, relative positioning of components, such as the display and keypad of controller 1301, and sensor component 1315 can also detect a change in position of one component of controller 1301. The presence or absence of user contact with controller 1301, controller 1301 orientation or acceleration/deceleration, and temperature change of controller 1301. The sensor component 1315 may include proximity transmission A sensor configured to detect the presence of nearby objects without any physical contact. The sensor component 1315 can also include a light sensor, such as a Complementary Metal-Oxide Semiconductor (CMOS) or Charge Coupled Device (CCD) image sensor, for use in imaging applications. In some embodiments, the sensor component 1315 can also include an acceleration sensor, a gyro sensor, a magnetic sensor, a pressure sensor, or a temperature sensor. The communication component 1317 is configured to facilitate wired or wireless communication between controller 1301 and other devices. The controller 1301 can access a wireless network based on a communication standard, such as Wi-Fi, 2G or 3G, or a combination thereof.

In an exemplary embodiment, communication component 1317 receives broadcast signals or broadcast associated information from an external broadcast management system via a broadcast channel. In an exemplary embodiment, the communication component 1317 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies. In an exemplary embodiment, controller 1301 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above methods. In an exemplary embodiment, there is also provided a non-transitory computer readable storage medium comprising instructions, such as a memory 1305 comprising instructions executable by the processing component 1303 of the controller 1301 to perform the above method. For example, the non-transitory computer readable storage medium may be a ROM, a random access memory (RAM), a (Compact Disc-Read Only Memory) CD-ROM, a magnetic tape, a floppy disk, and an optical data storage device. Wherein, when the instructions in the storage medium are executed by the processor, the controller 1301 is enabled to perform the control the exemplary UAV 1200.

FIG. 14 illustrates a schematic of a computing device 1400 for implementing the system 201*a* and methods 300 and 400 of the present disclosure, in accordance with an example embodiment. The computing device 1400 includes a power source 1401, a processor 1403, a memory 1405, a storage device 1407, all connected to a bus 1409. Further, a high-speed interface 1411, a low-speed interface 1413, high-speed expansion ports 1415 and low speed expansion ports 1417, can be connected to the bus 1409. In addition, a low-speed expansion port 1419 is in connection with the bus 1409. Further, an input interface 1421 can be connected via the bus 1409 to an external receiver 1423 and an output interface 1425. A receiver 1427 can be connected to an external transmitter 1429 and a transmitter 1431 via the bus 1409. Also connected to the bus 1409 can be an external memory 1433, external sensors 1435, machine(s) 1437, and an environment 1439. Further, one or more external input/output devices 1441 can be connected to the bus 1409. A network interface controller (NIC) 1443 can be adapted to connect through the bus 1409 to a network 1445, wherein data or other data, among other things, can be rendered on a third-party display device, third party imaging device, and/or third-party printing device outside of the computing device 1400.

The memory 1405 can store instructions that are executable by the computing device 1400 and any data that can be utilized by the methods and systems of the present disclosure. The memory 1405 can include random access memory (RAM), read only memory (ROM), flash memory, or any other suitable memory systems. The memory 1405 can be a volatile memory unit or units, and/or a non-volatile memory unit or units. The memory 1405 may also be another form of computer-readable medium, such as a magnetic or optical disk.

The storage device 1407 can be adapted to store supplementary data and/or software modules used by the computing device 1400. The storage device 1407 can include a hard drive, an optical drive, a thumb-drive, an array of drives, or any combinations thereof. Further, the storage device 1407 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1403), perform one or more methods, such as those described above.

The computing device 1400 can be linked through the bus 1409, optionally, to a display interface or user Interface (HMI) 1447 adapted to connect the computing device 1400 to a display device 1449 and a keyboard 1451, wherein the display device 1449 can include a computer monitor, camera, television, projector, or mobile device, among others. In some implementations, the computing device 1400 may include a printer interface to connect to a printing device, wherein the printing device can include a liquid inkjet printer, solid ink printer, large-scale commercial printer, thermal printer, UV printer, or dye-sublimation printer, among others.

The high-speed interface 1411 manages bandwidth-intensive operations for the computing device 1400, while the low-speed interface 1413 manages lower bandwidth-intensive operations. Such an allocation of functions is only an example. In some implementations, the high-speed interface 1411 can be coupled to the memory 1405, the user interface (HMI) 1447, and to the keyboard 1451 and the display device 1449 (e.g., through a graphics processor or accelerator), and to the high-speed expansion ports 1415, which may accept various expansion cards via the bus 1409. In an implementation, the low-speed interface 1413 is coupled to the storage device 1407 and the low-speed expansion ports 1417, via the bus 1409. The low-speed expansion ports 1417, which may include various communication ports (e.g., Universal Serial Bus (USB), Bluetooth, Ethernet, wireless Ethernet) may be coupled to the one or more external input/output devices 1441. The computing device 1400 may be connected to a server 1453 and a rack server 1455. The computing device 1400 may be implemented in several different forms. For example, the computing device 1400 may be implemented as part of the rack server 1455.

The present disclosure provides the system 201*a* for controlling the fleet of UAVs. The system 201*a* determines assignments for one or more UAVS of the fleet of UAVs for delivering a package by performing the multi-stage optimization. In each stage of the multi-stage optimization, different variables pertinent to different participants are optimized. Such a multi-stage optimization ensures correct utilization of the UAVs to provide efficient delivery services. Further, such a multi-stage optimization simplifies the size of each combinatorial problem performed at each stage, thereby the multi-stage optimization is computationally simpler. In other words, complexity involved in performing the multi-stage optimization to schedule and control the UAVs is mitigated/reduced. The embodiments of present disclosure are explained in context of mission service. However, the embodiments of the present disclosure can be applied for other services, such as aerial landscaping services, aerial photography services, surveillance services, and search and rescue services.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for controlling a fleet of unmanned aerial vehicles (UAVs), wherein the system comprises: a memory configured to store executable instructions; and at least one processor configured to execute the instructions to:
   receive request data for performing a new mission by one or multiple UAVs in the fleet of UAVs;
   obtain assignments for performing different missions by the fleet of UAVs, each assignment includes assignment data indicative of a UAV of the fleet of UAVs assigned to perform a corresponding mission over an execution path formed by a sequence of terminals and service times at which the assigned UAV is scheduled to be serviced at terminals of the sequence of the terminals;
   determine a new assignment defining assignment data of the new mission by performing a first stage of a multi-stage optimization of the assignments subject to a first set of constraints preserving the assignment data in the obtained assignments;
   update the assignments with the determined new assignment to include the new mission in the missions of the fleet of UAVs;
   optimize the assignments for the missions including the new mission by performing a second stage of the multi-stage optimization of the assignments subject to a second set of constraints allowing reassignment of the UAVs while preserving the execution paths in each of the assignments; and
   control the fleet of UAVs based on the optimized assignments to perform the missions.

2. The system of claim 1, wherein the request data comprises one or a combination of a request receiving date, a mission timeline including one or a combination of a mission start date and a mission completion date, a payload weight, one or more payload dimensions, a maximum driving distance to a first terminal in the sequence of the terminals, and a maximum driving distance to a last terminal in the sequence of terminals.

3. The system of claim 2, wherein the at least one processor is further configured to:
   perform the first stage of the multi-stage optimization on the request receiving date; and
   perform the second stage of the multi-stage optimization on the mission completion date.

4. The system of claim 3, wherein the request receiving date and the mission completion date are on different calendar days.

5. The system of claim 1, wherein the processor is configured to execute the first stage of the multi-stage optimization more times than the second stage of the multi-stage optimization, such that the execution of the second stage of the multi-stage optimization includes multiple assignments for multiple new missions determined by multiple executions of the first stage of the multi-stage optimization.

6. The system of claim 1, wherein the first set of constraints comprises a payload capacity constraint, a maximum driving distance to a first terminal in the sequence of the terminals, a maximum driving distance to a last terminal in the sequence of terminals, a landing pads compatibility constraint, and a relocation feasibility constraint, wherein the second set of constraints comprises an execution path constraint, an assignment constraint, a reassignment cost constraint, and a maximum slack constraint.

7. The system of claim 1, wherein the at least one processor is configured to perform the first stage of the multi-stage optimization using a heuristic algorithm.

8. The system of claim 7, wherein, to perform the first stage of the multi-stage optimization using the heuristic algorithm, the at least one processor is further configured to:
   determine a subset of UAVs feasible to perform the new mission while satisfying the first set of constraints;

select an UAV from the feasible subset of UAVs according to a metric of performance; and
assign the selected UAV for the new mission.

9. The system of claim 8, wherein the feasible subset of UAVs includes one or more conditionally feasible UAVs that are feasible under a condition including one or a combination of a reduced amount of fuel for a specific leg of the execution path and a location of a mobile terminal in the sequence of terminals.

10. The system of claim 8, wherein, to perform the first stage of the multi-stage optimization using the heuristic algorithm, the at least one processor is further configured to
test a UAV unfeasible to perform the new mission for a reduced amount of fuel sufficient to cover a leg between two terminals in the sequence of terminals allowing transformation of the unfeasible UAV into a conditionally feasible UAV; and
command to fuel the conditionally feasible UAV with the reduced amount of fuel for the leg between two terminals when the conditionally feasible UAV is assigned to the new mission.

11. The system of claim 8, wherein, to perform the first stage of the multi-stage optimization using the heuristic algorithm, the at least one processor is further configured to
test a UAV unfeasible to perform the new mission for a location of a mobile terminal allowing transformation of the unfeasible UAV into a conditionally feasible UAV; and
command to include the mobile terminal at the determined location in the sequence of terminals for the new mission when the conditionally feasible UAV is assigned to the new mission.

12. The system of claim 1, wherein the at least one processor is further configured to perform the second stage of the multi-stage optimization by solving a mixed integer optimization problem.

13. The system of claim 12, wherein the mixed integer optimization problem is configured to minimize at least one of a total waiting time and a total relocation miles associated with the fleet of UAVs.

14. The system of claim 13, wherein, to perform the second stage of the multi-stage optimization, the at least one processor is further configured to:
determine a cost of reassignment of different UAVs to each of the assignments for the missions including the new mission;
determine an assignment graph corresponding to each of the different UAVs;
determine a subgraph of each of the assignment graphs based on the second set of constraints; and
determine, based on the subgraph, the optimized assignments that minimize at least one of a total waiting time and total relocation miles parameters of the fleet of UAVs.

15. The system of claim 14, wherein the assignment graph comprises a set of nodes corresponding to each assignment and a set of arcs corresponding to feasible reassignments.

16. The system of claim 14, wherein the different UAVs are of a type considered feasible for the missions during the first stage of the multi-stage optimization.

17. The system of claim 1, wherein the at least one processor is further configured to receive the request data via a consumer interface, and wherein the consumer interface comprises at least one of:

a payload-management option configured to update at least one of the request receiving date, the mission completion date, the payload weight, and one or more payload dimensions corresponding to the request data;
a shipment-report option configured to generate a shipment report based on at least one of the request receiving date, the mission completion date, the payload weight and the one or more payload dimensions, to provide shipment details corresponding to the request data;
a cost-report option configured to generate a cost report based on at least one of the request receiving date, the request completion date, the payload weight and the one or more payload dimensions, to provide cost details corresponding to the request data;
an organization option configured to display organization details, wherein the organization details include an organization name and organization location; and
a payment option configured to receive payment details corresponding to one or more service consumers.

18. The system of claim 1, wherein the at least one processor is further configured to receive the assignment data via a shipment interface, and wherein the shipment interface comprises at least one of:
a live-map option configured to display live-location data corresponding to at least one assignment of the first list of assignments and the second list of assignments;
a mission-main-menu option configured to display a mission-main menu corresponding to the at least one assignment of the first list of assignments and the second list of assignments, wherein the mission-main menu includes one or more of a title, a logo, an option list, a bonus section, and mission records;
a dashboard option to configured to display one or more charts, one or more graphs, one or more data tables, one or more filters and one or more navigation buttons;
a mission option configured to display at least one of a start date, an initial terminal location, a destination terminal location, and a pilot name;
a service option configured to display one or more locations where unmanned aerial services are enabled;
an alerts option configured to:
display a first alert after initiating the mission from the initial terminal; and
display a second alert after completing the mission at the destination terminal; and
a calendar option configured to display a calendar to one or more drone operators.

19. The system of claim 1, wherein the at least one processor is further configured to:
remove the determined assignment for the new mission from the assignments of the missions of the fleet of the UAVs upon completing the new mission or receiving a request to cancel the new mission.

20. The system of claim 1, wherein the mission comprises one or a combination of: an aerial photography mission, a search and rescue mission, a surveillance and security mission, an environmental monitoring mission, an infrastructure inspection mission, a package delivery mission, a research mission, and a disaster response mission.

* * * * *